United States Patent [19]
Yamanashi

[11] Patent Number: 5,416,639
[45] Date of Patent: May 16, 1995

[54] ZOOM LENS SYSTEM

[75] Inventor: Takanori Yamanashi, Tokyo, Japan

[73] Assignee: Olympus Optical Co., Ltd., Tokyo, Japan

[21] Appl. No.: 902,818

[22] Filed: Jun. 23, 1992

[30] Foreign Application Priority Data

Jun. 29, 1991 [JP] Japan ............................. 3-182859
Jun. 29, 1991 [JP] Japan ............................. 3-182884

[51] Int. Cl.⁶ .................................... G02B 15/14
[52] U.S. Cl. ................................... 359/683; 359/676; 359/686
[58] Field of Search ................. 359/683, 686, 676

[56] References Cited

U.S. PATENT DOCUMENTS

| | | | |
|---|---|---|---|
| 3,532,415 | 10/1970 | Baluteau et al. | 359/683 |
| 3,549,235 | 12/1970 | Macher | 359/683 |
| 3,682,534 | 8/1972 | Cook et al. | 359/684 |
| 4,099,845 | 7/1978 | Takesi et al. | 359/684 |
| 4,516,839 | 5/1985 | Tokumaru | 359/686 |
| 4,759,617 | 7/1988 | Tokumaru | 359/686 |
| 5,078,481 | 1/1992 | Nakayama et al. | 359/686 |

Primary Examiner—Georgia Y. Epps
Assistant Examiner—Michael A. Papalas
Attorney, Agent, or Firm—Cushman, Darby & Cushman

[57] ABSTRACT

A zoom lens system comprising a plurality of lens units, concretely in order from the object side, a first lens unit having negative refractive power, a second lens unit having positive refractive power, a third lens unit having negative refractive power and a fourth lens unit having positive or negative refractive power; wherein said zoom lens system is zoomed by moving the second lens unit, the third lens unit and the fourth lens unit so that locations of these lens units at a tele position are on the object side of locations thereof at a wide position, and said zoom lens system is focused by moving one of more lens components disposed in the first lens unit. This zoom lens system has a total length which is kept substantially constant regardless of zooming and focusing.

13 Claims, 33 Drawing Sheets

ZOOM LENS SYSTEM

BACKGROUND OF THE INVENTION a) Field of the Invention

The present invention relates to a zoom lens system of the so-called negative front lens type which comprises a negative lens unit on the object side.

b) Description of the Prior Art

In the conventional negative front lens type zoom lens system in which a lens unit disposed on the object side therein or a first lens unit has negative refractive power, the role of compensator which corrects deviation of image location caused due to the vari-focal function performed by moving lens units disposed after the first lens unit is imparted to the first lens unit. In addition to the role of the compensator described above, another role of a focusing lens unit is allocated to the negative first lens unit in the conventional negative front lens type of zoom lens system. In other words, the first lens unit is moved not only for correcting the deviation of the image location caused by zooming but also for focusing the zoom lens system.

The zoom lens system of the negative front lens type described above allows remarkable variation of spherical aberration to be produced at a tele position thereof by focusing and allows optical performance thereof to be degraded by focusing the zoom lens system on an object located at a short distance. The zoom lens system of this type is unusable for photographing an object located at a shorter distance because the first lens unit has the negative refractive power, a light bundle which emerges from the first lens unit to be incident on a second lens unit is divergent, and aberrations are varied by varying an airspace reserved between the first lens unit and the second lens unit. The aberrations are varied at high degrees at the tele position of the zoom lens system at which the light bundle has a larger diameter and the zoom lens system has a larger aperture.

Further, the negative front lens type zoom lens system is undesirable for making a lens barrel thereof waterproof since a total length of the zoom lens system is varied not only by zooming but also by focusing. That is to say, the movable lens unit which is disposed on the object side in the zoom lens system makes it impossible to make the lens barrel airtight, and internal pressure of the zoom lens system and driving force of the lens barrel are varied undesirably by moving the movable lens unit.

Furthermore, the moving of the first lens unit (the lens unit disposed on the object side in the zoom lens system) for zooming causes delicate variations of moving distance of the lens unit for focusing dependently on focal lenghts of the zoom lens system and undesirably accelerates non-linearization of moving locus of the first lens unit.

The negative front lens type zoom lens system generally has a composition which is illustrated in FIG. 1 or FIG. 2. In these drawings, the reference symbol W represents a wide position, the reference symbol S designates an intermediate focal length and the reference symbol T denotes a tele position of the zoom lens system. The zoom lens system which has the composition illustrated in FIG. 1 consists of a first lens unit I and a second lens unit II. Almost all of zoom lens systems having the composition illustrated in FIG. 1 are so-called standard zoom lens systems and have zooming ratios of 2 or lower. There is also known a zoom lens system which additionally comprises a third lens unit as a flatener on the image side of the lens system shown in FIG. 1. Further, the zoom lens system which has the composition illustrated in FIG. 2 is a combination of two zoom lens systems shown in FIG. 1, and consists of a first lens unit I having negative refractive power, a second lens unit II having positive refractive power, a third lens unit III having negative refractive power power and a fourth lens unit IV having positive refractive power. Total lengths of these zoom lens systems are varied remarkably since the first lens unit is moved for a long distance as is apparent from FIG. 1 and FIG. 2.

Known as the conventional examples of the zoom lens system of this type are those disclosed by U.S. Pat. No. 4,099,845, U.S. Pat. No. 4,759,617, U.S. Pat. No. 4,516,839, U.S. Pat. No. 3,549,235 and U.S. Pat. No. 3,682,534.

Out of the conventional examples mentioned above, the zoom lens system disclosed by U.S. Pat. No. 4,099,845 consists of a front lens part which is kept fixed for zooming and has positive refractive power, a variator which is movable for zooming and has negative refractive power, a compensator which is movable for zooming and has positive refractive power, and a stationary image forming lens group which is kept fixed for zooming. This zoom lens system comprises a lens unit having the positive refractive power on the object side (the front lens part) and is different in power distribution from the zoom lens system according to the present invention. Further, the zoom lens system disclosed by U.S. Pat. No. 4,099,845 is different also in moving loci of the lens unit for zooming from the zoom lens system according to the present invention and has a low vari-focal ratio.

Furthermore, each of the zoom lens systems disclosed by U.S. Pat. No. 4,759,617 and U.S. Pat. No. 4,516,839 comprises a first lens unit which is movable for zooming and allows total length thereof to be varied by zooming, thereby making it difficult to make the lens barrel thereof waterproof.

Moreover, the zoom lens system disclosed by U.S. Pat. No. 3,549,235 consists of an attachment lens system composed of a first lens unit which is kept fixed for varying focal length and has positive refractive power, a second lens unit which is movable for varying focal length and has negative refractive power, a third lens unit which is movable for varying focal length and has negative refractive power and a fourth lens unit which is kept fixed for varying focal length and has positive refractive power, and a basic objective composed of a fifth lens unit which is kept fixed for varying focal length and has positive refractive power. Accordingly, this zoom lens system is different from the zoom lens system according to the present invention in fundamental composition such as power distribution.

In addition, the zoom lens system disclosed by U.S. Pat. No. 3,682,534 uses a third lens unit which is moved toward the image side for zooming from a wide position to a tele position in the direction opposite to the moving direction of a second lens unit and a third lens unit disposed therein, unlike a third lens unit adopted for the zoom lens system according to the present invention. Consequently, the zoom lens system disclosed by U.S. Pat. No. 3,682,534 has a high vari-focal ratio, but requires a relatively complicated moving mechanism for variation of focal length, thereby making it difficult to make the zoom lens system compact especially when the moving mechanism is taken into consideration.

SUMMARY OF THE INVENTION

A primary object of the present invention is to provide a zoom lens system which is of the negative front lens type and is capable of performing focusing on objects located within a range from infinite to short distances with little variations of aberrations.

Another object of the present invention is to provide a zoom lens system which is of the negative front lens type, and is capable of performing zooming and focusing while maintaining a total length of the zoom lens system as a whole substantially constant.

A further object of the present invention is to provide a zoom lens system which is of the negative front lens type, and has a high vari-focal ratio, a broad vari-focal region covering wide field angles and a substantially constant total length regardless of focal length thereof.

The zoom lens system according to the present invention comprises a first lens unit I which is composed of a plurality of lens components and has negative refractive power as a whole, a second lens unit II having positive refractive power, a third-lens unit III having negative refractive power, and a fourth lens unit IV having positive or negative refractive power, and is configured so as to perform zooming from a wide position to a tele position by moving the second lens unit, the third lens unit and the fourth lens unit toward the object side from locations of these lens units at the wide position, and so as to perform focusing by moving one or some of the lens components comprised in the first lens unit along an optical axis.

Alternately, the zoom lens system according to the present invention comprises a first lens unit I having negative refractive power, a second lens unit II having positive refractive power, a third lens unit III having negative refractive power, a fourth lens unit IV having positive or negative refractive power and a fifth lens unit V having positive refractive power, and is configured so as to perform zooming from the wide position to the tele position by moving the second lens unit, the third lens unit and the fourth lens unit along the optical axis toward the object side from locations of these lens unit at the wide position with the first lens unit and the fifth lens unit kept fixed.

It is important for designing a zoom lens system to adequately balance optical performance among different object distances so that the zoom lens system is usable for photographing objects located within a range from infinite to short distances. In the zoom lens systems of the conventional types, however, it is common to move first lens units for focusing the zoom lens systems. Also in the negative front lens type zoom lens systems, for example, it is common to move the first lens units for focusing the zoom lens systems. In the zoom lens systems of this type, however, aberrations are varied remarkably by moving the first lens units for focusing as already described above.

The zoom lens system according to the present invention is of the negative front lens type which adopts a zooming method different from that of the conventional example, has a composition suited for having a waterproof or drip-proof function, and uses a focusing method free from the defect of the focusing method utilizing the movement of the first lens unit. For obtaining these merits, the zoom lens system according to the present invention selects the composition described above.

In the zoom lens system according to the present invention which comprises the five lens units, the fifth lens unit has a role of a field flatener and may be omitted so that the zoom lens system is composed of four lens units. Therefore, the zoom lens system according to the present invention comprises the four lens units or the five lens units as described above.

In the zoom lens system according to the present invention which comprises four or five lens units as described above, a lens unit which has a role of the compensator, for example the third lens unit, may be moved along a non-linear locus.

The zoom lens system according to the present invention comprises the four or five lens units, and is focused by moving one or some of lens components which are disposed in the first lens unit.

Now, concrete description will be made of the focusing method which is one of characteristics of the zoom lens system according to the present invention.

For selecting a focusing method for lens systems, it is generally important to consider that the paraxial relationship is not disturbed by focusing, and so that aberrations are not varied so remarkably in the lens systems, in particular that spherical aberration and astigmatism are not varied in different directions or at so high rates. Further, it is preferable that lens component or lens unit is not moved for so long a distance for focusing.

Taking the points mentioned above into consideration, the zoom lens system according to the present invention adopts a first lens unit which is composed of two or more lens components and is focused by moving one or some of the lens components.

In the zoom lens system according to the present invention, longitudinal chromatic aberration is corrected and remarkable variation thereof is prevented, for example, by composing the first lens unit of three lens components; out of which is first lens component is kept fixed for zooming and focusing, a second lens component is kept fixed for zooming but moved for focusing, and a third lens component is kept fixed for focusing but moved for correcting variations of aberrations caused by zooming. Disposed in the first lens unit is an airspace which has a function to prevent spherical aberration and astigmatism as described above and this lens unit is selected as a focusing lens unit for preventing aberrations from being varied remarkably by focusing. Further, owing to the fact that the second lens unit is moved for focusing, a total length of the zoom lens system is not varied by focusing and moving distance of the lens component for the focusing is substantially the same for all photographing distances. Owing to the fact described above, the zoom lens system according to the present invention is compatible with a simplified focusing mechanism and is very advantageous for making a camera housing waterproof without enlarging the housing so remarkably.

Furthermore, it is generally necessary to correct in the lens component which is to be moved for focusing. For this reason, it is necessary that the focusing lens component comprises a positive lens element and a negative lens element. In the zoom lens system according to the present invention comprising the second lens component which is to be moved for focusing is disposed between the first lens component and the second lens component, it is undesirable to select a complicated composition for the second lens component and it is preferable to use an aspherical surface on the second lens component. Further, moving speed of the focusing lens component can be enhanced by composing this lens component of a small number of lens elements. Furthermore, the third lens component which is disposed for correcting aberrations may be composed of a single lens element so that it will not occupy a wide space. When the first lens unit is composed of two lens components in the zoom lens system according to the present invention, it is preferable to move the first lens component with the second lens component kept fixed for focusing and impart the role for correcting aberrations to the second lens component.

For the zoom lens system according to the present invention described above, it is desirable that the lens unit which is moved for zooming satisfies the following conditions (1) and (2):

$$|\beta_{2W}| < |\beta_{2T}| \quad (1)$$

$$\beta_{3W}\cdot\beta_{4W} < \beta_{3T}\cdot\beta_{4T} \quad (2)$$

wherein the reference symbols $\beta_{2W}$ and $\beta_{2T}$ represent paraxial lateral magnifications of the second lens unit at the wide position and the tele position respectively of the zoom lens system, the reference symbols $\beta_{3W}$ and $\beta_{3T}$ designate paraxial lateral magnifications of the third lens unit at the wide position and the tele position respectively of the zoom lens system, and the reference symbols $\beta_{4W}$ and $\beta_{4T}$ denote paraxial lateral magnifications of the fourth lens unit at the wide position and the tele position respectively of the zoom lens system.

The conditions (1) and (2) mean that magnifications of the second lens unit, the third lens unit and the fourth lens unit respectively are enhanced by varying the focal length of the zoom lens system from the wide position to the tele position so that the variation of the focal length can be performed effectively by moving the lens units.

Further, it is desirable for the zoom lens system according to the present invention that power distribution among the lens units satisfies the following conditions (3) and (4):

$$0.5 < |\phi_{12W}/\phi_W| < 4.0 \quad (3)$$

$$0.05 < |\phi_{34W}/\phi_W| < 1.5 \quad (4)$$

wherein the reference symbol $\phi_W$ represents refractive power of the zoom lens system as a whole at the wide position thereof, the reference symbol $\phi_{12W}$ designates total refractive power of the first lens unit and the second lens unit, and the reference symbol $\phi_{34W}$ denotes total refractive power of the third lens unit and the fourth lens unit.

If the lower limit of the condition (3) is exceeded, there will be produced a disadvantage for shortening the total length of the zoom lens system as a whole. If the upper limit of the condition (3) is exceeded, in contrast, it will be difficult to correct aberrations in the first lens unit and the second lens unit.

Since the third lens unit and the fourth lens unit are important for correction of curvature of field, $|\phi_{34W}/\phi_W|$ exceeding the upper limit of the condition (4) is undesirable for correction of the curvature of field. In contrast, $|\phi_{34W}/\phi_W|$ exceeding the lower limit of the condition (4) will undesirably prolong moving distances of the lens units for zooming.

Further, the zoom lens system according to the present invention has characteristics for correction of aberrations described below. In other words, the zoom lens system according to the present invention is characterized in that an aperture stop is disposed in the third lens unit and that the zoom lens system is of the negative front lens type.

The zoom lens system according to the present invention allows relatively remarkable variations of aberrations to be caused by zooming in the first lens unit and the second lens unit, but relatively small variations of aberrations to be caused in the third and later lens units by zooming. These variations of aberrations are dependent on the type of the zoom lens system and independent of specifications for the zoom lens system. When the aperture stop is disposed in the third lens unit, off axial rays having large heights are largely influenced by the first lens unit which is located apart from an entrance pupil of the zoom lens system and transmitting conditions of the off axial rays through the first lens unit are varied by varying the focal length of the zoom lens system. These variations of the transmitting conditions are remarkable at the wide position where the zoom lens has a large field angle and distortion in particular is tend to be varied toward the negative side. For this reason, composition of the first lens unit is important and it is necessary to reduce aberrations remaining in the first lens unit.

Furthermore, since the zoom lens system according to the present invention is of the negative front lens type, axial rays incident on the second lens unit have large heights thereon, and largely influence mainly on spherical aberration, coma and longitudinal chromatic aberration. Therefore, restriction to aperture ratio at the tele position is one of characteristics of the zoom lens system according to the present invention.

Moreover, since the zoom lens system according to the present invention has a total length which is substantially the same at all focal lengths of the zoom lens system, the total length of the zoom lens system is shorter at the wide position and longer at the tele position than that of the zoom lens system which comprises a first lens unit movable for zooming. This is a difference between the zoom lens system according to the present invention and the conventional zoom lens system. At the tele position at which the zoom lens system according to the present invention has a total length which is longer than that of the conventional zoom lens system, the zoom lens system according to the present invention is more advantageous for correction of aberrations.

For zooming the zoom lens system according to the present invention, the lens units are moved as illustrated in FIG. 3 and FIG. 4. The second lens unit and the fourth lens unit which have the vari-focal functions are moved for long distances, whereas the third lens unit is suited for having the role of the compensator and moved as illustrated mainly for keeping the location of an image surface constant. In other words, the lens units are moved for zooming so that an airspace disposed between the first lens unit and the second lens unit is narrowed, an airspace disposed between the second lens unit and the third lens unit is widened, and an airspace disposed between the third lens unit and the fourth lens unit is narrowed. In case of an ordinary zoom lens system which is composed of two lens units, this lens unit has a longest total length at the wide position thereof when the second lens unit has a magnification of 1× or lower.

When a moving distance for the second lens unit is represented by $X_2$ and a moving distance for the fourth lens unit is designated by $X_4$ in the zoom lens system according to the present invention, it is desirable that $X_2/X_4$ satisfies the condition mentioned below:

$$0.7 < X_2/X_4 < 10.0$$

If the lower limit of the above-mentioned condition is exceeded, the moving distance for the second lens unit is relatively shortened, whereby it will be difficult to enhance vari-focal ratio of the zoom lens system according to the present invention, and burdens of magnifications will be increased on the third lens unit and the fourth lens unit for enhancing the vari-focal ratio of the zoom lens system. If the upper limit of the above-mentioned condition is exceeded, in contrast, the moving distance for the second lens unit will be prolonged and variations of aberrations to be caused by zooming will undesirably be more remarkable.

Now, composition of each of the lens units of the zoom lens system according to the present invention will be described below.

The first lens unit which has the negative refractive power is located, at the wide position of the zoom lens system, relatively distantly from the entrance pupil and should desirably comprise a negative lens component on the object side so that rays will be incident thereon at small angles. Though it is conceivable to configure the first lens unit so as to comprise a positive lens component on the object side, this configuration increases an outside diameter of the first lens unit and is undesirable. Therefore, it is preferable to compose the first lens unit, in order from the object side, of a negative lens component and a positive lens component for obtaining good balance in aberrations. However, negative distortion is produced in a large absolute value by the first lens unit at the wide position. For correcting this distortion, it is desirable to use an aspherical surface on the first lens unit which also makes it possible to obtain a super wide field angle of the zoom lens system according to the present invention.

A distance as measured from the first lens unit to the entrance pupil is long generally at the wide position. In order to maintain this distance substantially constant within the entire range from the wide position to the tele position, the distance as measured from the first lens unit to the entrance pupil must be shortened at the wide position and prolonged at the tele position. Consequently, refractive power distribution in the first lens unit of the zoom lens system according to the present invention is different from that of the conventional zoom lens system. The refractive power distribution in the first lens unit selected for the zoom lens system according to the present invention makes it possible to reduce diameters of a filter and a front lens component disposed in the zoom lens system. However, the refractive power distribution prolongs the distance as measured from the first lens unit to the entrance pupil at the tele position and narrows the field angle of the zoom lens system.

In the next place, the second lens unit has great roles for correcting in particular spherical aberration and coma, since the aperture ratio of the zoom lens system is relatively high in this lens unit. Further, the second lens unit is important for enhancing contrast and resolution at center of an image by correcting the longitudinal chromatic aberration. Therefore, it is ordinarily necessary for the second lens unit to comprise a combination of a cemented doublet consisting of a positive lens element and a negative lens element, and a positive lens component. Further, is more effective to configure the second lens unit as a cemented lens component consisting of three lens elements.

The third lens unit consists of a positive lens component and a negative lens component, and has a role of the compensator. Further, the third lens unit is disposed so as to be floating relatively to the fourth lens unit.

The fourth lens unit consists of a positive lens component and a negative lens component, and has an imaging function in addition to the vari-focal function.

The fifth lens unit has a function to correct aberrations, especially curvature of field, remaining in the first through the fourth lens units and consists of a single positive lens component.

It is effective, as already described above, to dispose the fifth lens unit as a fixed lens unit which has the function of a field flatener for correcting the curvature of field rather than a function of a relay lens.

As is understood from the objects of the present invention, it is desirable that the zoom lens system according to the present invention has, at the wide position thereof, a focal length $f_W$ which is longer than a diagonal length D of the image surface thereof. That is to say, the zoom lens system according to the present invention should desirably satisfy the condition mentioned below:

$$f_W < D$$

DETAILED DESCRIPTION OF THE PREFERRED EMBODIMENTS

Figure 1:
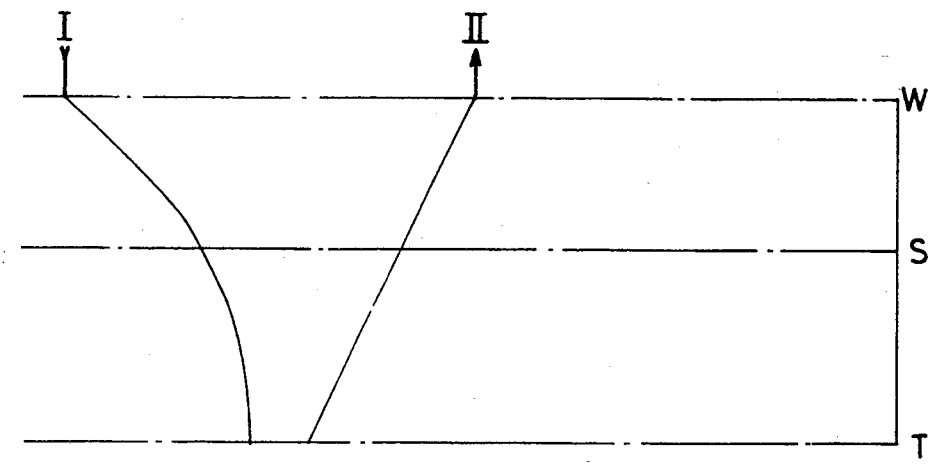
FIG. 1 and FIG. 2 show diagrams illustrating movements of the lens units for zooming the conventional zoom lens system.
Figure 2:
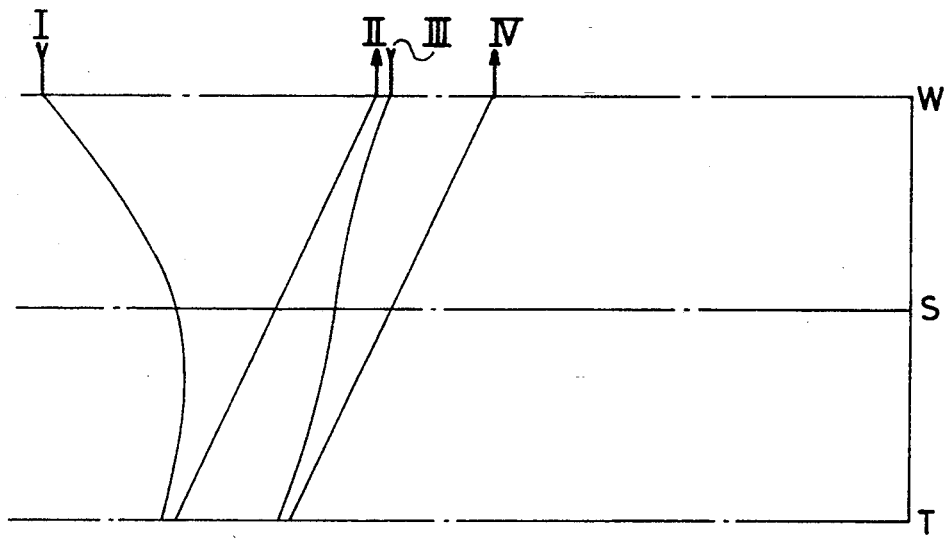
Figure 3:
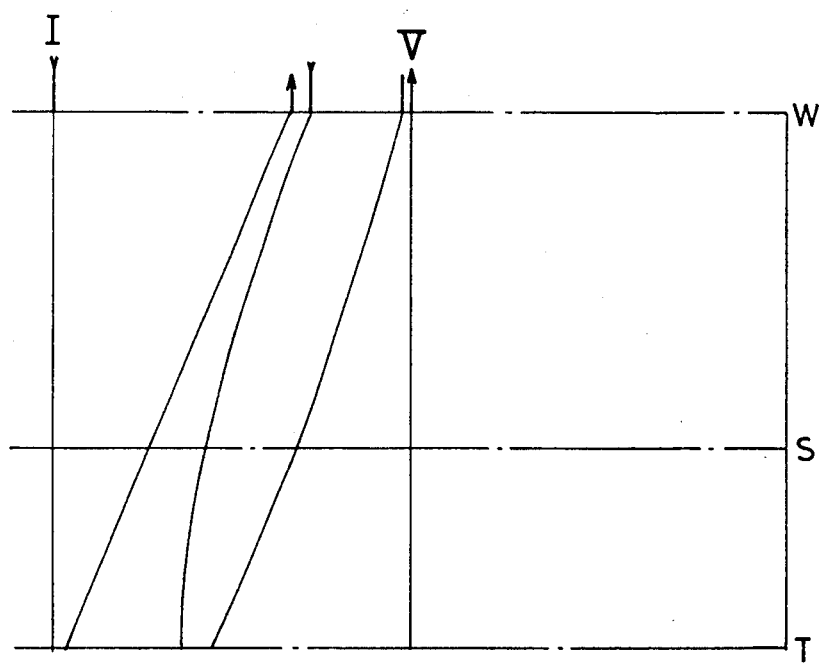
FIG. 3 through FIG. 5 show diagrams illustrating movements of the lens units for zooming the zoom lens system according to the present invention.
Figure 4:
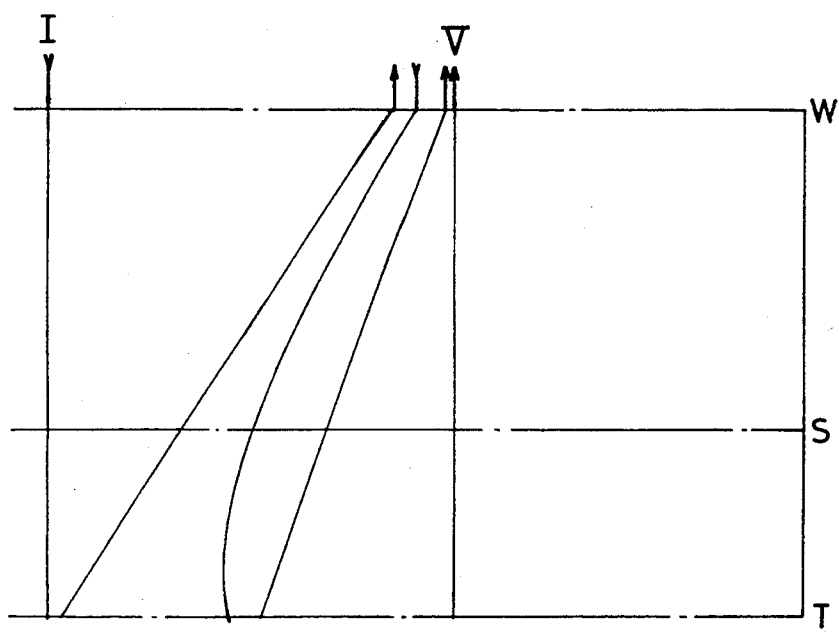
Figure 5:
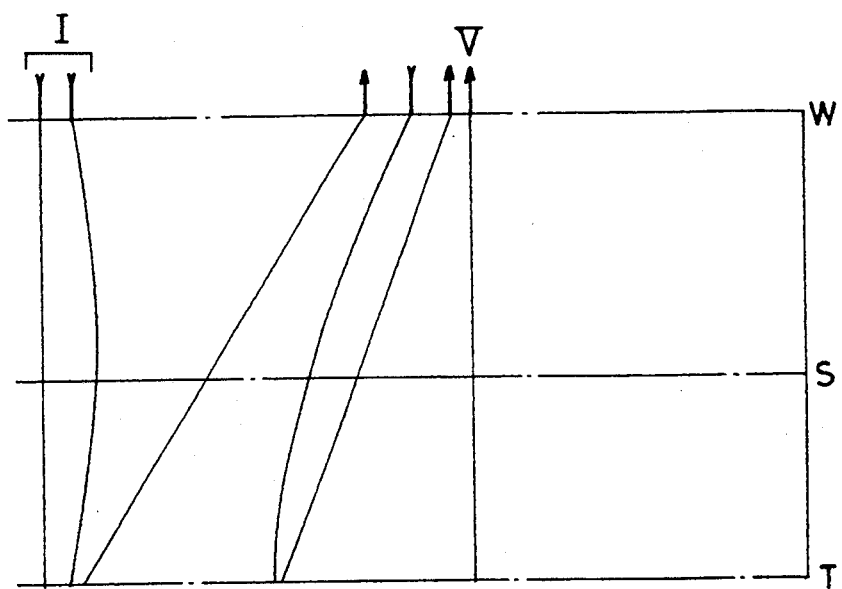

Now, the zoom lens system according to the present invention will be described in more detail below with reference to the preferred embodiments illustrated in the accompanying drawings and given in the form of the following numerical data:

| Embodiment 1 | | |
|---|---|---|
| $f = 36 \sim 101.6$, F/4.6 $\sim$ F/5.8, $2\omega = 61.9° \sim 24.0°$ | | |
| $r_1 = -72.1560$ | | |
| $d_1 = 1.2000$ | $n_1 = 1.80610$ | $\nu_1 = 40.95$ |
| $r_2 = 142.0500$ | | |
| $d_2 = 1.8600$ | | |
| $r_3 = -161.6170$ | | |
| $d_3 = 3.1600$ | $n_2 = 1.84666$ | $\nu_2 = 23.78$ |
| $r_4 = -52.7310$ | | |
| $d_4 = 3.1400$ | | |
| $r_5 = -735.4740$ | | |
| $d_5 = 0.7800$ | $n_3 = 1.80610$ | $\nu_3 = 40.95$ |
| $r_6 = 40.8510$ | | |
| $d_6 = 0.1200$ | | |
| $r_7 = 37.7440$ | | |
| $d_7 = 2.2510$ | $n_4 = 1.84666$ | $\nu_4 = 23.78$ |
| $r_8 = 63.5960$ | | |
| $d_8 = 0.8000$ | | |
| $r_9 = 54.3910$ | | |
| $d_9 = 0.8800$ | $n_5 = 1.51633$ | $\nu_5 = 64.15$ |
| $r_{10} = 43.9360$ | | |
| $d_{10} = 1.2500$ | $n_6 = 1.64769$ | $\nu_6 = 33.80$ |
| $r_{11} = 36.5870$ | | |
| $d_{11} = D_1$ (variable) | | |
| $r_{12} = 38.2360$ | | |
| $d_{12} = 1.3200$ | $n_7 = 1.83400$ | $\nu_7 = 37.16$ |
| $r_{13} = 24.8900$ | | |
| $d_{13} = 6.0000$ | $n_8 = 1.69680$ | $\nu_8 = 55.52$ |
| $r_{14} = -76.7960$ | | |
| $d_{14} = 0.9000$ | $n_9 = 1.84666$ | $\nu_9 = 23.78$ |
| $r_{15} = -1067.7000$ | | |
| $d_{15} = 0.1500$ | | |
| $r_{16} = 60.2260$ | | |
| $d_{16} = 2.3900$ | $n_{10} = 1.65830$ | $\nu_{10} = 57.33$ |
| $r_{17} = -268.5660$ | | |
| $d_{17} = 0.3000$ | | |
| $r_{18} = 27.8640$ | | |
| $d_{18} = 2.8900$ | $n_{11} = 1.49700$ | $\nu_{11} = 81.61$ |
| $r_{19} = 56.3070$ | | |
| $d_{19} = D_2$ (variable) | | |
| $r_{20} = \infty$ (stop) | | |
| $d_{20} = 1.5840$ | | |
| $r_{21} = -55.9820$ | | |
| $d_{21} = 1.0600$ | $n_{12} = 1.51821$ | $\nu_{12} = 65.04$ |
| $r_{22} = -108.3330$ | | |
| $d_{22} = 4.2690$ | | |
| $r_{23} = 28.9520$ | | |
| $d_{23} = 0.7800$ | $n_{13} = 1.50378$ | $\nu_{13} = 66.81$ |
| $r_{24} = 12.6150$ | | |
| $d_{24} = 2.0000$ | $n_{14} = 1.56883$ | $\nu_{14} = 56.34$ |
| $r_{25} = 14.1830$ | | |
| $d_{25} = D_3$ (variable) | | |
| $r_{26} = -28.0240$ | | |
| $d_{26} = 1.6230$ | $n_{15} = 1.50378$ | $\nu_{15} = 66.81$ |
| $r_{27} = -18.3400$ | | |
| $d_{27} = 0.1500$ | | |
| $r_{28} = -31.5140$ | | |
| $d_{28} = 4.1950$ | $n_{16} = 1.52310$ | $\nu_{16} = 50.84$ |
| $r_{29} = -10.7388$ | | |
| $d_{29} = 0.1000$ | | |
| $r_{30} = -10.6600$ | | |
| $d_{30} = 0.8000$ | $n_{17} = 1.83400$ | $\nu_{17} = 37.16$ |
| $r_{31} = -26.1720$ | | |
| $d_{31} = D_4$ (variable) | | |
| $r_{32} = -22.8800$ | | |
| $d_{32} = 2.4780$ | $n_{18} = 1.78470$ | $\nu_{18} = 26.22$ |
| $r_{33} = -19.0510$ | | |
| f | 36 | 65.7 | 101.6 |
| $D_1$ | 36.000 | 14.810 | 1.850 |
| $D_2$ | 2.600 | 7.560 | 18.810 |
| $D_3$ | 3.180 | 7.860 | 3.070 |
| $D_4$ | 1.700 | 13.370 | 19.670 |

$\phi_{12W}/\phi_W = 1.80$, $\phi_{34W}/\phi_W = -0.900$, $\beta_{2W} = -0.475$, $\beta_{2T} = -1.143$, $\beta_{3W}\beta_{4W} = 2.55662$, $\beta_{3T}\beta_{4T} = 2.9938$, $X_2/X_4 = 1.897$, $d_4 = 0.063$ (object distance 1 m)

| Embodiment 2 | | |
|---|---|---|
| $f = 35.9 \sim 101.9$, F/4.6 $\sim$ F/5.8, $2\omega = 68.5° \sim 24.0°$ | | |
| $r_1 = 1541.6370$ | | |
| $d_1 = 1.1700$ | $n_1 = 1.80440$ | $\nu_1 = 39.58$ |
| $r_2 = 46.0860$ | | |
| $d_2 = 0.1400$ | | |
| $r_3 = 48.1200$ | | |
| $d_3 = 2.2700$ | $n_2 = 1.84666$ | $\nu_2 = 23.78$ |
| $r_4 = 78.3300$ | | |
| $d_4 = D_1$ (variable) | | |
| $r_5 = -1570.2640$ | | |
| $d_5 = 0.9700$ | $n_3 = 1.77250$ | $\nu_3 = 49.66$ |
| $r_6 = 45.6510$ | | |
| $d_6 = 0.1760$ | | |
| $r_7 = 44.0710$ | | |
| $d_7 = 2.3000$ | $n_4 = 1.84666$ | $\nu_4 = 23.78$ |
| $r_8 = 74.4700$ | | |
| $d_8 = 0.8500$ | | |
| $r_9 = 54.6500$ | | |
| $d_9 = 0.8900$ | $n_5 = 1.50378$ | $\nu_5 = 66.81$ |
| $r_{10} = 35.4040$ | | |
| $d_{10} = 1.3100$ | $n_6 = 1.66446$ | $\nu_6 = 35.81$ |
| $r_{11} = 38.8660$ | | |
| $d_{11} = D_2$ (variable) | | |
| $r_{12} = 57.0740$ | | |
| $d_{12} = 0.8500$ | $n_7 = 1.83400$ | $\nu_7 = 37.16$ |
| $r_{13} = 38.5700$ | | |
| $d_{13} = 4.9950$ | $n_8 = 1.65830$ | $\nu_8 = 57.33$ |
| $r_{14} = -40.7890$ | | |
| $d_{14} = 0.8940$ | $n_9 = 1.84666$ | $\nu_9 = 23.78$ |
| $r_{15} = -92.3040$ | | |
| $d_{15} = 0.1440$ | | |
| $r_{16} = 50.1200$ | | |
| $d_{16} = 2.0000$ | $n_{10} = 1.48749$ | $\nu_{10} = 70.20$ |
| $r_{17} = 181.1400$ | | |
| $d_{17} = 0.1460$ | | |
| $r_{18} = 33.3410$ | | |
| $d_{18} = 3.1750$ | $n_{11} = 1.48749$ | $\nu_{11} = 70.20$ |
| $r_{19} = -325.1830$ | | |
| $d_{19} = D_3$ (variable) | | |
| $r_{20} = \infty$ (stop) | | |
| $d_{20} = 3.5520$ | | |
| $r_{21} = -12.8820$ | | |
| $d_{21} = 1.1100$ | $n_{12} = 1.59270$ | $\nu_{12} = 35.29$ |
| $r_{22} = -13.1830$ | | |
| $d_{22} = 2.3870$ | | |
| $r_{23} = -418.8670$ | | |
| $d_{23} = 1.0000$ | $n_{13} = 1.74100$ | $\nu_{13} = 52.68$ |
| $r_{24} = 13.9560$ | | |
| $d_{24} = 2.9600$ | $n_{14} = 1.84666$ | $\nu_{14} = 23.78$ |
| $r_{25} = 19.7000$ | | |
| $d_{25} = D_4$ (variable) | | |
| $r_{26} = 147.7420$ | | |
| $d_{26} = 1.4440$ | $n_{15} = 1.83400$ | $\nu_{15} = 37.16$ |
| $r_{27} = -123.2220$ | | |
| $d_{27} = 0.2000$ | | |
| $r_{28} = -68.8970$ | | |
| $d_{28} = 4.1100$ | $n_{16} = 1.49700$ | $\nu_{16} = 81.61$ |
| $r_{29} = -11.3250$ | | |
| $d_{29} = 0.7950$ | $n_{17} = 1.66680$ | $\nu_{17} = 33.04$ |
| $r_{30} = -30.0310$ | | |
| $d_{30} = D_5$ (variable) | | |
| $r_{31} = -30.7810$ | | |
| $d_{31} = 2.6800$ | $n_{18} = 1.76200$ | $\nu_{18} = 40.10$ |
| $r_{32} = -22.7690$ | | |
| f | 35.9 | 62.2 | 101.9 |
| $D_1$ | 3.930 | 6.600 | 2.910 |
| $D_2$ | 33.960 | 12.480 | 1.500 |
| $D_3$ | 5.140 | 12.140 | 22.580 |
| $D_4$ | 4.860 | 5.600 | 1.100 |
| $D_5$ | 2.200 | 13.290 | 22.010 |

$\phi_{12W}/\phi_W = 1.724$, $\phi_{34W}/\phi_W = -0.754$, $\beta_{2W} = -0.500$, $\beta_{2T} = -1.217$, $\beta_{3W}\beta_{4W} = 2.63920$, $\beta_{3T}\beta_{4T} = 3.05895$, $X_2/X_4 = 1.6919$, $d_4 = 1.571$ (object distance 1.4 m)

| Embodiment 3 | | |
|---|---|---|
| $f = 31.7 \sim 101.4$, F/4.6 $\sim$ F/5.8, $2\omega = 62.1° \sim 23.9°$ | | |
| $r_1 = -134.5080$ | | |
| $d_1 = 0.9740$ | $n_1 = 1.80610$ | $\nu_1 = 40.95$ |

Embodiment 3 (-continued)

| | | | |
|---|---|---|---|
| $r_2 =$ | 86.1340 | | |
| | $d_2 = 2.0750$ | | |
| $r_3 =$ | 1812.5700 | | |
| | $d_3 = 3.4380$ | $n_2 = 1.84666$ | $\nu_2 = 23.78$ |
| $r_4 =$ | $-82.1858$ | | |
| | $d_4 = 2.7910$ | | |
| $r_5 =$ | $-2626.6621$ | | |
| | $d_5 = 0.9109$ | $n_3 = 1.80610$ | $\nu_3 = 40.95$ |
| $r_6 =$ | 37.5270 | | |
| | $d_6 = 0.1566$ | | |
| $r_7 =$ | 33.7558 | | |
| | $d_7 = 2.3717$ | $n_4 = 1.84666$ | $\nu_4 = 23.78$ |
| $r_8 =$ | 51.2964 | | |
| | $d_8 = 0.9124$ | | |
| $r_9 =$ | 87.6457 | | |
| | $d_9 = 0.9559$ | $n_5 = 1.51633$ | $\nu_5 = 64.15$ |
| $r_{10} =$ | 33.6919 | | |
| | $d_{10} = 1.5749$ | $n_6 = 1.64769$ | $\nu_6 = 33.80$ |
| $r_{11} =$ | 36.0551 | | |
| | $d_{11} = D_1$ (variable) | | |
| $r_{12} =$ | 35.5343 | | |
| | $d_{12} = 1.8704$ | $n_7 = 1.83400$ | $\nu_7 = 37.16$ |
| $r_{13} =$ | 21.8849 | | |
| | $d_{13} = 6.3337$ | $n_8 = 1.69680$ | $\nu_8 = 55.52$ |
| $r_{14} =$ | $-72.4562$ | | |
| | $d_{14} = 0.7333$ | $n_9 = 1.84666$ | $\nu_9 = 23.78$ |
| $r_{15} =$ | $-619.0383$ | | |
| | $d_{15} = 0.0680$ | | |
| $r_{16} =$ | 101.8110 | | |
| | $d_{16} = 2.4937$ | $n_{10} = 1.65830$ | $\nu_{10} = 57.33$ |
| $r_{17} =$ | $-112.8304$ | | |
| | $d_{17} = 0.5208$ | | |
| $r_{18} =$ | 24.4640 | | |
| | $d_{18} = 2.9234$ | $n_{11} = 1.49700$ | $\nu_{11} = 81.61$ |
| $r_{19} =$ | 76.6686 | | |
| | $d_{19} = D_2$ (variable) | | |
| $r_{20} =$ | $\infty$ (stop) | | |
| | $d_{20} = 1.5908$ | | |
| $r_{21} =$ | $-62.8420$ | | |
| | $d_{21} = 1.1030$ | $n_{12} = 1.51821$ | $\nu_{12} = 65.04$ |
| $r_{22} =$ | 194.9900 | | |
| | $d_{22} = 4.3650$ | | |
| $r_{23} =$ | 33.6980 | | |
| | $d_{23} = 0.6500$ | $n_{13} = 1.50378$ | $\nu_{13} = 66.81$ |
| $r_{24} =$ | 13.4970 | | |
| | $d_{24} = 1.8870$ | $n_{14} = 1.56883$ | $\nu_{14} = 56.34$ |
| $r_{25} =$ | 14.4940 | | |
| | $d_{25} = D_3$ (variable) | | |
| $r_{26} =$ | $-37.6700$ | | |
| | $d_{26} = 1.8020$ | $n_{15} = 1.50378$ | $\nu_{15} = 66.81$ |
| $r_{27} =$ | $-19.5170$ | | |
| | $d_{27} = 0.0133$ | | |
| $r_{28} =$ | $-27.7950$ | | |
| | $d_{28} = 3.6130$ | $n_{16} = 1.51742$ | $\nu_{16} = 52.41$ |
| $r_{29} =$ | $-10.6760$ | | |
| | $d_{29} = 0.5380$ | $n_{17} = 1.83400$ | $\nu_{17} = 37.16$ |
| $r_{30} =$ | $-23.1830$ | | |
| | $d_{30} = D_4$ (variable) | | |
| $r_{31} =$ | $-24.3230$ | | |
| | $d_{31} = 2.5970$ | $n_{18} = 1.78470$ | $\nu_{18} = 26.22$ |
| $r_{32} =$ | $-19.7000$ | | |

| f | 31.7 | 61.6 | 101.4 |
|---|---|---|---|
| $D_1$ | 37.380 | 14.847 | 1.700 |
| $D_2$ | 2.346 | 7.769 | 18.800 |
| $D_3$ | 3.182 | 7.790 | 3.210 |
| $D_4$ | 0.709 | 13.147 | 19.904 |

$\phi_{12W}/\phi_W = 1.967$, $\phi_{34W}/\phi_W = -0.9201$, $\beta_{2W} = -0.439$,
$\beta_{2T} = -1.1766$, $\beta_{3W}\beta_{4W} = 2.86320$, $\beta_{3T}\beta_{4T} = 3.41543$,
$X_2/X_4 = 1.8572$, $d_4 = 0.524$ (object distance 1.4 m)

Embodiment 4

$f = 24.3 \sim 77.7$, F/4.5 ~ F/5.8, $2\omega = 83.3° \sim 16.1°$

| | | | |
|---|---|---|---|
| $r_1 =$ | 107.2744 | | |
| | $d_1 = 1.0000$ | $n_1 = 1.83400$ | $\nu_1 = 37.16$ |
| $r_2 =$ | 33.0005 | | |
| | $d_2 = 6.0916$ | | |
| $r_3 =$ | 391.8495 | | |
| | $d_3 = 4.0680$ | $n_2 = 1.68893$ | $\nu_2 = 31.08$ |
| $r_4 =$ | $-78.8483$ | | |
| | $d_4 = 0.1200$ | | |
| $r_5 =$ | 328.1877 | | |
| | $d_5 = 1.0000$ | $n_3 = 1.83481$ | $\nu_3 = 42.72$ |
| $r_6 =$ | 39.0346 | | |
| | $d_6 = 2.4526$ | | |
| $r_7 =$ | 88.1390 | | |
| | $d_7 = 1.3195$ | $n_4 = 1.49700$ | $\nu_4 = 81.61$ |
| $r_8 =$ | 21.9240 | | |
| | $d_8 = 3.7217$ | $n_5 = 1.84666$ | $\nu_5 = 23.78$ |
| $r_9 =$ | 32.4661 | | |
| | $d_9 = D_1$ (variable) | | |
| $r_{10} =$ | 40.1886 | | |
| | $d_{10} = 2.3684$ | $n_6 = 1.49700$ | $\nu_6 = 81.61$ |
| $r_{11} =$ | 71.8883 | | |
| | $d_{11} = 0.1200$ | | |
| $r_{12} =$ | 42.8479 | | |
| | $d_{12} = 3.1911$ | $n_7 = 1.84666$ | $\nu_7 = 23.88$ |
| $r_{13} =$ | 18.8614 | | |
| | $d_{13} = 4.5062$ | $n_8 = 1.69680$ | $\nu_8 = 55.52$ |
| $r_{14} =$ | $-188.0267$ | | |
| | $d_{14} = 0.1200$ | | |
| $r_{15} =$ | 24.9476 | | |
| | $d_{15} = 3.2335$ | $n_9 = 1.69680$ | $\nu_9 = 55.52$ |
| $r_{16} =$ | 2564.0158 | | |
| | $d_{16} = D_2$ (variable) | | |
| $r_{17} =$ | $\infty$ (stop) | | |
| | $d_{17} = 0.6147$ | | |
| $r_{18} =$ | $-147.5174$ | | |
| | $d_{18} = 1.8812$ | $n_{10} = 1.84666$ | $\nu_{10} = 23.88$ |
| $r_{19} =$ | $-18.8152$ | | |
| | $d_{19} = 1.0000$ | $n_{11} = 1.83481$ | $\nu_{11} = 42.72$ |
| $r_{20} =$ | 77.2279 | | |
| | $d_{20} = 0.5264$ | | |
| $r_{21} =$ | $-68.8248$ | | |
| | $d_{21} = 1.0000$ | $n_{12} = 1.69680$ | $\nu_{12} = 55.52$ |
| $r_{22} =$ | 27.0982 | | |
| | $d_{22} = D_3$ (variable) | | |
| $r_{23} =$ | 752.3348 | | |
| | $d_{23} = 3.7442$ | $n_{13} = 1.56907$ | $\nu_{13} = 71.30$ |
| $r_{24} =$ | $-21.9848$ | | |
| | $d_{24} = 0.1200$ | | |
| $r_{25} =$ | 55.3467 | | |
| | $d_{25} = 5.2307$ | $n_{14} = 1.49700$ | $\nu_{14} = 81.61$ |
| $r_{26} =$ | $-19.2854$ | | |
| | $d_{26} = 1.0000$ | $n_{15} = 1.83400$ | $\nu_{15} = 37.16$ |
| $r_{27} =$ | $-378.8459$ | | |
| | $d_{27} = D_4$ (variable) | | |
| $r_{28} =$ | 1657.0512 | | |
| | $d_{28} = 2.7117$ | $n_{16} = 1.83481$ | $\nu_{16} = 42.72$ |
| $r_{29} =$ | $-97.0075$ | | |

| f | 24.3 | 43.6 | 77.7 |
|---|---|---|---|
| $D_1$ | 30.533 | 12.899 | 2.000 |
| $D_2$ | 2.000 | 5.433 | 12.592 |
| $D_3$ | 10.768 | 7.588 | 1.344 |
| $D_4$ | 1.150 | 18.531 | 28.514 |

$\phi_{12W}/\phi_W = 1.800$, $\phi_{34W}/\phi_W = -0.4140$, $\beta_{2W} = -0.4388$,
$\beta_{2T} = -1.0160$, $\beta_{3W}\beta_{4W} = 2.8178$, $\beta_{3T}\beta_{4T} = 3.2700$,
$X_2/X_4 = 1.041$, $d_6 = 3.429$ (object distance 1.4 m)

Embodiment 5

$f = 21.7 \sim 49.1$, F/4.6 ~ F/5.8, $2\omega = 49.7° \sim 47.5°$

| | | | |
|---|---|---|---|
| $r_1 =$ | 107.9797 | | |
| | $d_1 = 1.1000$ | $n_1 = 1.83481$ | $\nu_1 = 42.72$ |
| $r_2 =$ | 26.4545 (aspherical surface) | | |
| | $d_2 = 4.3702$ | | |
| $r_3 =$ | 137.3708 | | |
| | $d_3 = 3.2516$ | $n_2 = 1.84666$ | $\nu_2 = 23.78$ |
| $r_4 =$ | $-216.0576$ | | |
| | $d_4 = 0.1200$ | | |
| $r_5 =$ | $-375.6913$ | | |
| | $d_5 = 1.1000$ | $n_3 = 1.69680$ | $\nu_3 = 55.52$ |
| $r_6 =$ | 20.8564 (aspherical surface) | | |
| | $d_6 = 3.0928$ | | |
| $r_7 =$ | 32.7988 | | |
| | $d_7 = 1.1000$ | $n_4 = 1.83481$ | $\nu_4 = 42.72$ |

-continued

Embodiment 5

| | | | |
|---|---|---|---|
| $r_8 =$ | 24.5952 | | |
| | $d_8 = 0.1500$ | | |
| $r_9 =$ | 25.0765 | | |
| | $d_9 = 6.4614$ | $n_5 = 1.64769$ | $v_5 = 33.80$ |
| $r_{10} =$ | 4915.9863 | | |
| | $d_{10} = D_1$ (variable) | | |
| $r_{11} =$ | 68.2574 | | |
| | $d_{11} = 1.4583$ | $n_6 = 1.80400$ | $v_6 = 46.57$ |
| $r_{12} =$ | 110.1335 | | |
| | $d_{12} = 0.1200$ | | |
| $r_{13} =$ | 62.8476 | | |
| | $d_{13} = 3.6724$ | $n_7 = 1.84666$ | $v_7 = 23.88$ |
| $r_{14} =$ | 23.5782 | | |
| | $d_{14} = 3.3820$ | $n_8 = 1.69680$ | $v_8 = 56.49$ |
| $r_{15} =$ | 250.1688 | | |
| | $d_{15} = 0.1000$ | | |
| $r_{16} =$ | 24.6446 | | |
| | $d_{16} = 3.9206$ | $n_9 = 1.61700$ | $v_9 = 62.79$ |
| $r_{17} =$ | −103.4564 | | |
| | $d_{17} = D_2$ (variable) | | |
| $r_{18} =$ | ∞ (stop) | | |
| | $d_{18} = 1.0000$ | | |
| $r_{19} =$ | −228.5059 | | |
| | $d_{19} = 1.6067$ | $n_{10} = 1.84666$ | $v_{10} = 23.88$ |
| $r_{20} =$ | −29.6935 | | |
| | $d_{20} = 1.3807$ | $n_{11} = 1.50378$ | $v_{11} = 66.81$ |
| $r_{21} =$ | −20.6660 | | |
| | $d_{21} = 0.2447$ | | |
| $r_{22} =$ | −18.8590 | | |
| | $d_{22} = 1.1000$ | $n_{12} = 1.74320$ | $v_{12} = 49.31$ |
| $r_{23} =$ | 26.0834 | | |
| | $d_{23} = D_3$ (variable) | | |
| $r_{24} =$ | −180.3876 | | |
| | $d_{24} = 3.1619$ | $n_{13} = 1.60300$ | $v_{13} = 65.48$ |
| $r_{25} =$ | −23.5483 | | |
| | $d_{25} = 0.1000$ | | |
| $r_{26} =$ | 1970.0412 | | |
| | $d_{26} = 5.2686$ | $n_{14} = 1.49700$ | $v_{14} = 81.61$ |
| $r_{27} =$ | −16.9041 | | |
| | $d_{27} = 0.1670$ | | |
| $r_{28} =$ | −16.8370 | | |
| | $d_{28} = 1.1000$ | $n_{15} = 1.83400$ | $v_{15} = 37.16$ |
| $r_{29} =$ | −51.9298 | | |
| | $d_{29} = D_4$ (variable) | | |
| $r_{30} =$ | −92.3954 | | |
| | $d_{30} = 3.2285$ | $n_{16} = 1.61700$ | $v_{16} = 62.79$ |
| $r_{31} =$ | −38.2959 | | | aspherical surface coefficient
(2nd surface)
$P = 1.0000$, $E = -0.17510 \times 10^{-4}$,
$F = -0.13193 \times 10^{-7}$, $G = 0.56055 \times 10^{-10}$,
$H = -0.77772 \times 10^{-13}$
(6th surface)
$P = 1.0000$, $E = 0.81144 \times 10^{-5}$,
$F = -0.22960 \times 10^{-9}$, $G = -0.12606 \times 10^{-9}$,
$H = 0.91554 \times 10^{-13}$

| f | 21.7 | 32.8 | 49.1 |
|---|---|---|---|
| $D_1$ | 24.295 | 10.044 | 1.553 |
| $D_2$ | 1.700 | 5.823 | 12.218 |
| $D_3$ | 9.348 | 9.115 | 2.870 |
| $D_4$ | 0.880 | 11.241 | 19.580 |

$\phi_{12W}/\phi_W = 1.261$, $\phi_{34W}/\phi_W = -0.1957$, $\beta_{2W} = -0.5723$,
$\beta_{2T} = -1.1200$, $\beta_{3W}\beta_{4W} = 1.94446$, $\beta_{3T}\beta_{4T} = 4.0916$,
$X_2/X_4 = 1.216$, $d_6 = 3.320$ (object distance 1.4 m)

Embodiment 6

$f = 40.2 \sim 59.8$, $F/2.2 \sim F/2.1$, $2\omega = 56.6° \sim 29.7°$

| | | | |
|---|---|---|---|
| $r_1 =$ | 4687.3004 | | |
| | $d_1 = 1.0659$ | $n_1 = 1.83400$ | $v_1 = 37.16$ |
| $r_2 =$ | 45.8358 | | |
| | $d_2 = 3.8079$ | | |
| $r_3 =$ | 229.7202 | | |
| | $d_3 = 1.6132$ | $n_2 = 1.59551$ | $v_2 = 39.21$ |
| $r_4 =$ | 83.4386 | | |
| | $d_4 = 0.5371$ | | |
| $r_5 =$ | 52.4821 | | |
| | $d_5 = 4.6611$ | $n_3 = 1.84666$ | $v_3 = 23.78$ |
| $r_6 =$ | 501.6307 | | |
| | $d_6 = 2.9855$ | | |
| $r_7 =$ | −74.9661 | | |
| | $d_7 = 1.1233$ | $n_4 = 1.53113$ | $v_4 = 62.44$ |
| $r_8 =$ | 145.1070 | | |
| | $d_8 = 1.3367$ | $n_5 = 1.74000$ | $v_5 = 28.29$ |
| $r_9 =$ | 165.9146 | | |
| | $d_9 = D_1$ (variable) | | |
| $r_{10} =$ | 141.5455 | | |
| | $d_{10} = 5.1678$ | $n_6 = 1.80610$ | $v_6 = 40.95$ |
| $r_{11} =$ | −73.4960 | | |
| | $d_{11} = 0.6914$ | | |
| $r_{12} =$ | 65.2771 | | |
| | $d_{12} = 1.5768$ | $n_7 = 1.83400$ | $v_7 = 37.16$ |
| $r_{13} =$ | 43.8078 | | |
| | $d_{13} = 9.1667$ | $n_8 = 1.69680$ | $v_8 = 55.52$ |
| $r_{14} =$ | −43.8874 | | |
| | $d_{14} = 1.7200$ | $n_9 = 1.84666$ | $v_9 = 23.78$ |
| $r_{15} =$ | −615.6574 | | |
| | $d_{15} = D_2$ (variable) | | |
| $r_{16} =$ | ∞ (stop) | | |
| | $d_{16} = 4.1118$ | | |
| $r_{17} =$ | 93.4452 | | |
| | $d_{17} = 2.4287$ | $n_{10} = 1.80518$ | $v_{10} = 25.43$ |
| $r_{18} =$ | 47.9971 | | |
| | $d_{18} = 1.4966$ | | |
| $r_{19} =$ | 30.8331 | | |
| | $d_{19} = 3.4154$ | $n_{11} = 1.53172$ | $v_{11} = 48.90$ |
| $r_{20} =$ | 99.3872 | | |
| | $d_{20} = 2.4598$ | | |
| $r_{21} =$ | −39.9044 | | |
| | $d_{21} = 1.4714$ | $n_{12} = 1.60311$ | $v_{12} = 60.70$ |
| $r_{22} =$ | 23.8495 | | |
| | $d_{22} = 3.3323$ | $n_{13} = 1.84666$ | $v_{13} = 23.78$ |
| $r_{23} =$ | 54.7600 | | |
| | $d_{23} = D_3$ (variable) | | |
| $r_{24} =$ | −3276.4132 | | |
| | $d_{24} = 1.3122$ | $n_{14} = 1.80518$ | $v_{14} = 25.43$ |
| $r_{25} =$ | 54.6188 | | |
| | $d_{25} = 0.5381$ | | |
| $r_{26} =$ | 96.7077 | | |
| | $d_{26} = 1.2188$ | $n_{15} = 1.84666$ | $v_{15} = 23.78$ |
| $r_{27} =$ | 44.4318 | | |
| | $d_{27} = 6.9330$ | $n_{16} = 1.62280$ | $v_{16} = 57.06$ |
| $r_{28} =$ | −30.7540 | | |
| | $d_{28} = 0.0630$ | | |
| $r_{29} =$ | 69.3400 | | |
| | $d_{29} = 5.9497$ | $n_{17} = 1.80610$ | $v_{17} = 40.95$ |
| $r_{30} =$ | −2091.2177 | | |

| f | 40.2 | 50.1 | 59.8 |
|---|---|---|---|
| $D_1$ | 17.698 | 8.738 | 2.261 |
| $D_2$ | 2.031 | 10.660 | 17.707 |
| $D_3$ | 7.034 | 5.254 | 2.087 |

$\phi_{12W}/\phi_W = 0.7229$, $\phi_{34W}/\phi_W = 0.482$, $\beta_{2W} = -1.0300$,
$\beta_{2T} = -1.675$, $\beta_{3W}\beta_{4W} = 0.7289$, $\beta_{3T}\beta_{4T} = 23.5560$,
$X_2/X_4 = 3.0233$, $d_6 = 20.153$

| Embodiment 7 | | |
|---|---|---|
| $f = 40.1 \sim 59.9$, | $F/2.2 \sim F/2.2$ | $2\omega = 56.7° \sim 39.7°$ |
| $r_1 = 7066.1589$ | | |
| $d_1 = 1.1762$ | $n_1 = 1.83400$ | $\nu_1 = 37.16$ |
| $r_2 = 45.3679$ | | |
| $d_2 = 3.8512$ | | |
| $r_3 = 234.2121$ | | |
| $d_3 = 1.6140$ | $n_2 = 1.59551$ | $\nu_2 = 39.21$ |
| $r_4 = 81.1349$ | | |
| $d_4 = 0.4993$ | | |
| $r_5 = 53.0793$ | | |
| $d_5 = 4.6837$ | $n_3 = 1.84666$ | $\nu_3 = 23.78$ |
| $r_6 = 563.0834$ | | |
| $d_6 = 2.4928$ | | |
| $r_7 = -95.0232$ | | |
| $d_7 = 1.1991$ | $n_4 = 1.53113$ | $\nu_4 = 62.44$ |
| $r_8 = 202.8226$ | | |
| $d_8 = 1.3991$ | $n_5 = 1.74000$ | $\nu_5 = 28.29$ |
| $r_9 = 134.4132$ | | |
| $d_9 = D_1$ (variable) | | |
| $r_{10} = 105.7047$ | | |
| $d_{10} = 5.2659$ | $n_6 = 1.80610$ | $\nu_6 = 40.95$ |
| $r_{11} = -82.9131$ | | |
| $d_{11} = 0.7038$ | | |
| $r_{12} = 57.6589$ | | |
| $d_{12} = 1.5955$ | $n_7 = 1.83400$ | $\nu_7 = 37.16$ |
| $r_{13} = 44.7414$ | | |
| $d_{13} = 9.1937$ | $n_8 = 1.69680$ | $\nu_8 = 55.52$ |
| $r_{14} = -48.9894$ | | |
| $d_{14} = 1.8041$ | $n_9 = 1.84666$ | $\nu_9 = 23.78$ |
| $r_{15} = -3333.4457$ | | |
| $d_{15} = D_2$ (variable) | | |
| $r_{16} = \infty$ (stop) | | |
| $d_{16} = 4.1772$ | | |
| $r_{17} = 101.5239$ | | |
| $d_{17} = 2.5241$ | $n_{10} = 1.80518$ | $\nu_{10} = 25.43$ |
| $r_{18} = 45.9697$ | | |
| $d_{18} = 1.6219$ | | |
| $r_{19} = 34.5520$ | | |
| $d_{19} = 3.5052$ | $n_{11} = 1.53172$ | $\nu_{11} = 48.90$ |
| $r_{20} = 124.3129$ | | |
| $d_{20} = 2.4994$ | | |
| $r_{21} = -38.4675$ | | |
| $d_{21} = 1.5667$ | $n_{12} = 1.60311$ | $\nu_{12} = 60.70$ |
| $r_{22} = 23.5327$ | | |
| $d_{22} = 3.4095$ | $n_{13} = 1.84666$ | $\nu_{13} = 23.78$ |
| $r_{23} = 61.0593$ | | |
| $d_{23} = D_3$ (variable) | | |
| $r_{24} = -504.2578$ | | |
| $d_{24} = 1.3495$ | $n_{14} = 1.80518$ | $\nu_{14} = 25.43$ |
| $r_{25} = 53.4891$ | | |
| $d_{25} = 0.6071$ | | |
| $r_{26} = 97.8294$ | | |
| $d_{26} = 1.2996$ | $n_{15} = 1.84666$ | $\nu_{15} = 23.78$ |
| $r_{27} = 41.4667$ | | |
| $d_{27} = 7.0261$ | $n_{16} = 1.62280$ | $\nu_{16} = 57.06$ |
| $r_{28} = -30.3024$ | | |
| $d_{28} = 0.2564$ | | |
| $r_{29} = 50.9312$ | | |
| $d_{29} = 6.1001$ | $n_{17} = 1.80610$ | $\nu_{17} = 40.95$ |
| $r_{30} = 312.7578$ | | |
| f | 40.1 | 50.0 | 59.9 |
| $D_1$ | 16.965 | 8.963 | 2.491 |
| $D_2$ | 1.497 | 10.800 | 18.152 |
| $D_3$ | 6.706 | 5.430 | 2.192 |

$\phi_{12W}/\phi_W = 0.803$, $\phi_{34W}/\phi_W = 0.4819$, $\beta_{2W} = -0.9557$,
$\beta_{2T} = -1.493$, $\beta_{3W}\beta_{4W} = 0.80469$, $\beta_{3T}\beta_{4T} = 20.6452$,
$X_2/X_4 = 5.8460$

| Embodiment 8 | | |
|---|---|---|
| $f = 36.2 \sim 131.0$, | $F/4.6 \sim F/5.8$, | $2\omega = 60.3° \sim 35.12°$ |
| $r_1 = -223.0764$ (aspherical surface) | | |
| $d_1 = 1.8500$ | $n_1 = 1.76182$ | $\nu_1 = 26.55$ |
| $r_2 = -93.5144$ | | |
| $d_2 = 0.1200$ | | |
| $r_3 = -116.7127$ | | |
| $d_3 = 0.8500$ | $n_2 = 1.81554$ | $\nu_2 = 44.36$ |
| $r_4 = 28.7056$ | | |
| $d_4 = 0.1200$ | | |
| $r_5 = 27.6554$ | | |
| $d_5 = 4.8500$ | $n_3 = 1.84666$ | $\nu_3 = 23.88$ |
| $r_6 = 75.2765$ | | |
| $d_6 = 0.8340$ | | |
| $r_7 = 94.2680$ | | |
| $d_7 = 2.0000$ | $n_4 = 1.48749$ | $\nu_4 = 70.20$ |
| $r_8 = -325.4895$ | | |
| $d_8 = 0.8000$ | $n_5 = 1.69680$ | $\nu_5 = 55.52$ |
| $r_9 = 37.8726$ | | |
| $d_9 = D_1$ (variable) | | |
| $r_{10} = 38.7791$ (aspherical surface) | | |
| $d_{10} = 1.0000$ | $n_6 = 1.85026$ | $\nu_6 = 32.28$ |
| $r_{11} = 19.8769$ | | |
| $d_{11} = 6.2000$ | $n_7 = 1.69680$ | $\nu_7 = 55.52$ |
| $r_{12} = -74.0633$ | | |
| $d_{12} = 0.5500$ | $n_8 = 1.84666$ | $\nu_8 = 23.88$ |
| $r_{13} = -358.8865$ | | |
| $d_{13} = 0.1200$ | | |
| $r_{14} = 37.0599$ | | |
| $d_{14} = 3.5000$ | $n_9 = 1.49700$ | $\nu_9 = 81.61$ |
| $r_{15} = -226.1367$ | | |
| $d_{15} = 0.1200$ | | |
| $r_{16} = 35.5491$ | | |
| $d_{16} = 3.0000$ | $n_{10} = 1.49700$ | $\nu_{10} = 81.61$ |
| $r_{17} = 153.6430$ (aspherical surface) | | |
| $d_{17} = D_2$ (variable) | | |
| $r_{18} = \infty$ (stop) | | |
| $d_{18} = 2.0000$ | | |
| $r_{19} = 341.9337$ | | |
| $d_{19} = 1.9100$ | $n_{11} = 1.53358$ | $\nu_{11} = 51.56$ |
| $r_{20} = 20.0111$ | | |
| $d_{20} = 3.7582$ | | |
| $r_{21} = -20.8036$ | | |
| $d_{21} = 0.6500$ | $n_{12} = 1.51821$ | $\nu_{12} = 65.04$ |
| $r_{22} = 21.9088$ | | |
| $d_{22} = 2.1500$ | $n_{13} = 1.72825$ | $\nu_{13} = 28.46$ |
| $r_{23} = -298.0561$ | | |
| $d_{23} = D_3$ (variable) | | |
| $r_{24} = -167.0599$ | | |
| $d_{24} = 2.5000$ | $n_{14} = 1.53113$ | $\nu_{14} = 62.44$ |
| $r_{25} = -35.3445$ | | |
| $d_{25} = 0.1000$ | | |
| $r_{26} = -435.8022$ | | |
| $d_{26} = 5.8500$ | $n_{15} = 1.48749$ | $\nu_{15} = 70.20$ |
| $r_{27} = -14.4781$ | | |
| $d_{27} = 0.1200$ | | |
| $r_{28} = -14.4036$ | | |
| $d_{28} = 0.8500$ | $n_{16} = 1.83400$ | $\nu_{16} = 37.16$ |
| $r_{29} = -28.0912$ | | |
| $d_{29} = D_4$ (variable) | | |
| $r_{30} = -250.4406$ | | |
| $d_{30} = 2.2000$ | $n_{17} = 1.57135$ | $\nu_{17} = 52.92$ |
| $r_{31} = -132.5105$ | | | aspherical surface coefficient
(1st surface)
$P = 1.0000$, $E = 0.40108 \times 10^{-6}$,
$F = -0.17260 \times 10^{-8}$, $G = 0.22527 \times 10^{-11}$, -continued

Embodiment 8

H = -0.19554 × 10$^{-14}$
(10th surface)

| | |
|---|---|
| P = 1.0000, | E = 0.80578 × 10$^{-6}$, |
| F = 0.38063 × 10$^{-8}$, | G = -0.12553 × 10$^{-10}$, |
| H = 0.26607 × 10$^{-13}$, | |

(17th surface)

| | |
|---|---|
| P = 1.0000, | E = 0.18796 × 10$^{-5}$, |
| F = 0.16898 × 10$^{-8}$, | G = -0.30787 × 10$^{-10}$, |
| H = 0.97607 × 10$^{-13}$ | |

| f | 36.2 | 66.2 | 131.0 |
|---|---|---|---|
| D$_1$ | 39.258 | 17.095 | 0.650 |
| D$_2$ | 4.907 | 7.939 | 23.965 |
| D$_3$ | 10.682 | 6.011 | 0.500 |
| D$_4$ | 0.650 | 24.457 | 30.395 |

$\phi_{12W}/\phi_W$ = 2.0395, $\phi_{34W}/\phi_W$ = -0.37317
$\beta_{2W}$ = -0.45323, $\beta_{2T}$ = -1.3915
$\beta_{3W}\beta_{4W}$ = 2.2041, $\beta_{3T}\beta_{4T}$ = 2.6014
$X_2/X_4$ = 1.2985 wherein the reference symbols $r_1$, $r_2$, ... represent radii of curvature on respective lens elements, the reference symbols $d_1$, $d_2$, ... designate thicknesses of the respective lens elements and airspaces disposed therebetween, the reference symbols $n_1$, $n_2$, ... denote refractive indices of the respective lens elements, and the reference symbols $\nu_1$, $\nu_2$, ... represent Abbe's numbers of the respective lens elements.

The first through fourth embodiments are zoom lens systems which have compositions illustrated in FIG. 7 through FIG. 10 respectively and have high vari-focal ratios covering broad ranges from wide positions to tele positions. Each of these zoom lens systems is designed so as to have a total length which is not varied by zooming nor focusing, comprises a fifth lens unit which is always kept fixed, applies no pressure to a film and is compatible with a water proof or drip-proof moving mechanism.

In each of these zoom lens systems, the first lens unit consists of three lens components and the second lens component is moved along the optical axis for focusing.

Figure 15:
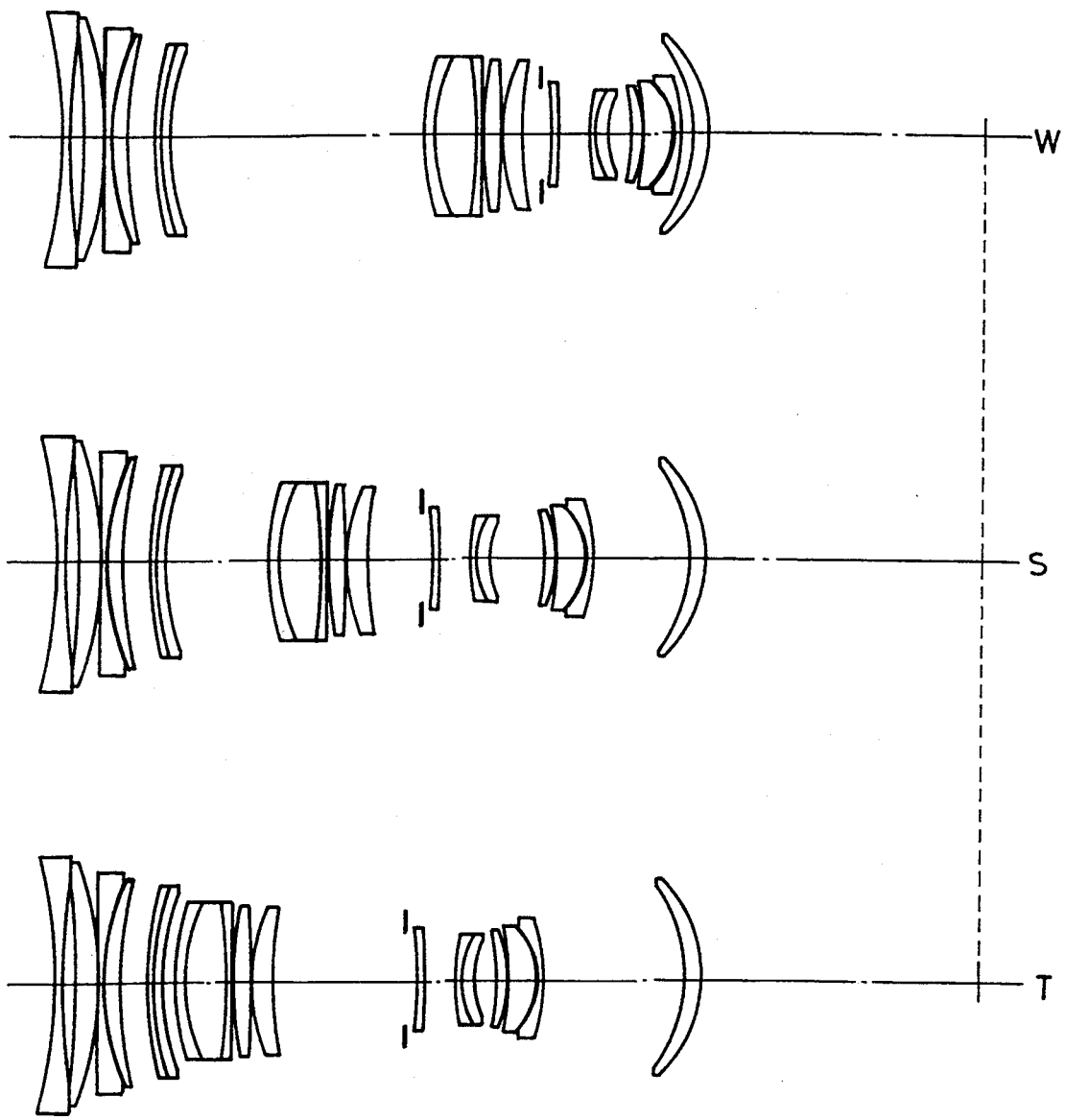
FIG. 15 shows sectional views illustrating a disposition of the lens units in the first embodiment when it is focused on an object located at a short distance.
Figure 16:
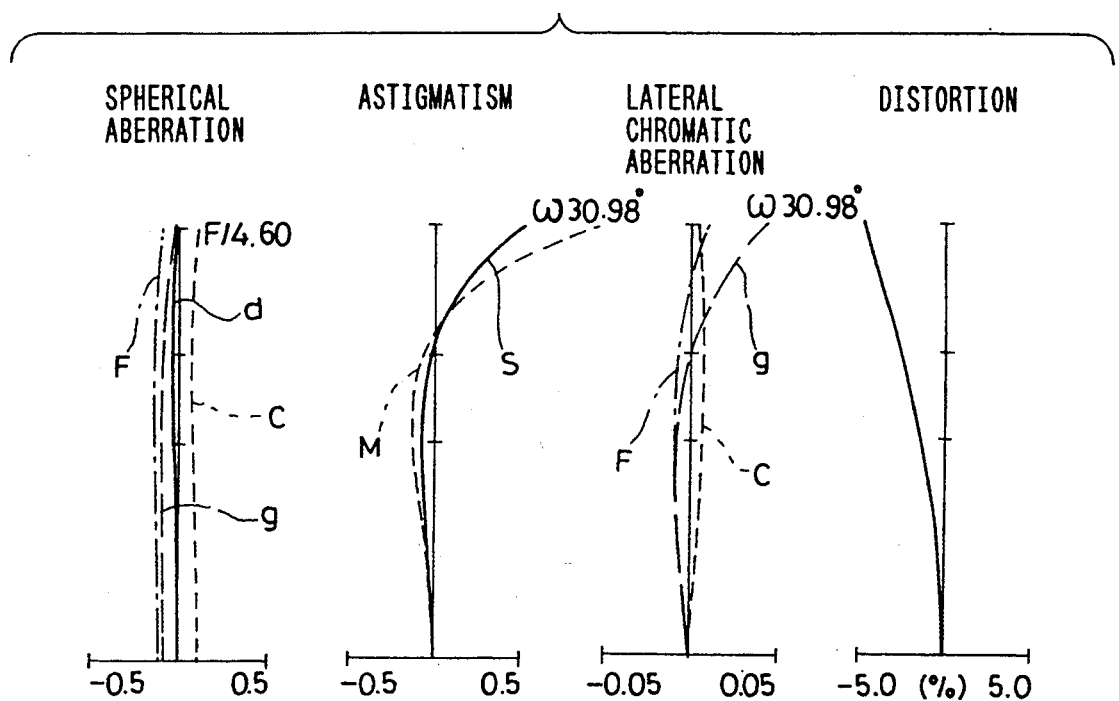
FIG. 16 shows graphs illustrating aberration characteristics at the wide position of the first embodiment for the object located at the infinite distance.
Figure 17:
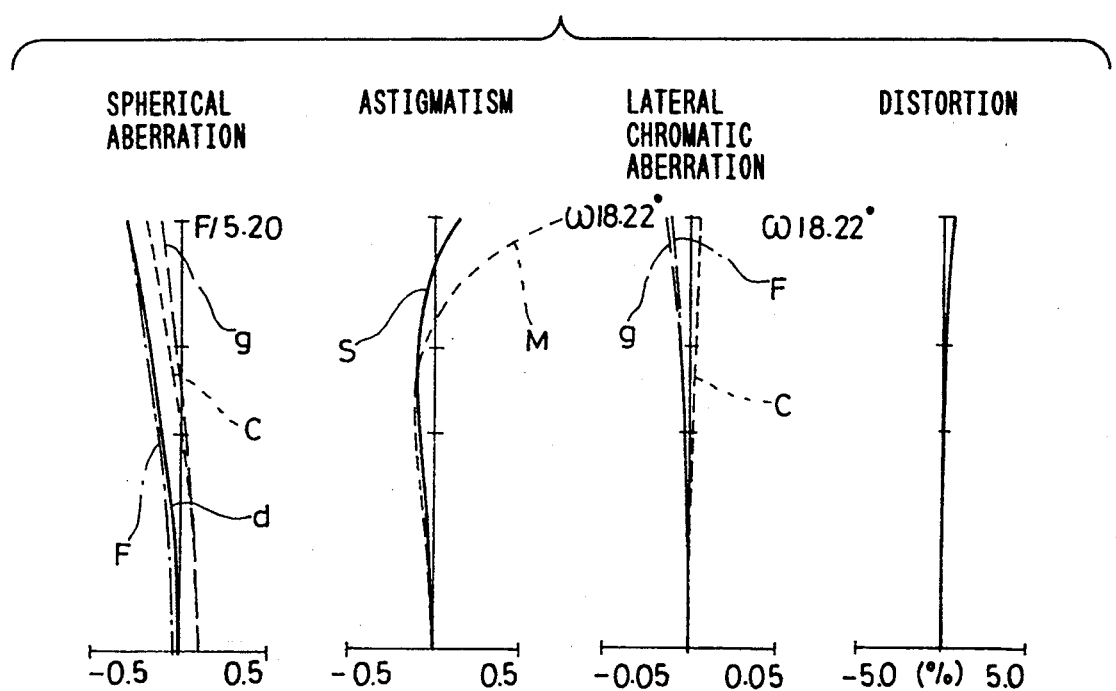
FIG. 17 shows graphs illustrating aberration characteristics at the intermediate focal length of the first embodiment for the object located at the infinite distance.
Figure 18:
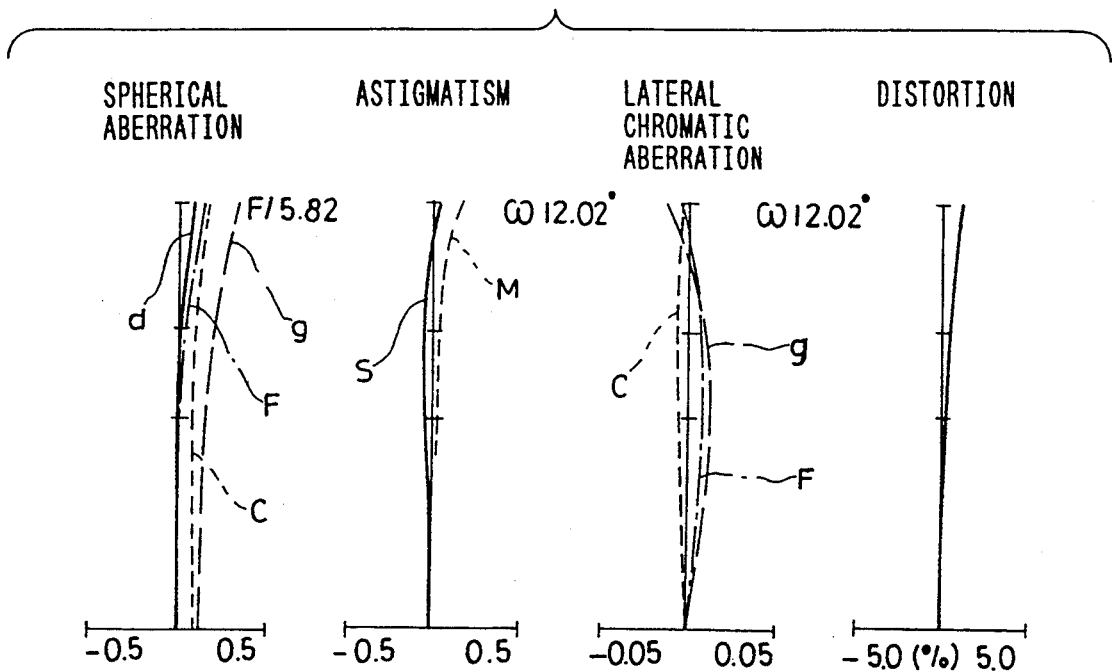
FIG. 18 shows curves illustrating aberration characteristics at the tele position of the first embodiment for the object located at the infinite distance.
Figure 19:
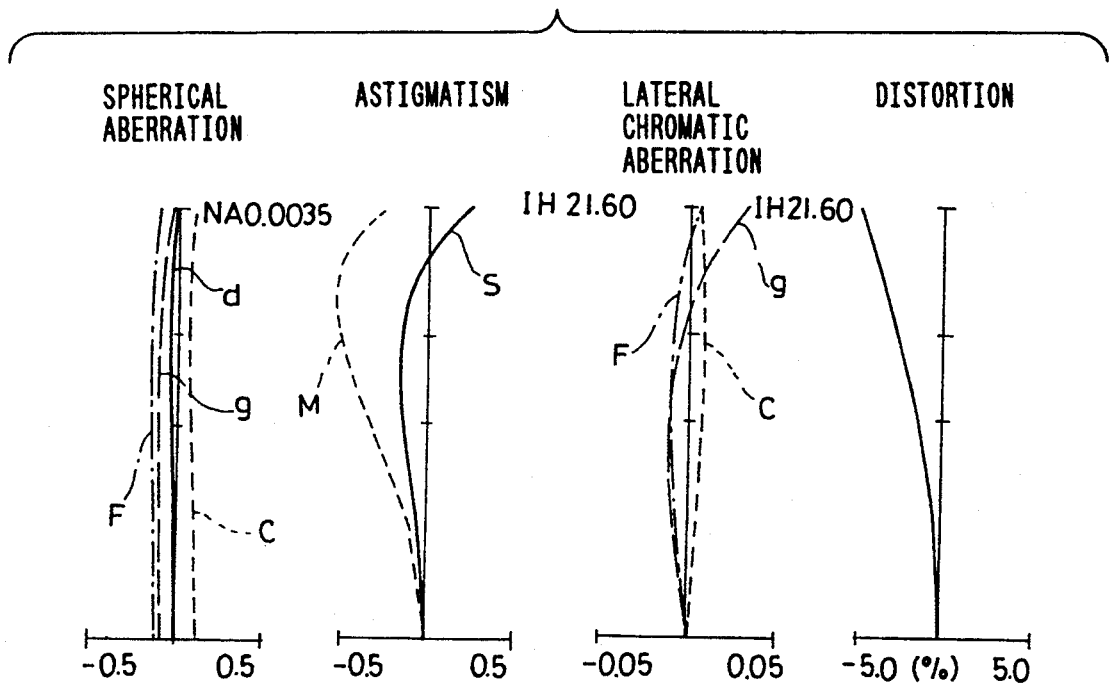
FIG. 19 shows curves illustrating aberration characteristics at the wide position of the first embodiment for an object located at a distance of 1 m.
Figure 20:
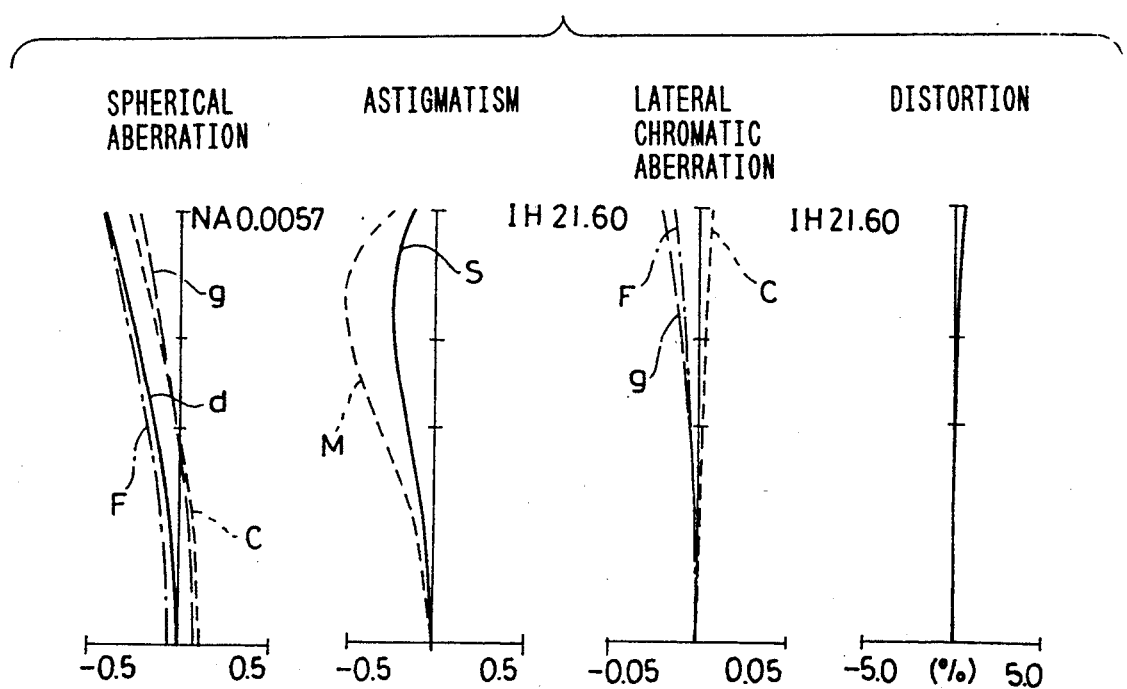
FIG. 20 shows curves illustrating aberration characteristics at the intermediate focal length of the first embodiment for the object located at the distance of 1 m.
Figure 21:
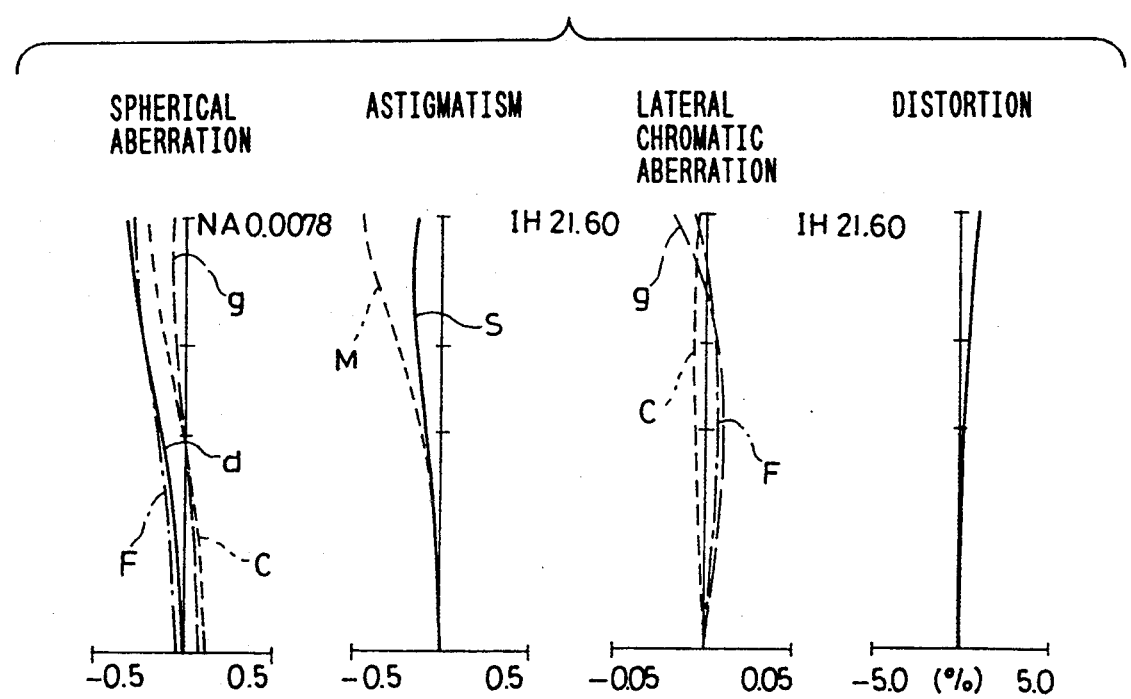
FIG. 21 shows curves illustrating aberration characteristics at the tele position of the first embodiment for the object located at the distance of 1 m.
Figure 22:
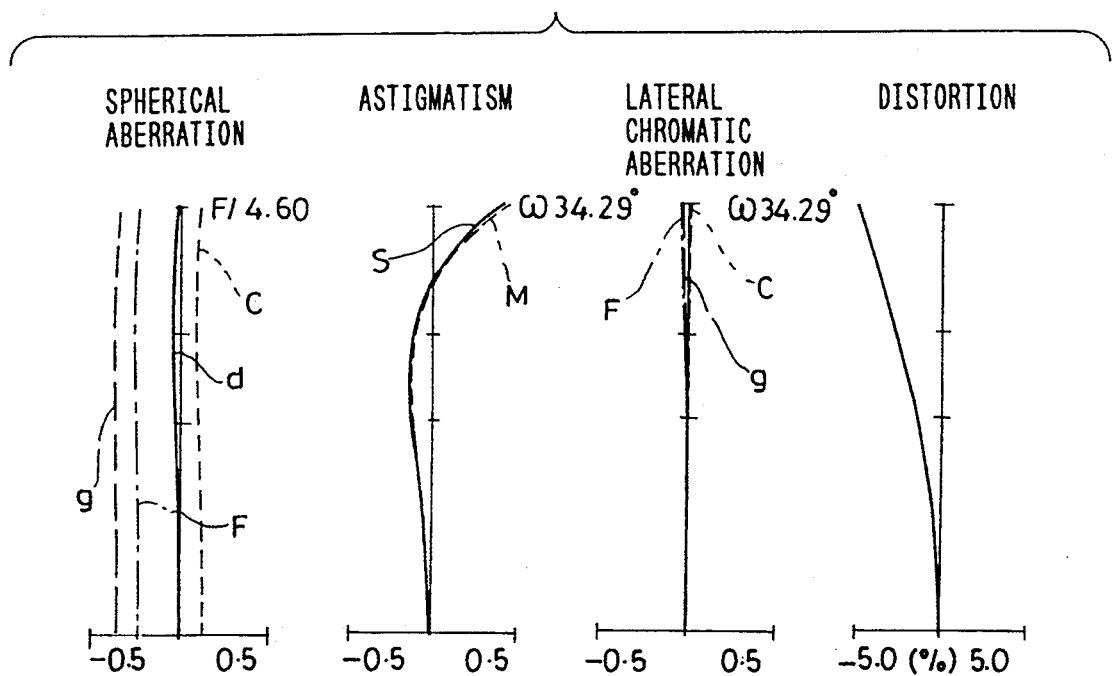
FIG. 22 shows graphs illustrating aberration characteristics at the wide position of the second embodiment for the object located at the infinite distance.
Figure 23:
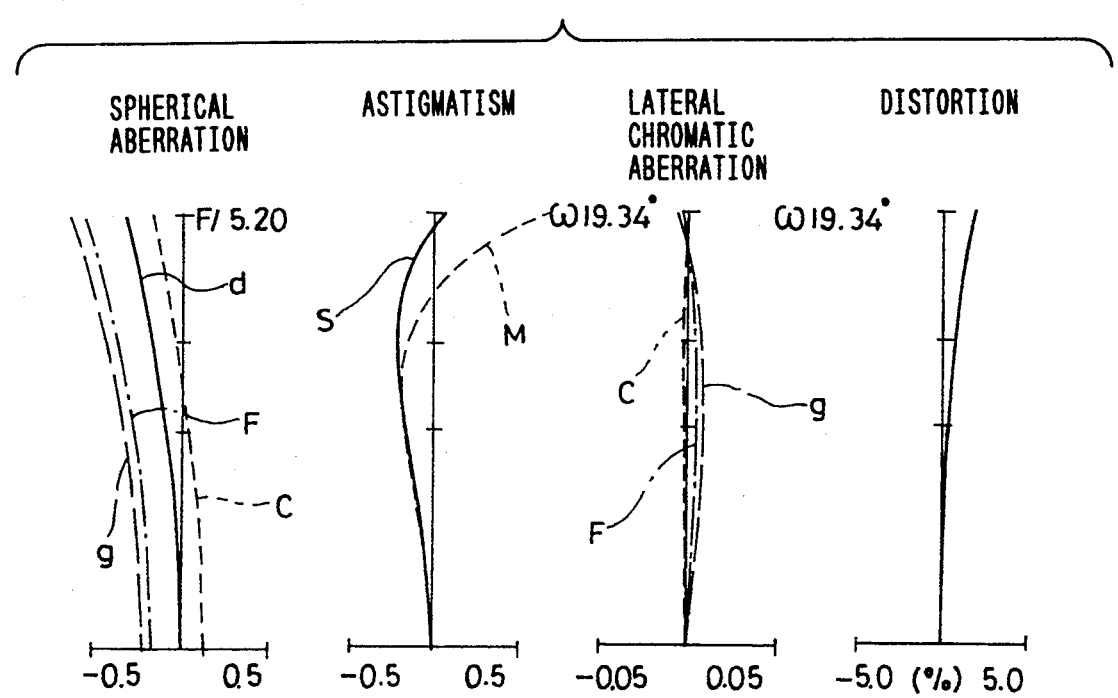
FIG. 23 shows graphs illustrating aberration characteristics at the intermediate focal length of the second embodiment for the object located at the infinite distance.
Figure 24:
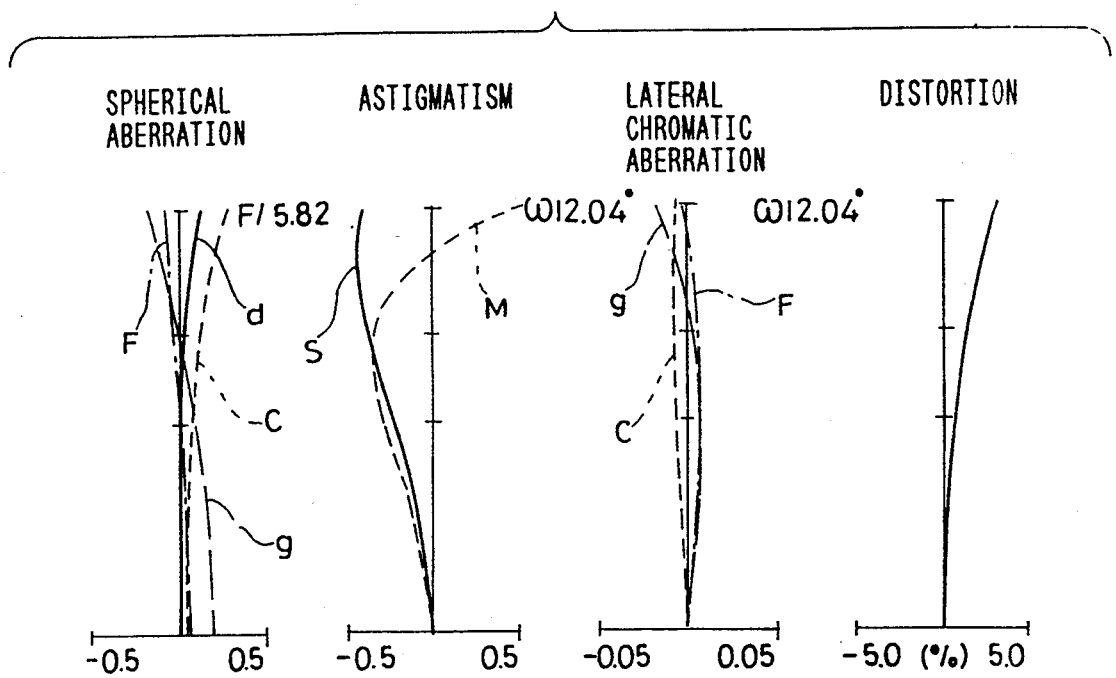
FIG. 24 shows curves illustrating aberration characteristics at the tele position of the second embodiment for the object located at the infinite distance.
Figure 25:
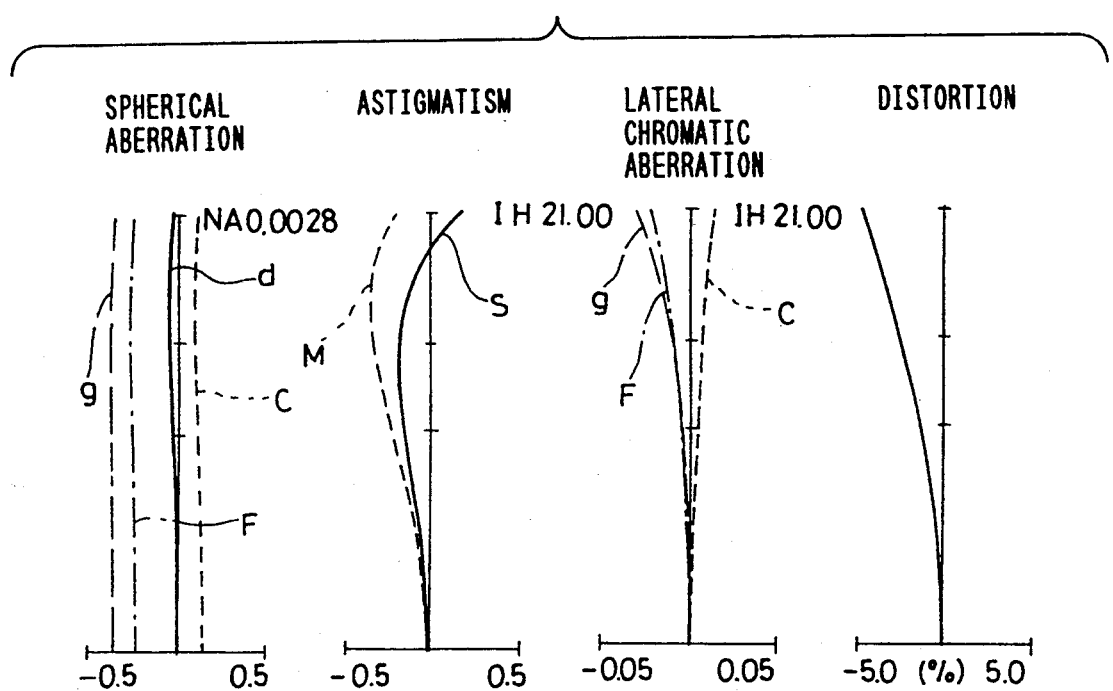
FIG. 25 shows curves illustrating aberration characteristics at the wide position of the second embodiment for the object located at the distance of 1 m.
Figure 26:
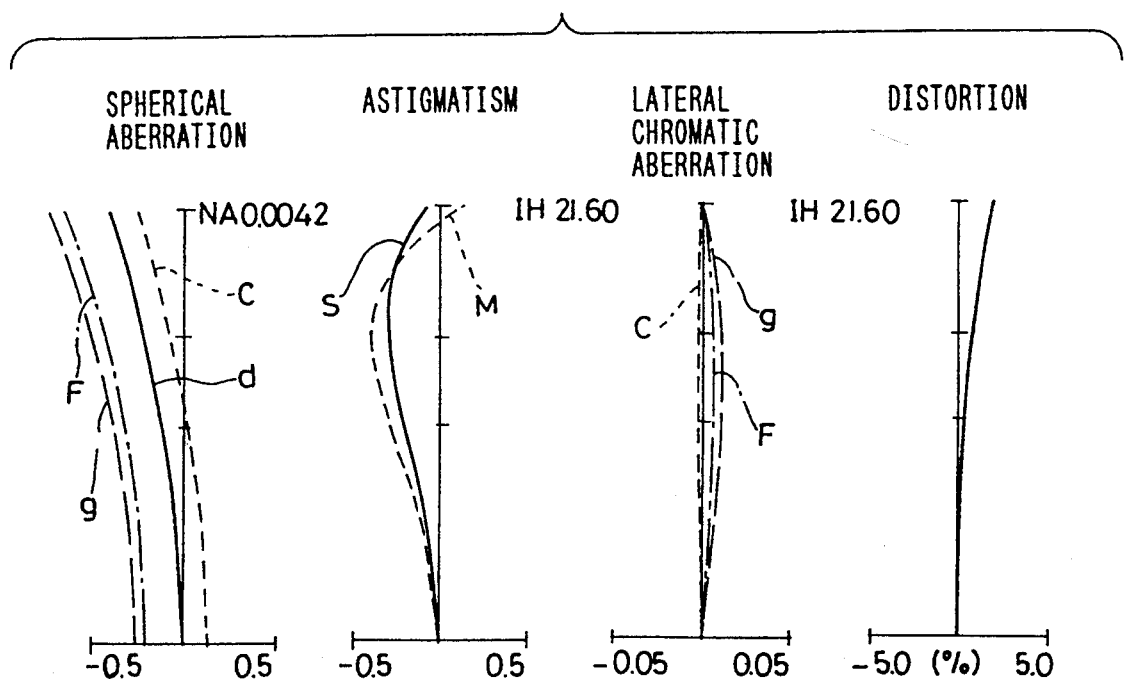
FIG. 26 shows curves illustrating aberration characteristics at the intermediate focal length of the second embodiment for the object located at the distance of 1 m.
Figure 27:
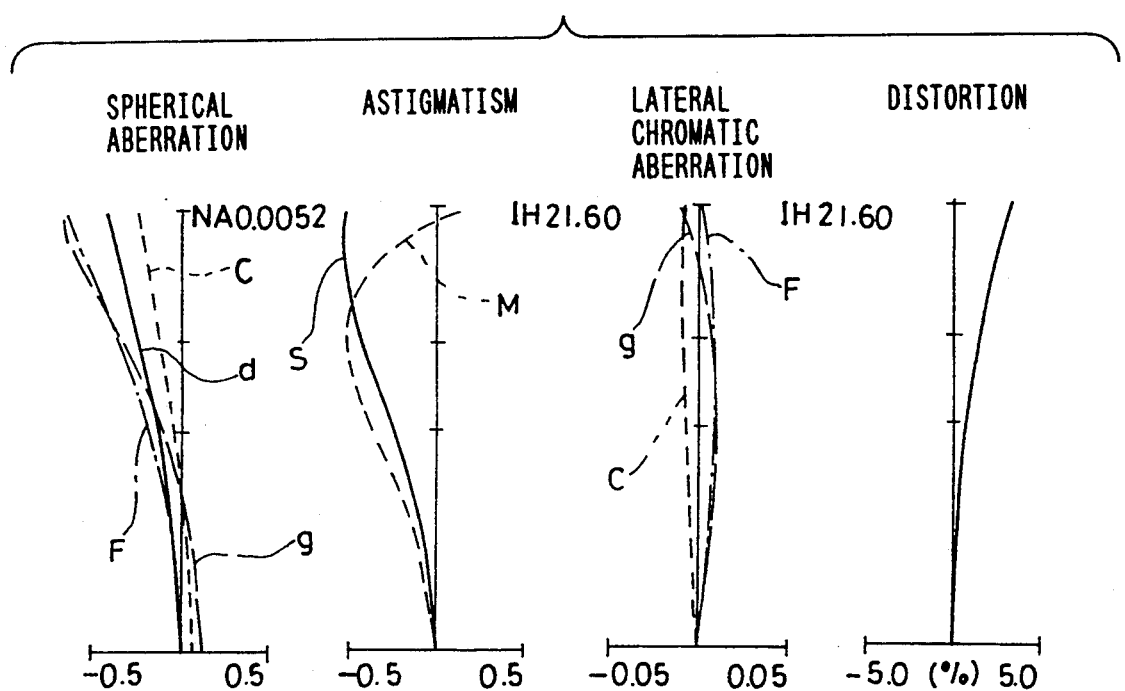
FIG. 27 shows curves illustrating aberration characteristics at the tele position of the second embodiment for the object located at the distance of 1 m.
Figure 28:
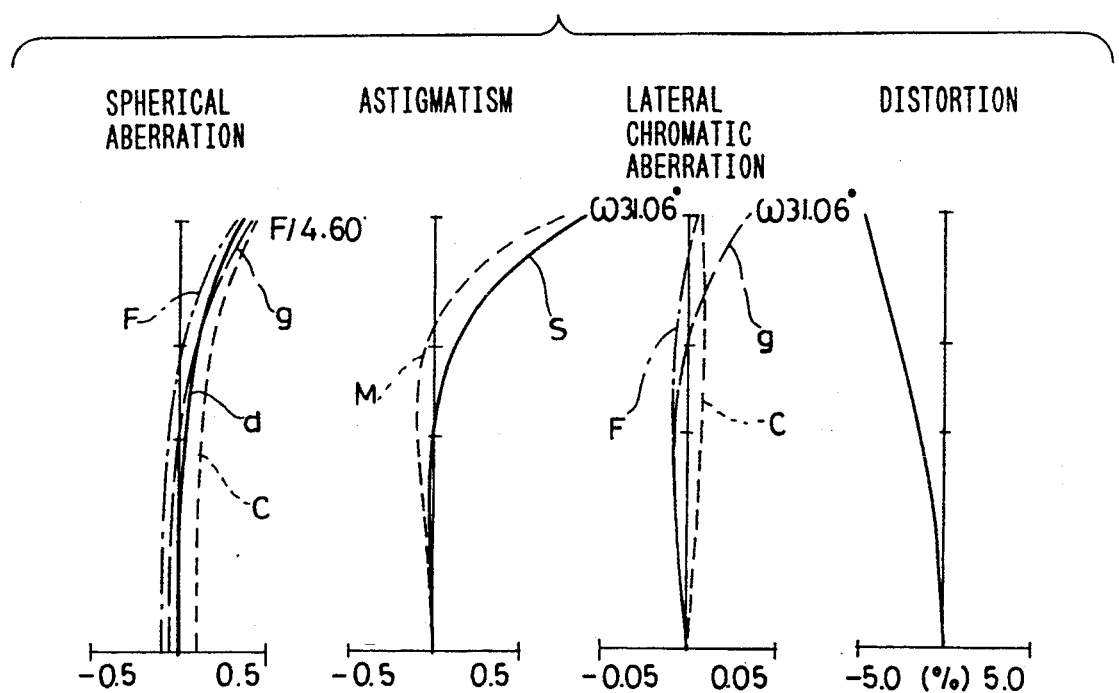
FIG. 28 shows curves illustrating aberration characteristics at the wide position of the third embodiment for the object located at the infinite distance.
Figure 29:
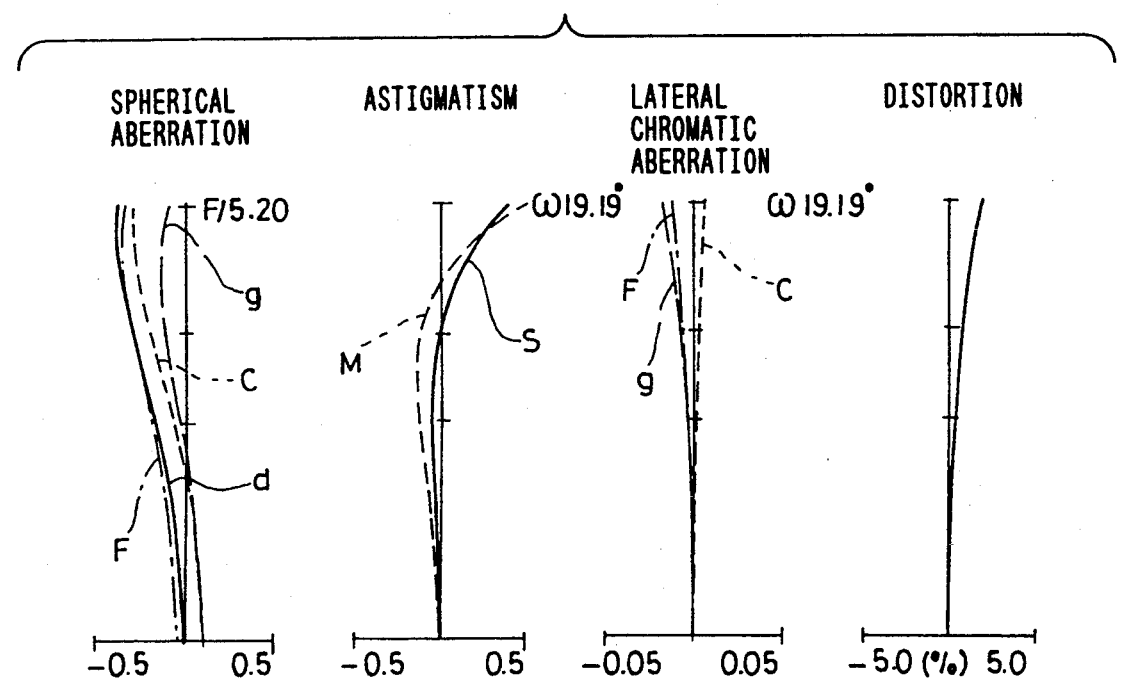
FIG. 29 shows graphs illustrating aberration characteristics at intermediate focal length of the third embodiment for the object located at the infinite distance.
Figure 30:
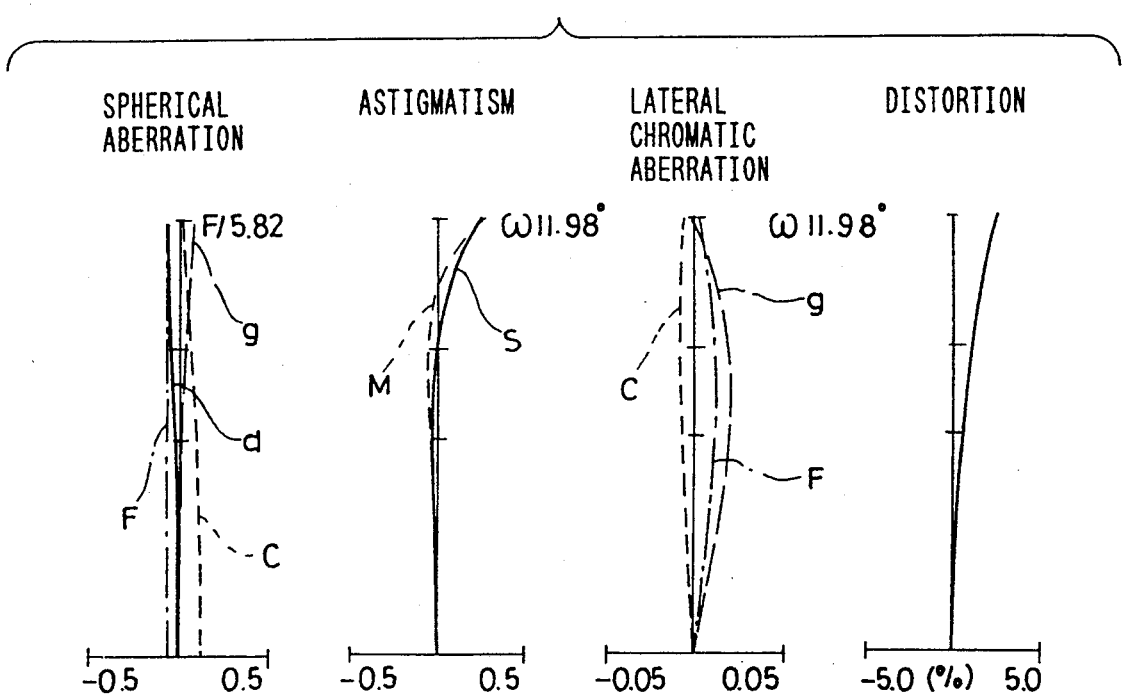
FIG. 30 shows graphs illustrating aberration characteristics at the tele position of the third embodiment for the object located at the infinite distance.
Figure 31:
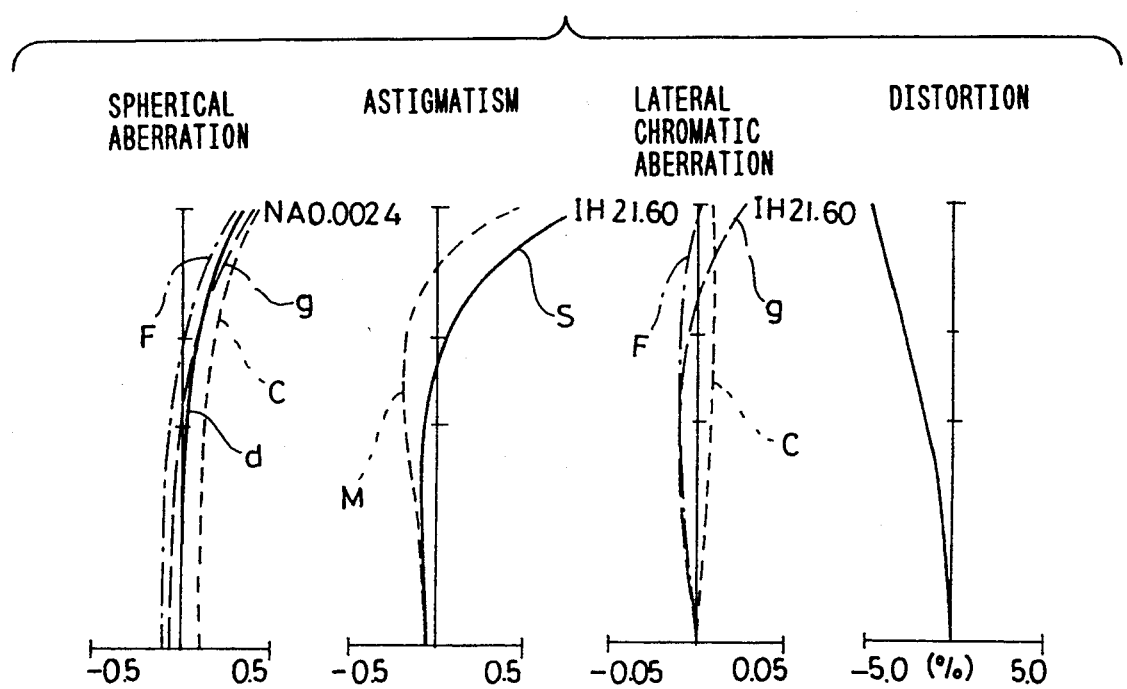
FIG. 31 shows curves illustrating aberration characteristics at the wide position of the third embodiment for the object located at the distance of 1 m.
Figure 32:
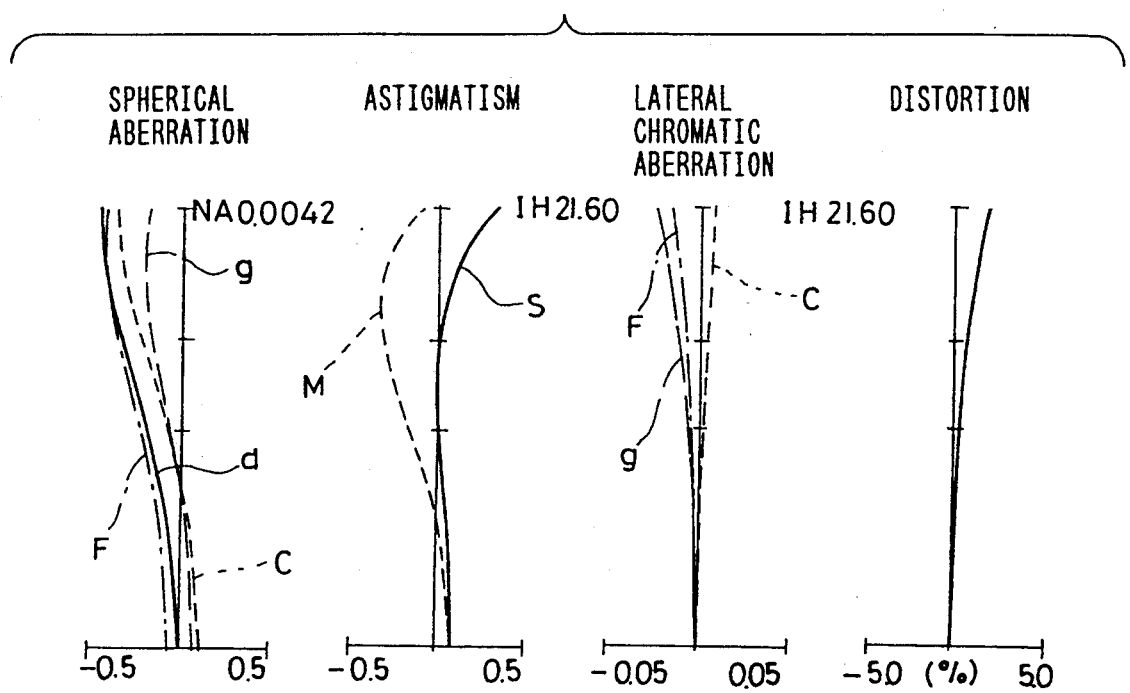
FIG. 32 shows curves illustrating aberration characteristics at the intermediate focal length of the third embodiment for the object located at the distance of 1 m.
Figure 33:
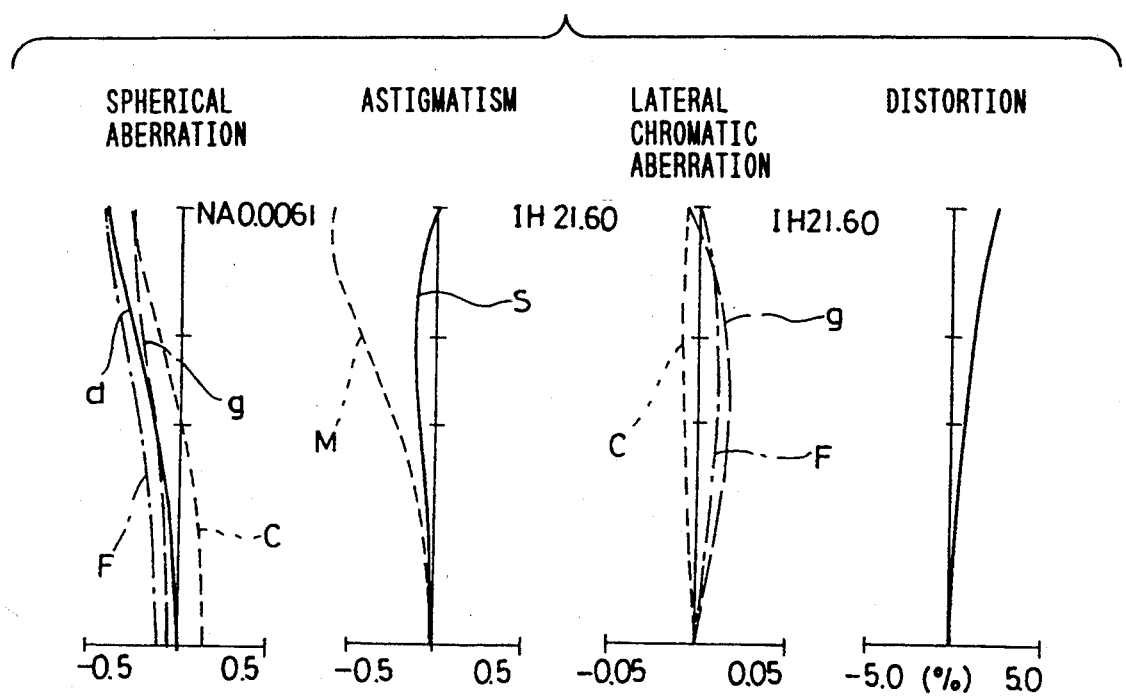
FIG. 33 shows curves illustrating aberration characteristics at the tele position of the third embodiment for the object located at the distance of 1 m.
Figure 34:
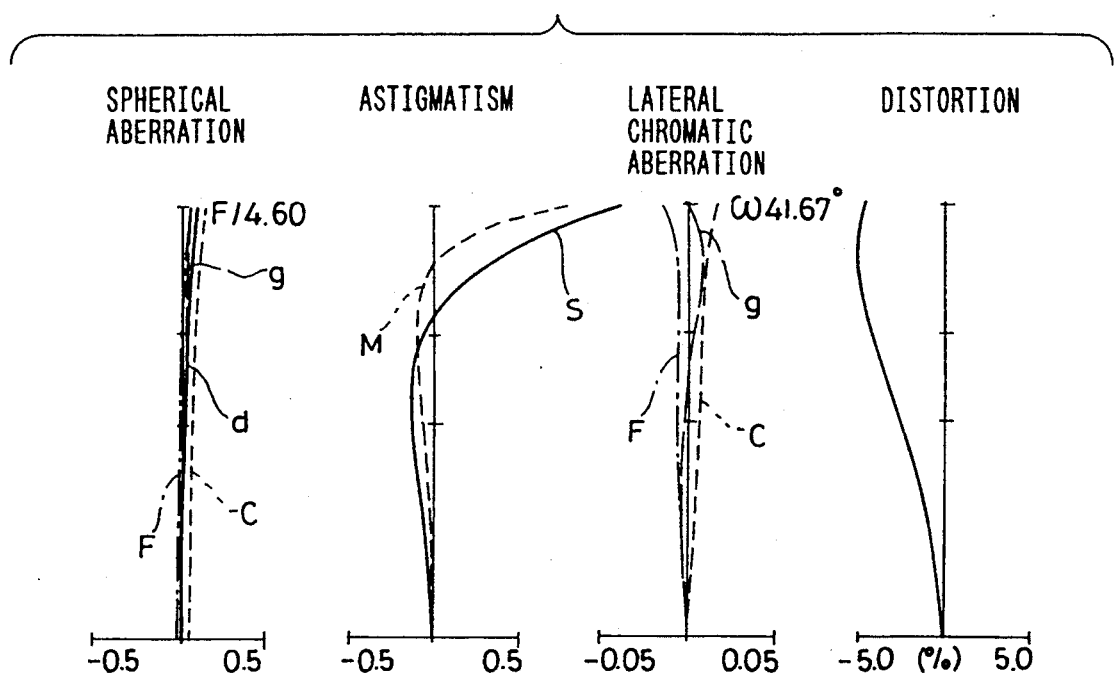
FIG. 34 shows graphs illustrating aberration characteristics at the wide position of the fourth embodiment for the object located at the infinite distance.
Figure 35:
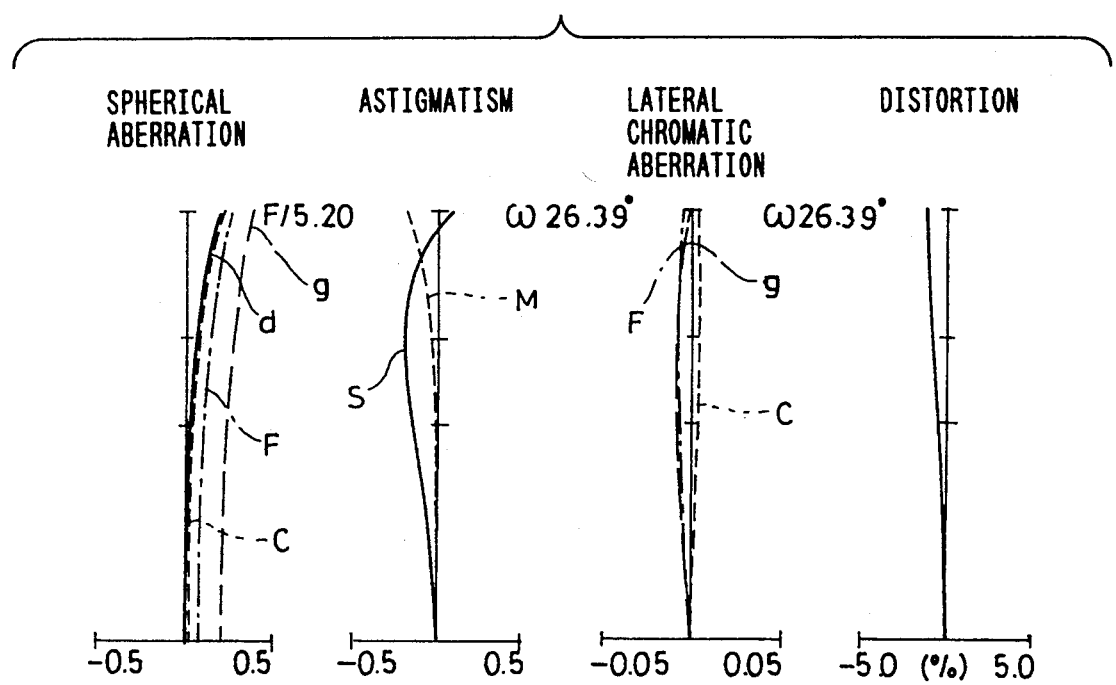
FIG. 35 shows graphs illustrating aberration characteristics at the intermediate focal length of the fourth embodiment for the object located at the infinite distance.
Figure 36:
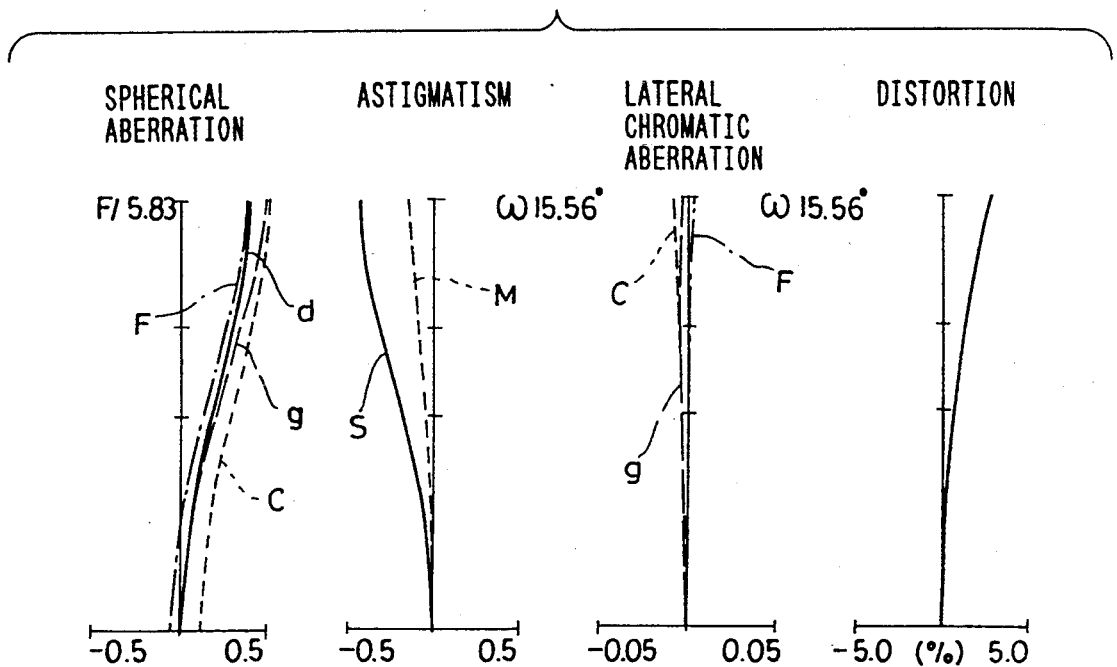
FIG. 36 shows curves illustrating aberration characteristics at the tele position of the fourth embodiment for the object located at the infinite distance.
Figure 37:
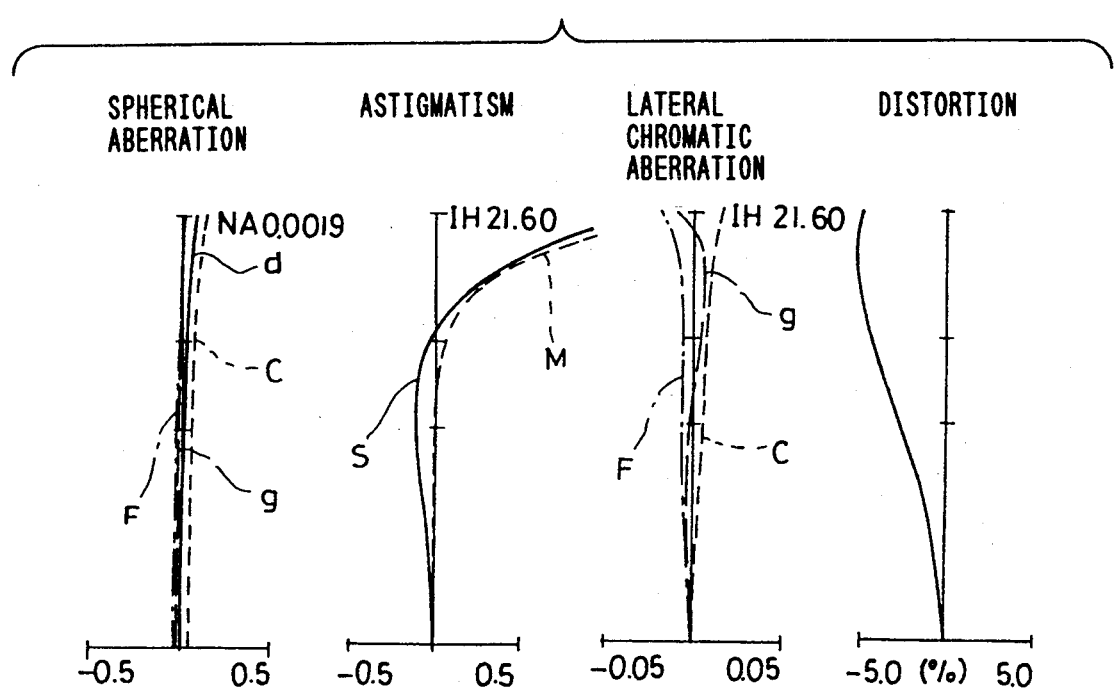
FIG. 37 shows curves illustrating aberration characteristics at the wide position of the fourth embodiment for the object located at the distance of 1 m.
Figure 38:
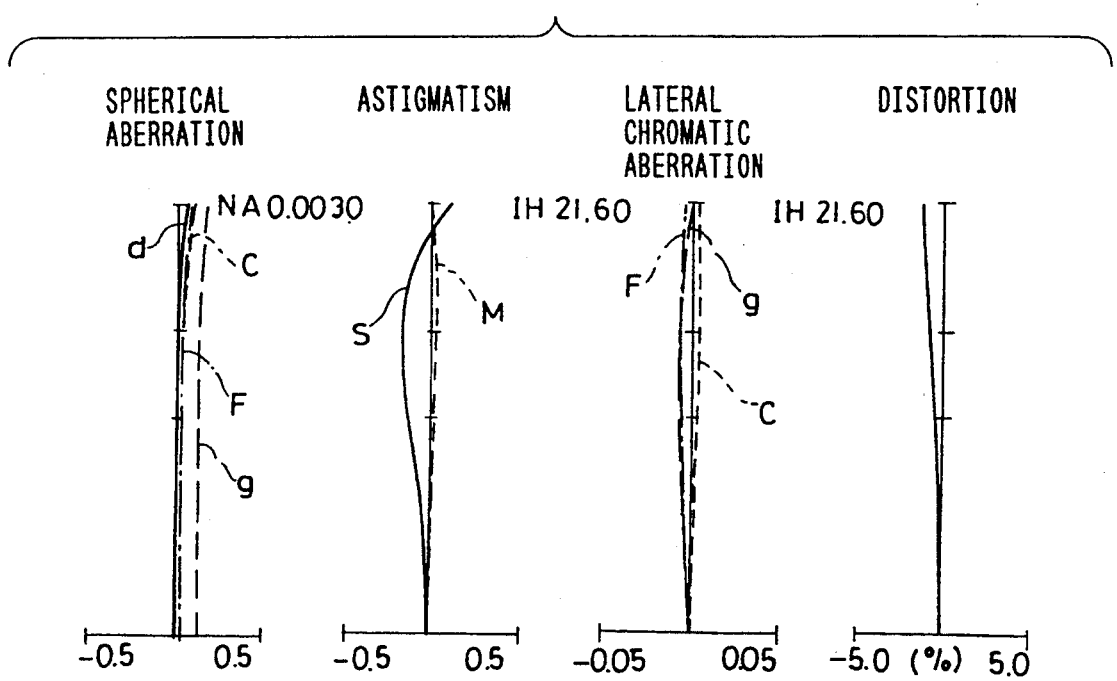
FIG. 38 shows curves illustrating aberration characteristics at the intermediate focal length of the fourth embodiment for the object located at the distance of 1 m.
Figure 39:
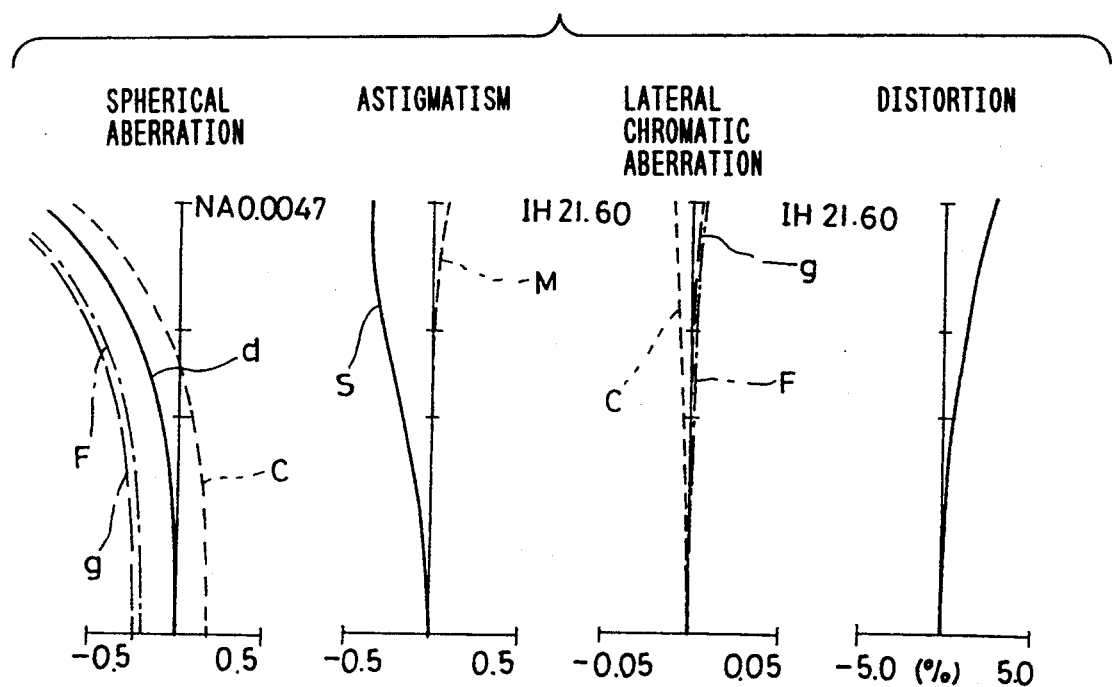
FIG. 39 shows graphs illustrating aberration characteristics at the tele position of the fourth embodiment for the object located at the distance of 1 m.
Figure 40:
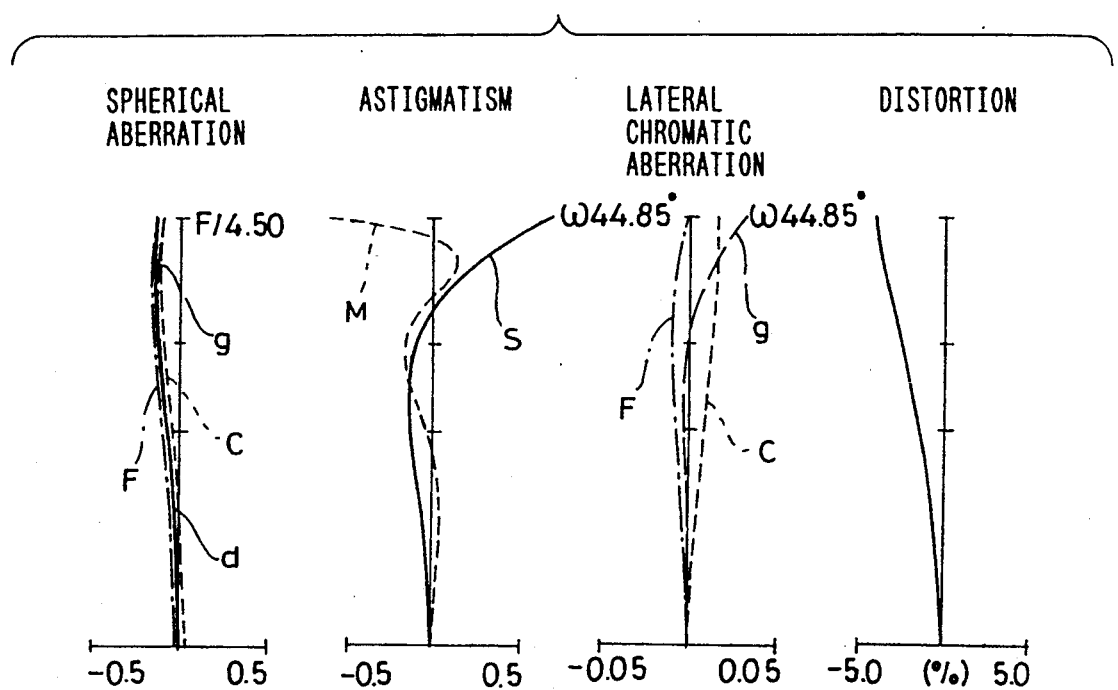
FIG. 40 shows graphs illustrating aberration characteristics at the wide position of the fifth embodiment for the object located-at the infinite distance.
Figure 41:
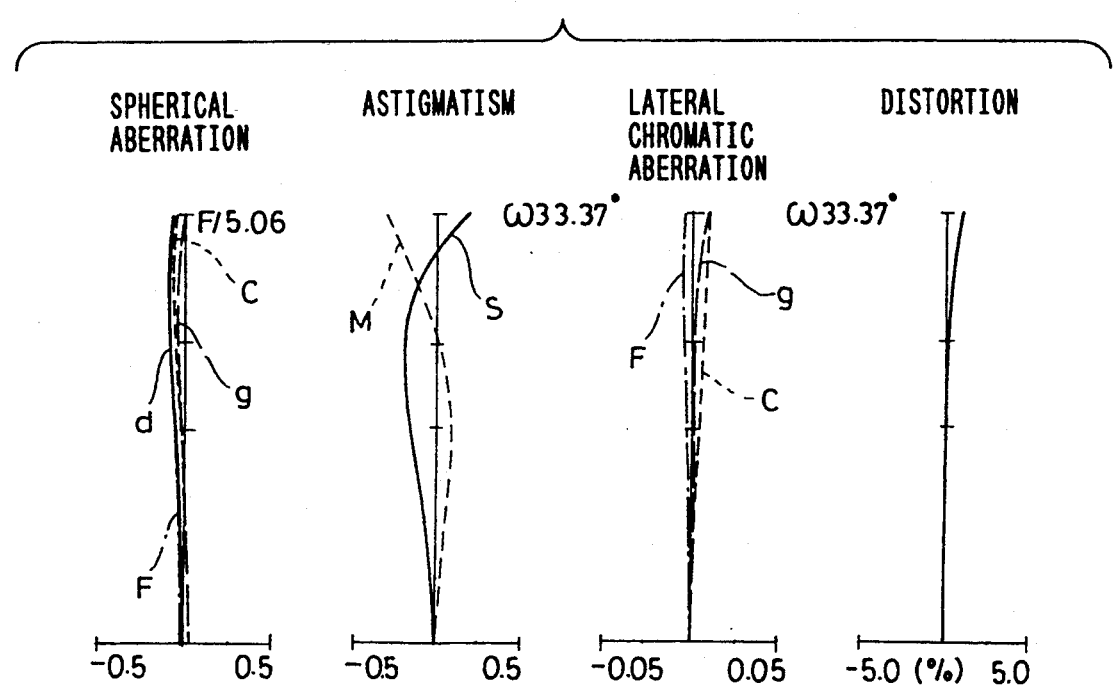
FIG. 41 shows graphs illustrating aberration characteristics at the intermediate focal length of the fifth embodiment for the object located at the infinite distance.
Figure 42:
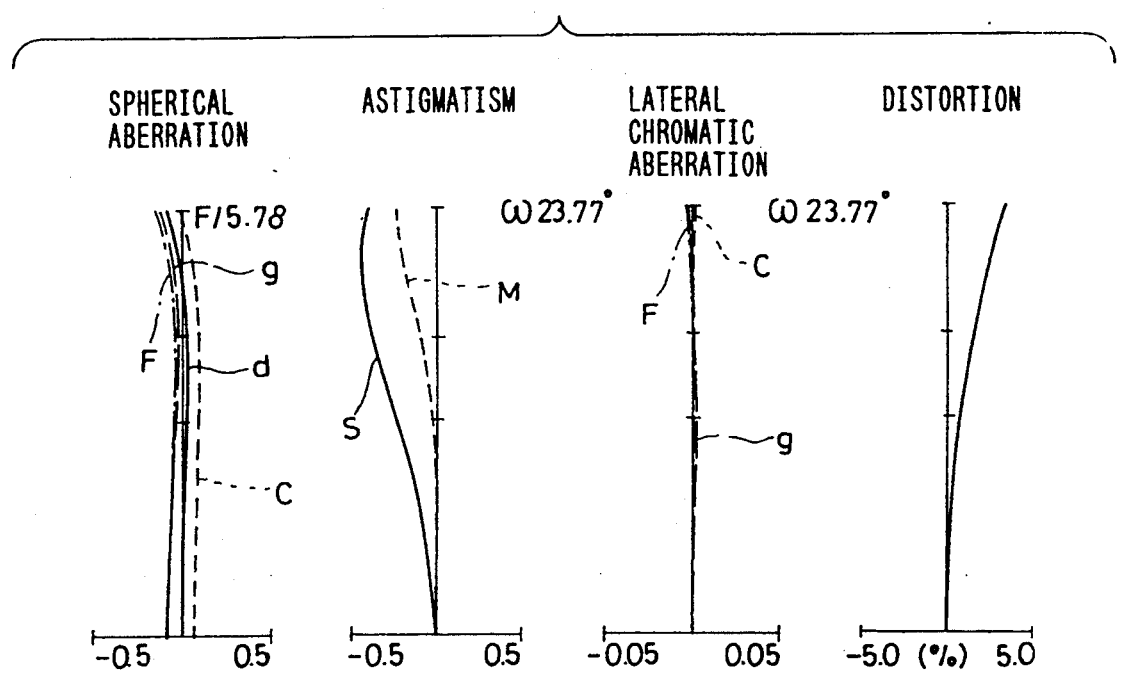
FIG. 42 shows curves illustrating aberration characteristics at the tele position of the fifth embodiment for the object located at the infinite distance.
Figure 43:
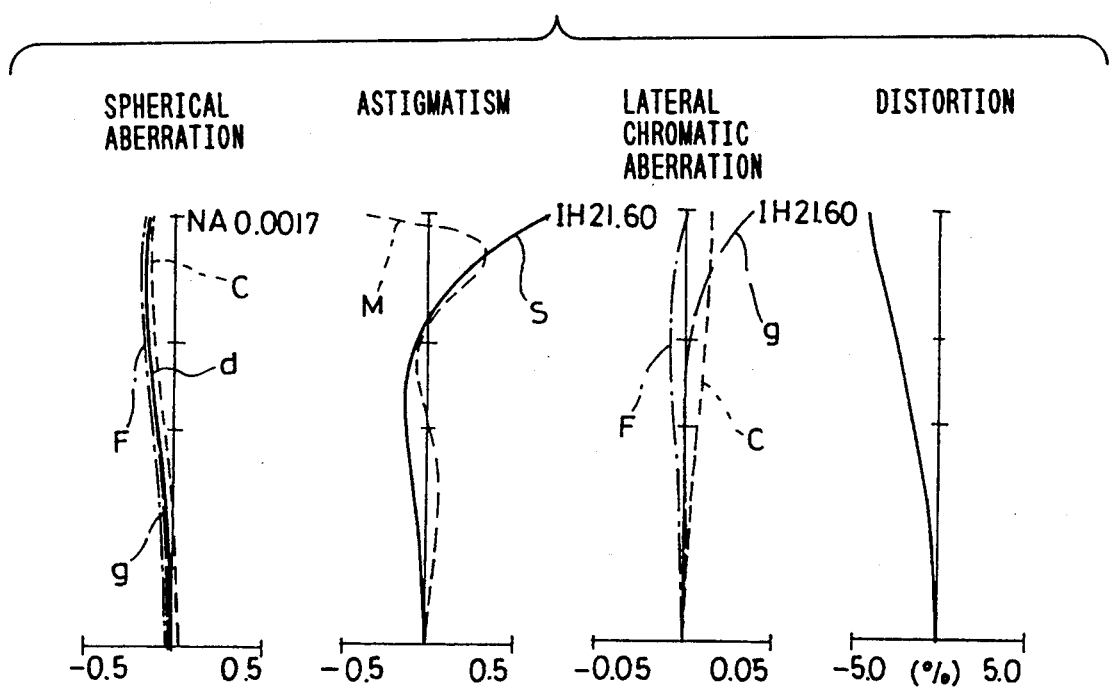
FIG. 43 shows curves illustrating aberration characteristics at the wide position of the fifth embodiment for the object located at the distance of 1 m.
Figure 44:
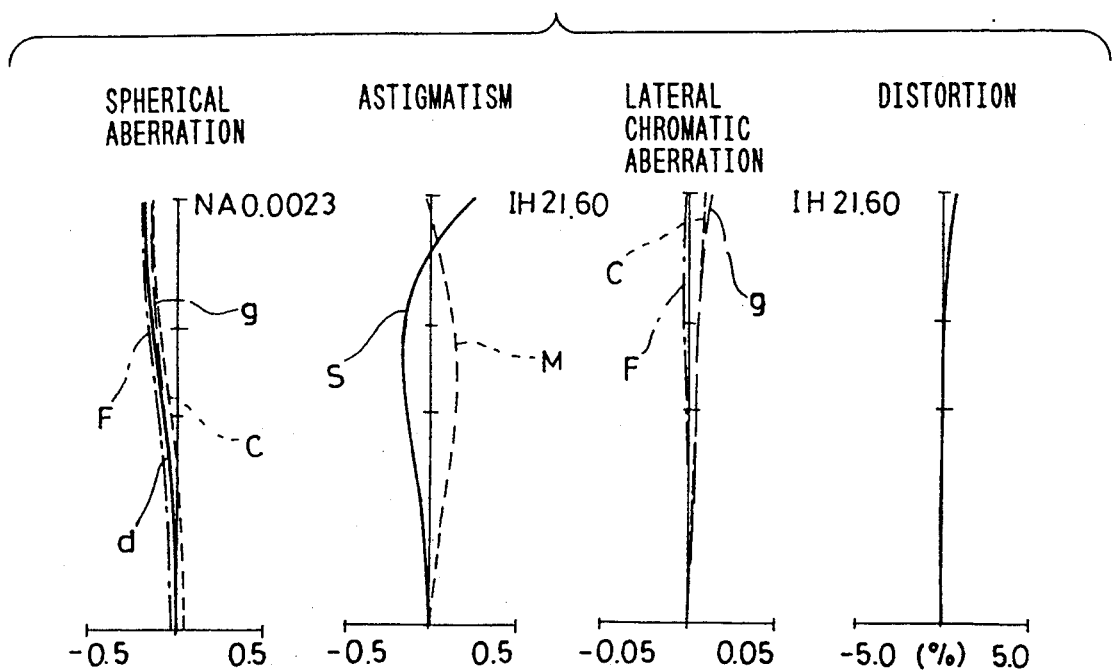
FIG. 44 shows curves illustrating aberration characteristics at the intermediate focal length of the fifth embodiment for the object located at the distance of 1 m.
Figure 45:
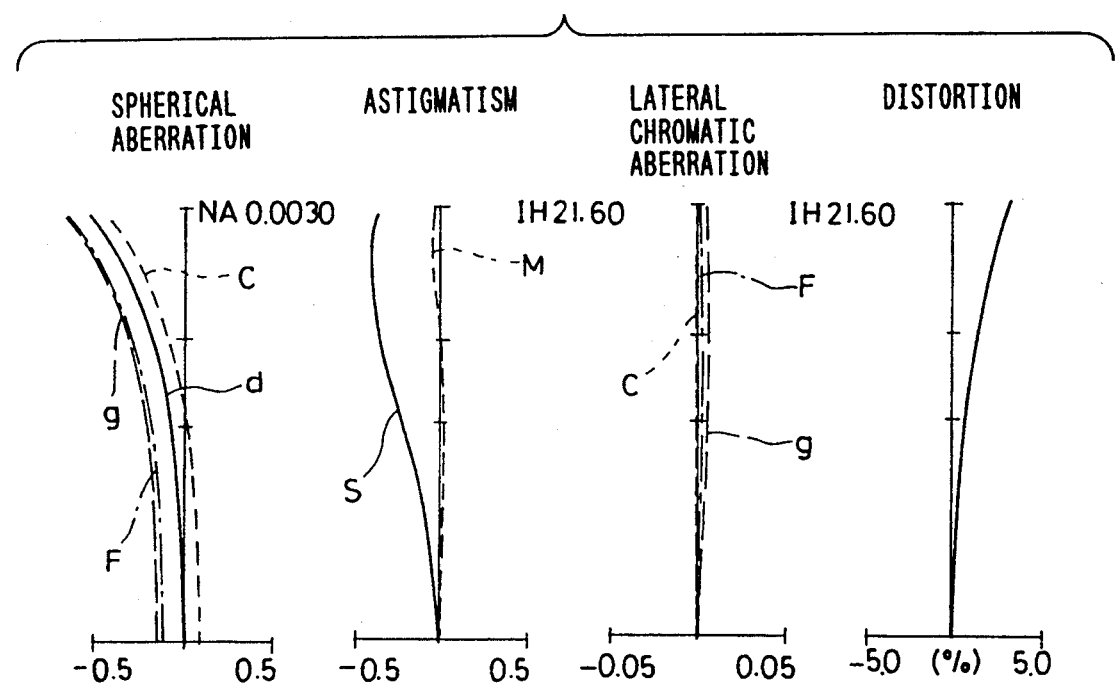
FIG. 45 shows graphs illustrating aberration characteristics at the tele position of the fifth embodiment for the object located at the distance of 1 m.
Figure 46:
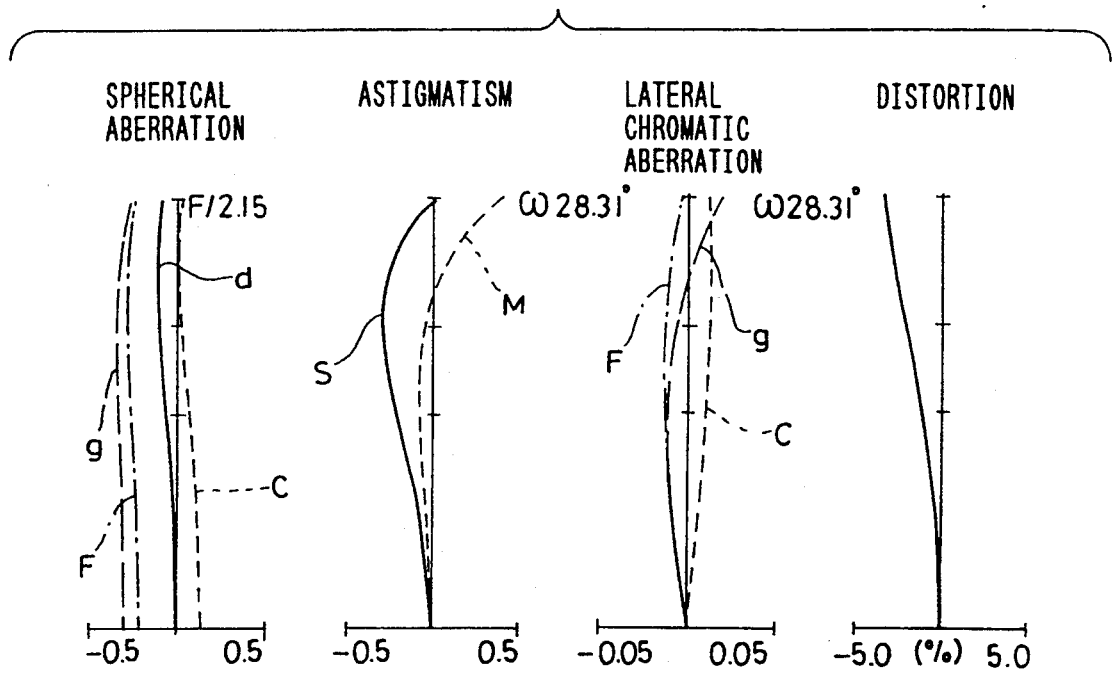
FIG. 46 shows graphs illustrating aberration characteristics at the wide position of the sixth embodiment for the object located at the infinite distance.
Figure 47:
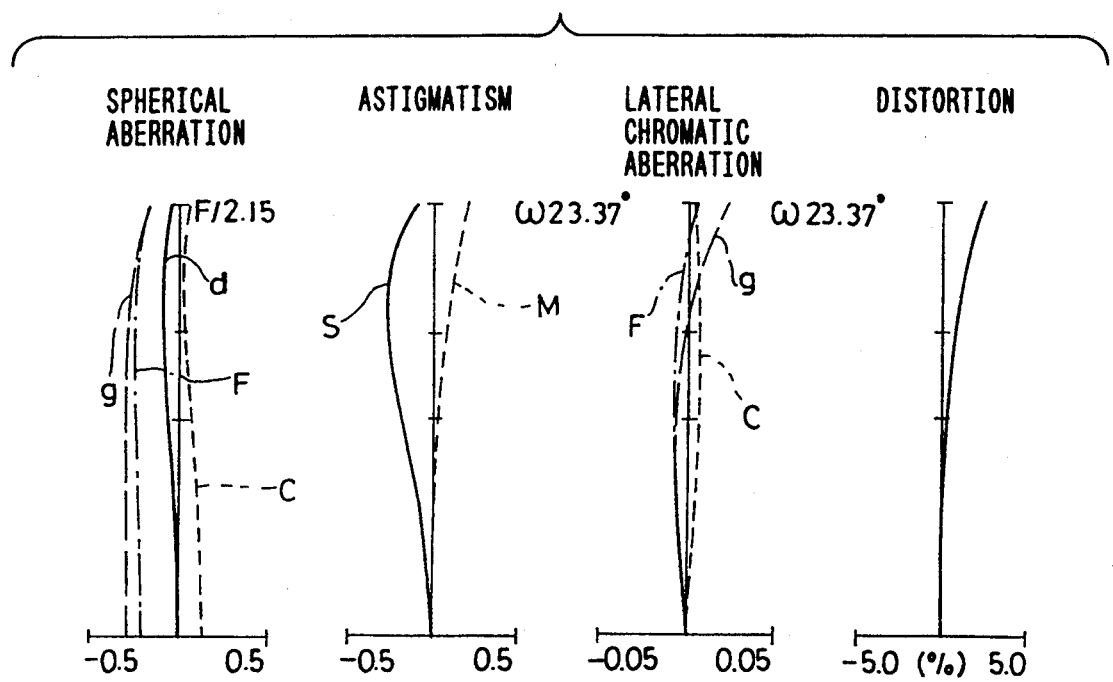
FIG. 47 shows graphs illustrating aberration characteristics at the intermediate focal length of the sixth embodiment for the object located at the infinite distance.
Figure 48:
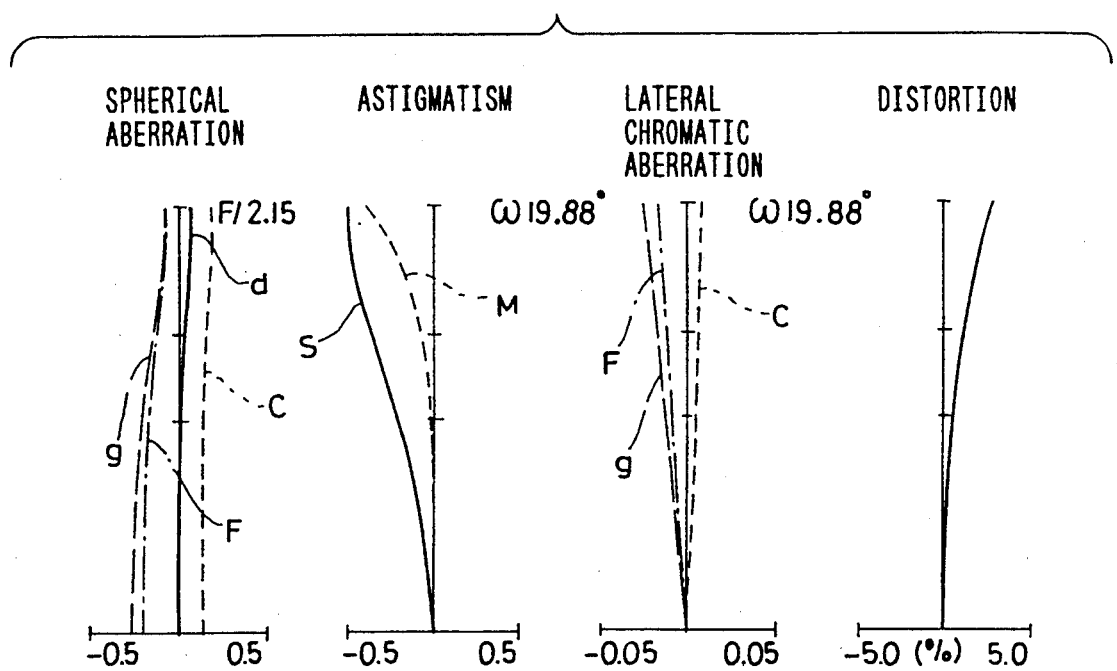
FIG. 48 shows curves illustrating aberration characteristics at the tele position of the sixth embodiment for the object located at the infinite distance.
Figure 49:
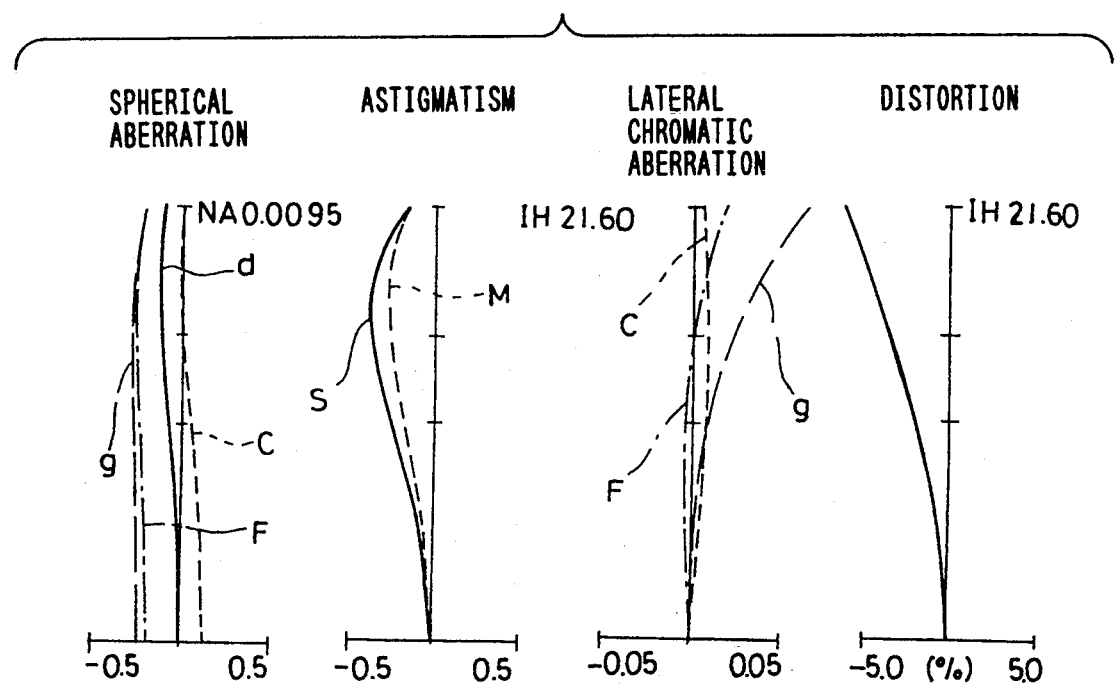
FIG. 49 shows curves illustrating aberration characteristics at the wide position of the sixth embodiment for the object located at the distance of 1 m.
Figure 50:
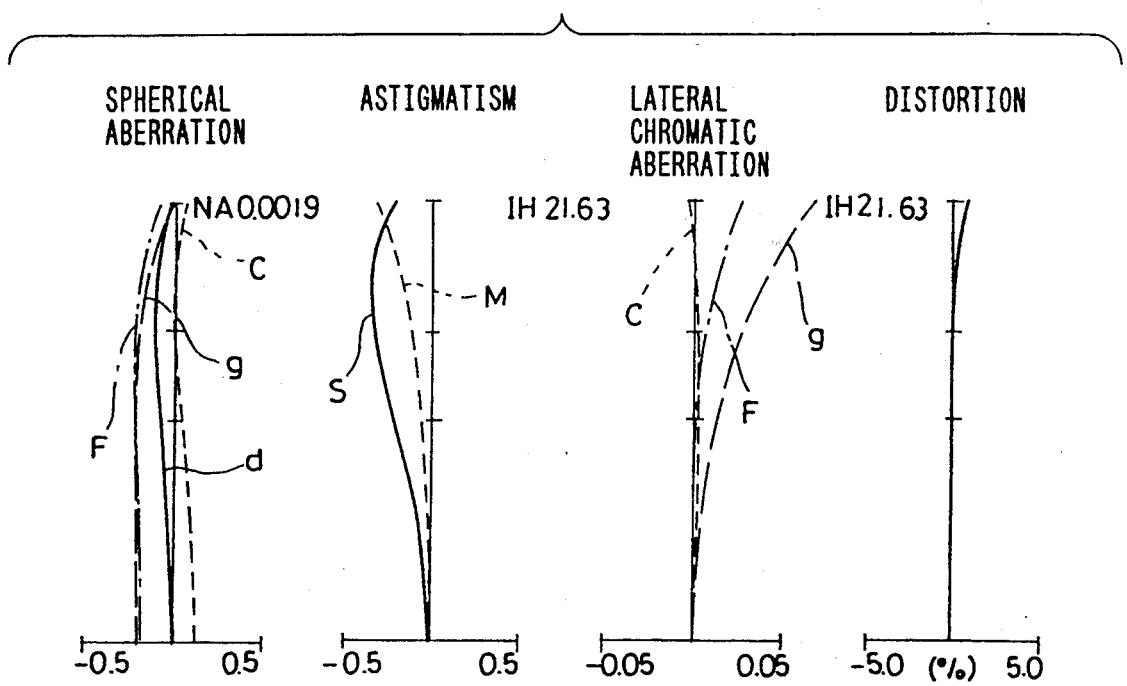
FIG. 50 shows curves illustrating aberration characteristics at the intermediate focal length of the sixth embodiment for the object located at the distance of 1 m.
Figure 51:
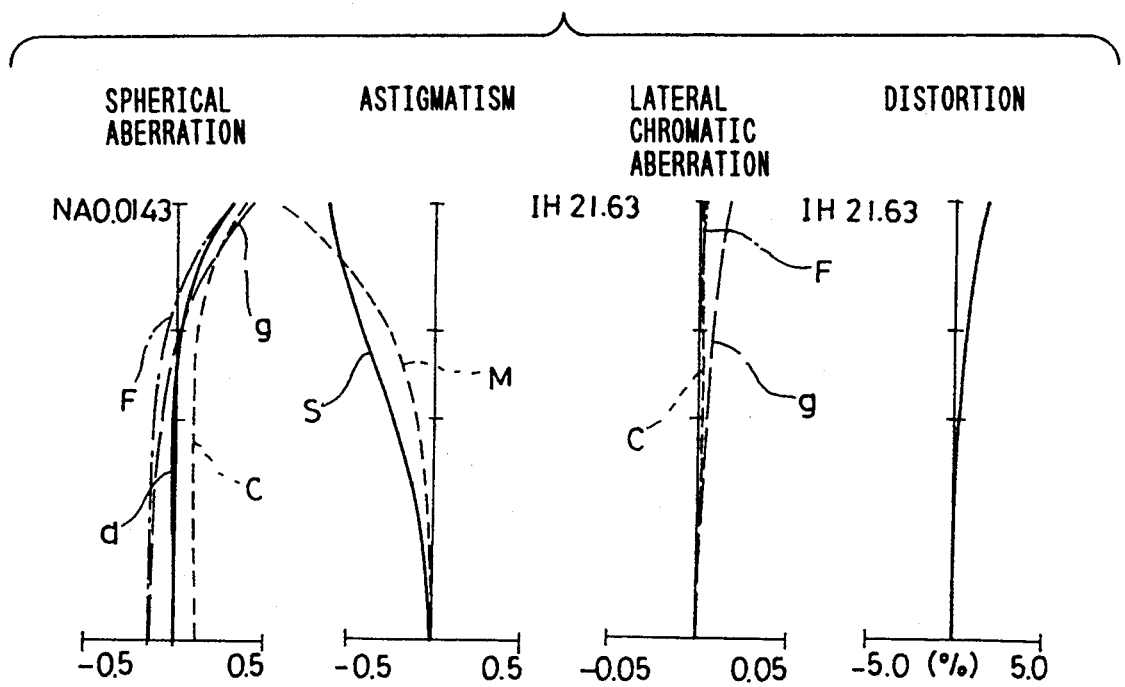
FIG. 51 shows curves aberration characteristics at the tele position of the sixth embodiment for the object located at the distance of 1 m.
Figure 52:
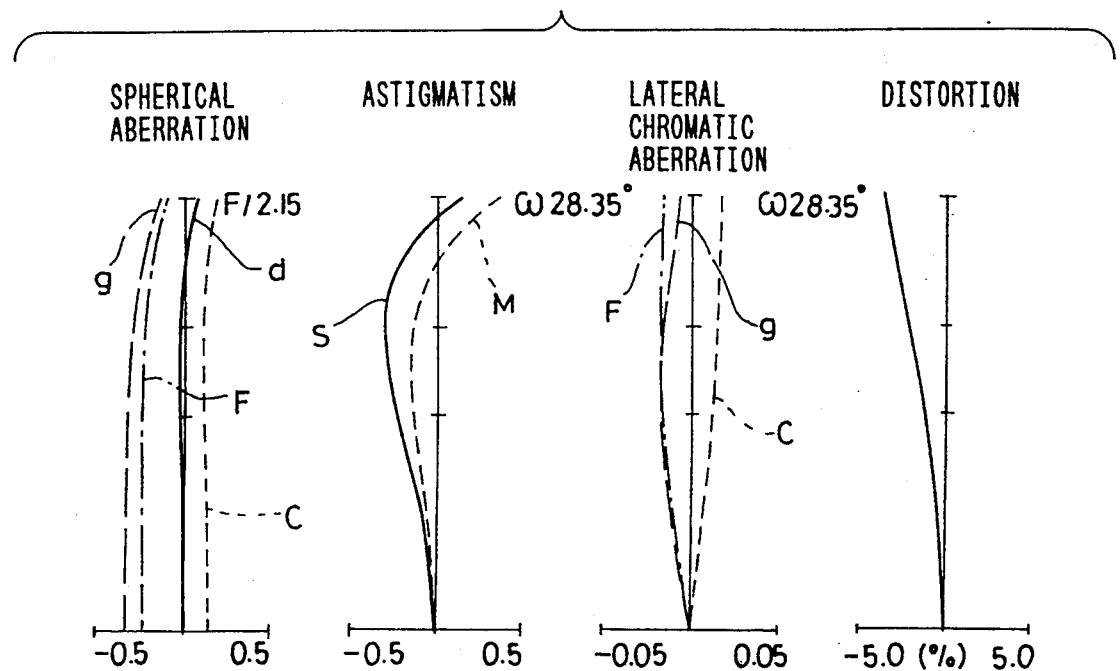
FIG. 52 shows graphs illustrating aberration characteristics at the wide position of the seventh embodiment for the object located at the infinite distance.
Figure 53:
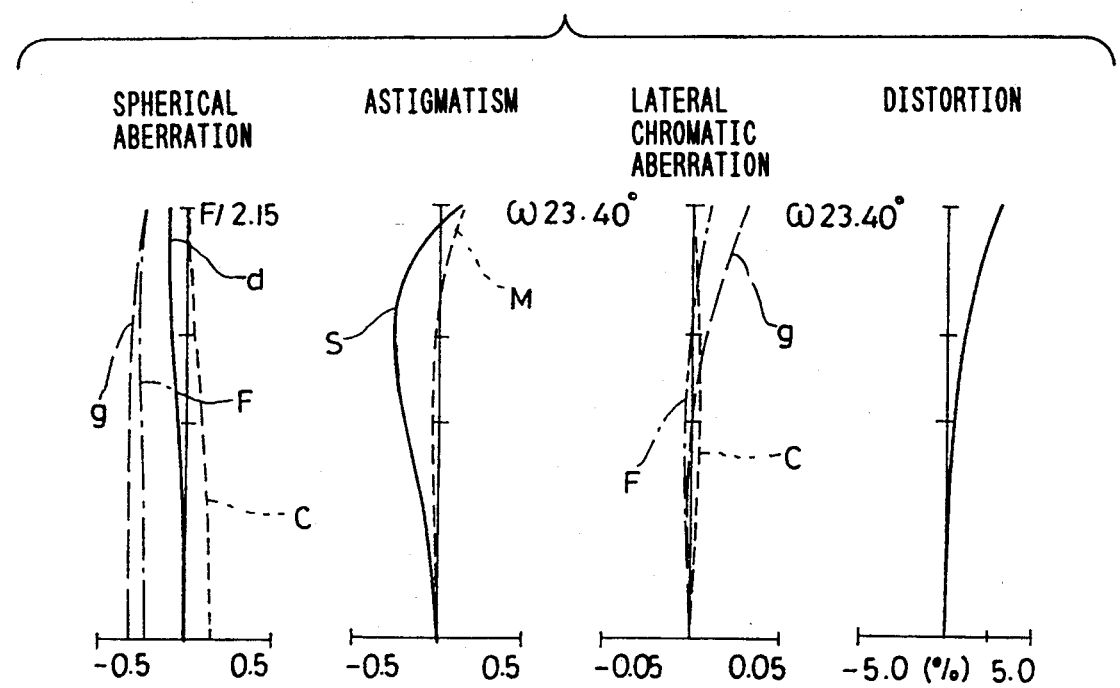
FIG. 53 shows graphs illustrating aberration characteristics at the intermediate focal length of the seventh embodiment for the object located at the infinite distance.
Figure 54:
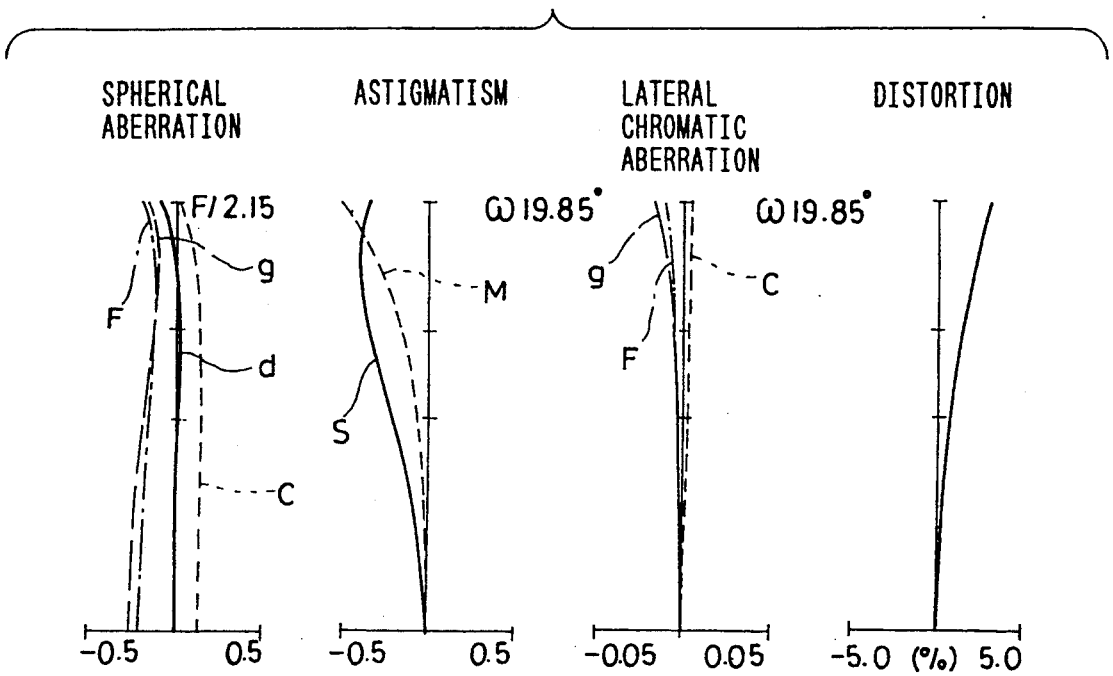
FIG. 54 shows curves illustrating aberration characteristics at the tele position of the seventh embodiment for the object located at the infinite distance.
Figure 55:
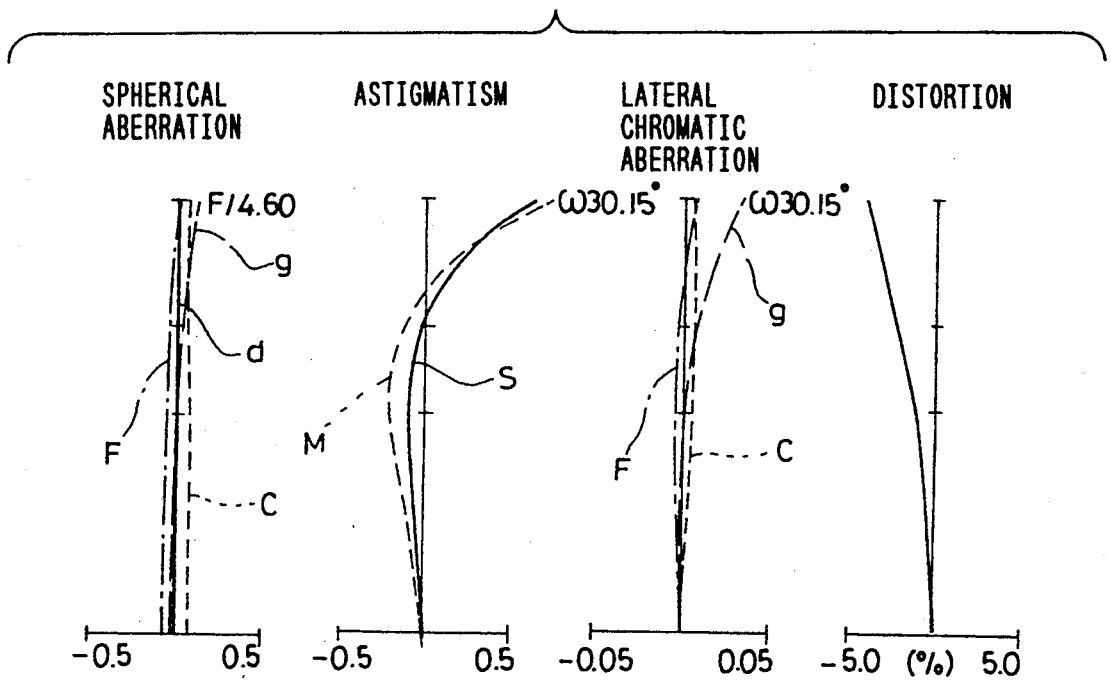
FIG. 55 shows graphs illustrating aberration characteristics at the wide position of the eighth embodiment for the object located at the infinite distance.
Figure 56:
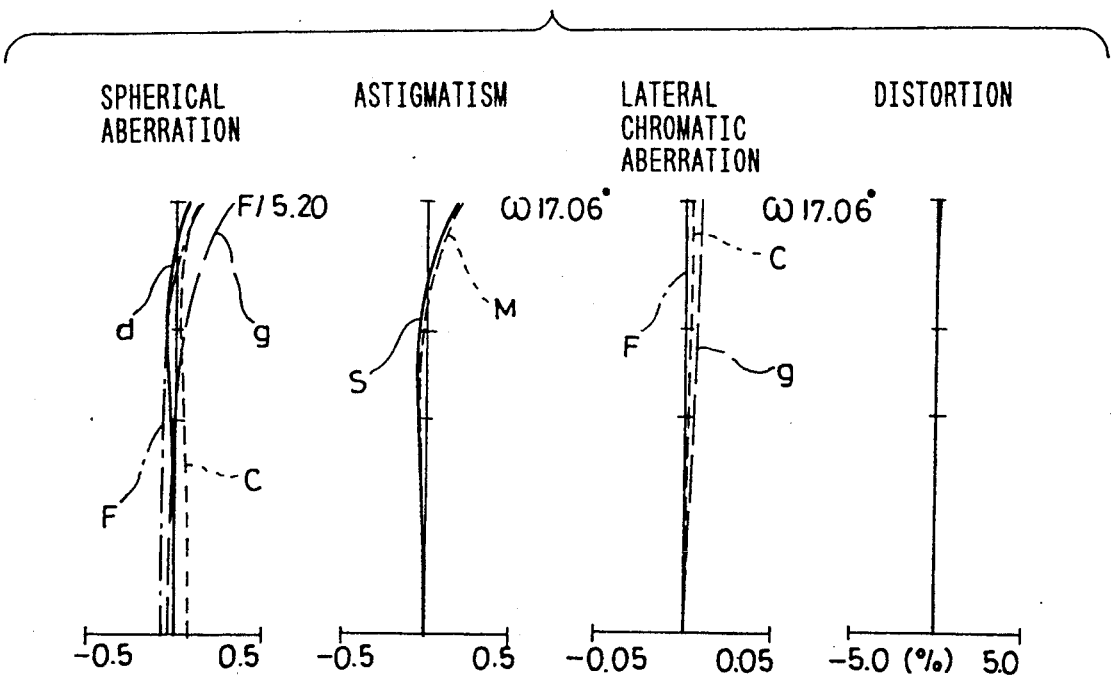
FIG. 56 shows curves illustrating aberration characteristics at the intermediate focal length of the eighth embodiment for the object located at the infinite distance.
Figure 57:
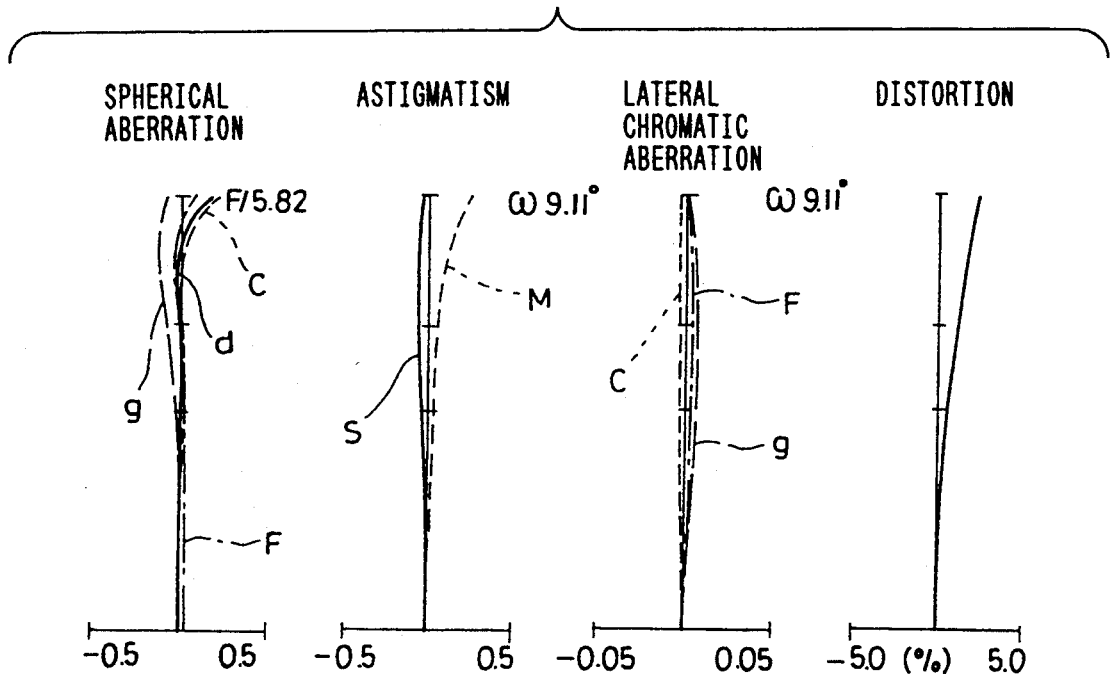
FIG. 57 shows curves illustrating aberration characteristics at the tele position of the eighth embodiment for the object located at the infinite distance.

The first embodiment has focal length which is variable within a range from 36 to 101.6 mm and comprises the lens units which are located as illustrated in FIG. 15 when focused on an object located at a short distance. In the first embodiment, the second lens component of the first lens unit which is moved for focusing consists of a negative lens element ($r_5$ and $r_6$) and a positive meniscus lens element ($r_7$ and $r_8$) which are disposed with a narrow airspace reserved therebetween. In the first embodiment, variation of the best image surface thereof is relatively little though a little astigmatism is produced at the wide position at which an incident light bundle has a large angle of incidence thereon.

In the second embodiment, the first lens unit is divided into a front subunit ($r_1$ through $r_4$) and a rear subunit ($r_5$ through $r_{11}$) which is to be moved for zooming. The second embodiment is focused by moving the second lens component ($r_5$ through $r_8$) of the first lens unit.

The second embodiment is a zoom lens system which is capable of varying focal length thereof within a range from 35.9 to 101.9 mm and allows very little variations of aberrations, except for spherical aberration which is varied a little at the tele position.

Then third embodiment is a zoom lens system which is capable of varying focal length thereof within a range from 35.9 to 101.9 mm and has favorable optical performance even at a field angle of 68.6°.

The fourth embodiment is a zoom lens system which is capable of varying focal length thereof within a range from 24.3 to 77.7 mm and has field angles ranging from a super wide angle of 83.4° at the wide position to a medium tele position. In the fourth embodiment, only spherical lens elements are disposed, the first lens unit consists of a first lens component ($r_1$ through $r_6$) and a second lens component ($r_7$ through $r_9$), and the first lens component is moved for focusing. Optical performance of the fourth embodiment can be further improved by using an aspherical surface and/or a graded refractive index lens element.

The fifth embodiment is a zoom lens system which is capable of varying focal length thereof within a range from 21.7 to 49.1 mm, covers a range of field angles including super wide field angles and is to be focused by moving a lens component as in the fourth embodiment.

The sixth embodiment is a zoom lens system which is capable of varying focal length thereof within a range from 40.2 to 59.8 mm and adopts a focusing method which is similar to that selected for the fourth or fifth embodiment.

Figure 13:
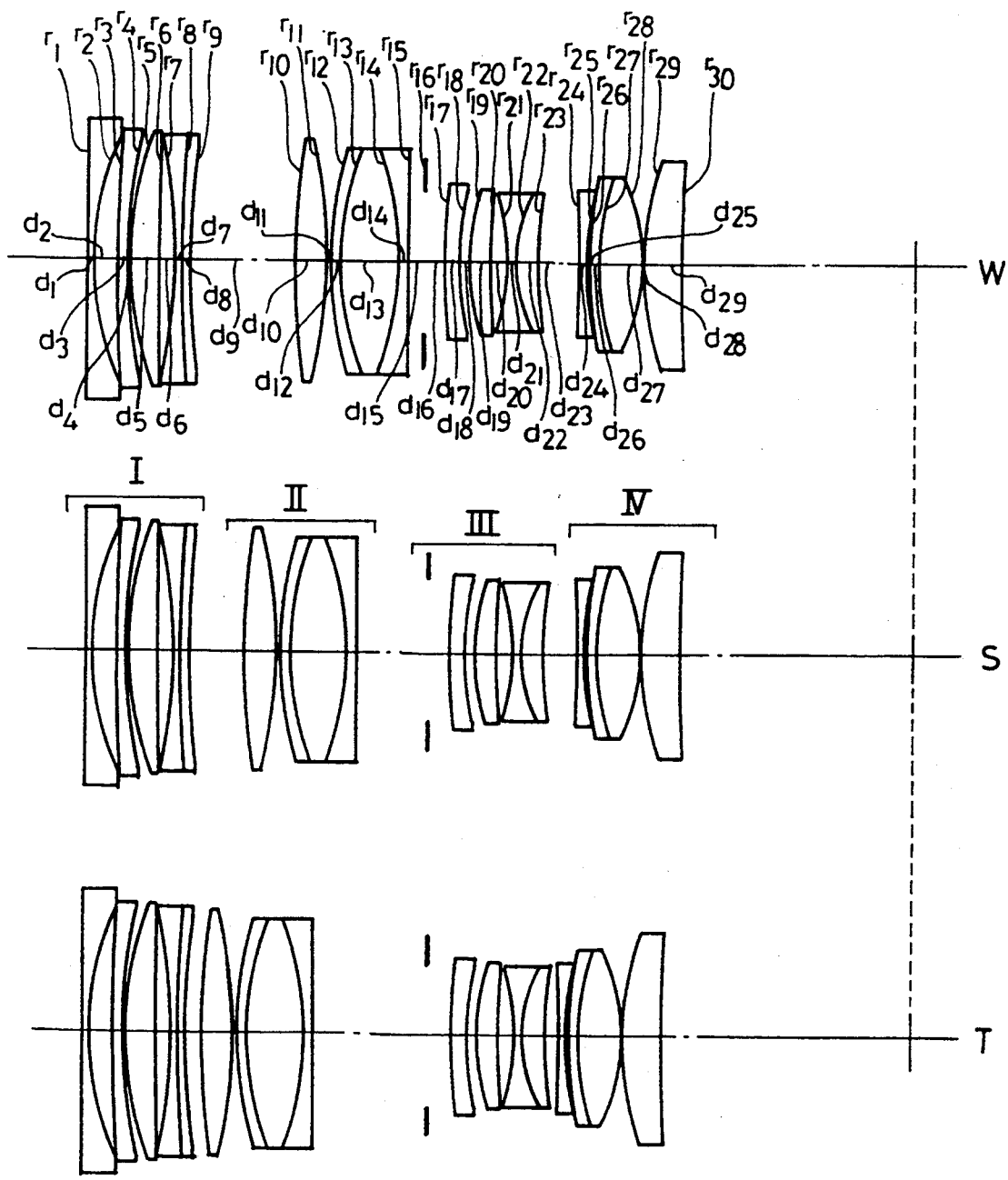

The seventh embodiment has compositions illustrated in FIG. 13. This zoom lens systems has focal length variable within a range from 40.2 to 59.8 mm and consists of four lens units. In other words, the fifth fixed lens unit is not used in the seventh embodiment. Further, seventh embodiment has a high aperture ratio on an order of F/2.15.

Figure 14:
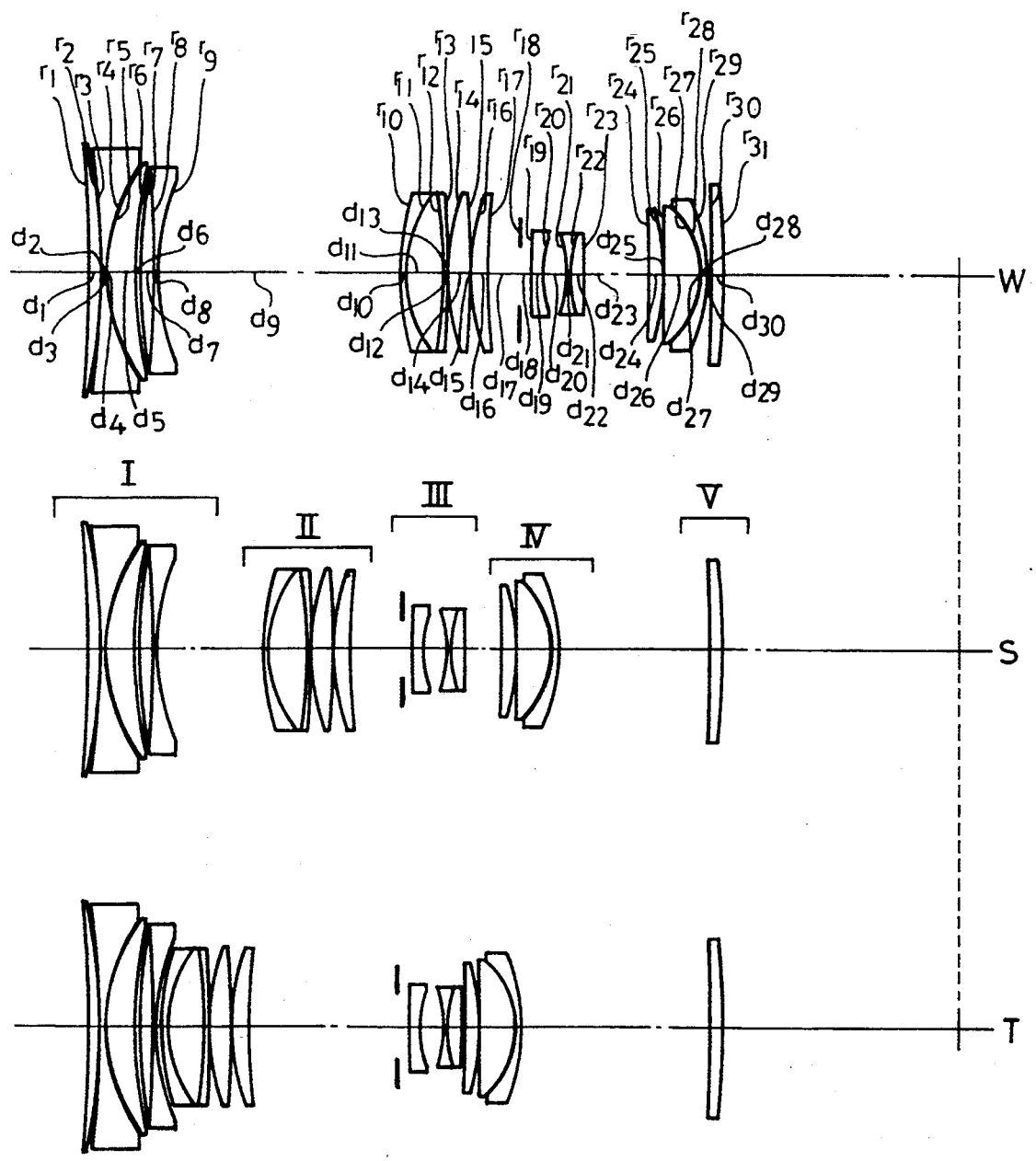

The eighth embodiment is a wide-angle zoom lens system which has a composition shown in FIG. 14, is capable of varying focal length thereof within a range from 36 to 131 mm and has a high vari-focal ratio. The eighth embodiment is configured so as to perform focusing by moving the first through fourth lens units so that spherical aberration and astigmatism are varied little by focusing.

Figure 6:
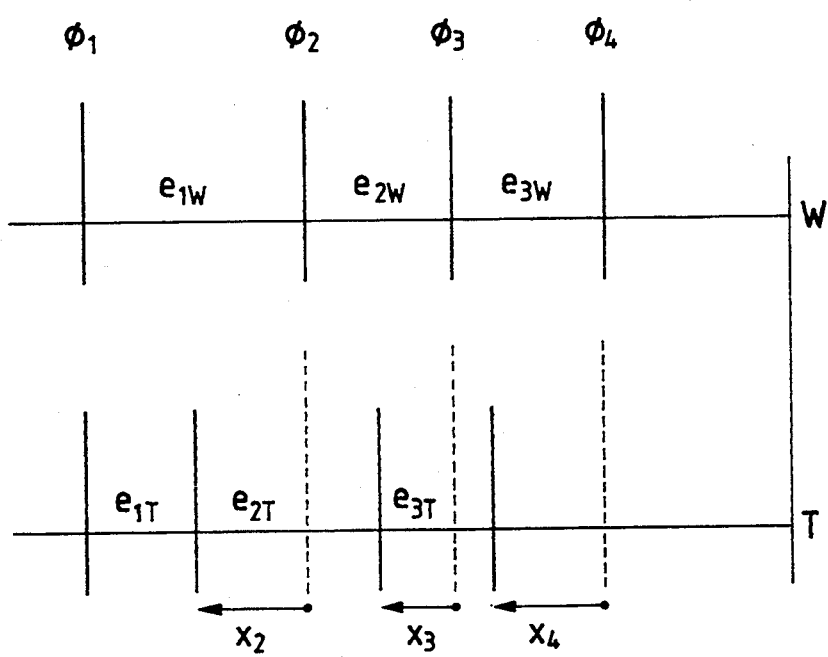
FIG. 6 shows diagrams illustrating moving distances of the second lens unit, the third lens unit and the fourth lens unit for zooming the zoom lens system according to the present invention from the wide position to the tele position thereof.
Figure 7:
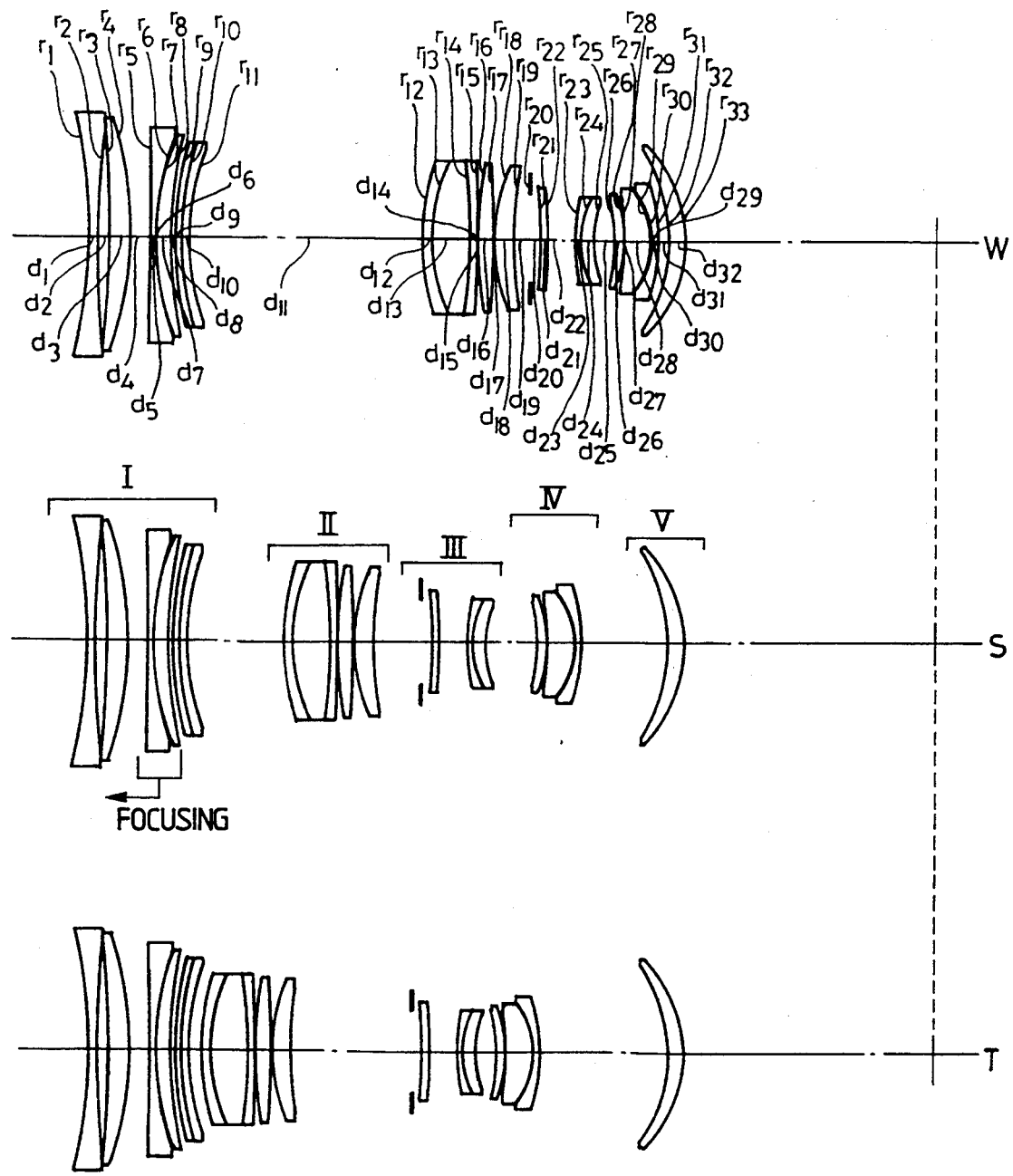
FIG. 7 through FIG. 14 show sectional views illustrating compositions of first through eighth embodiments of the zoom lens system according to the present invention.
Figure 8:
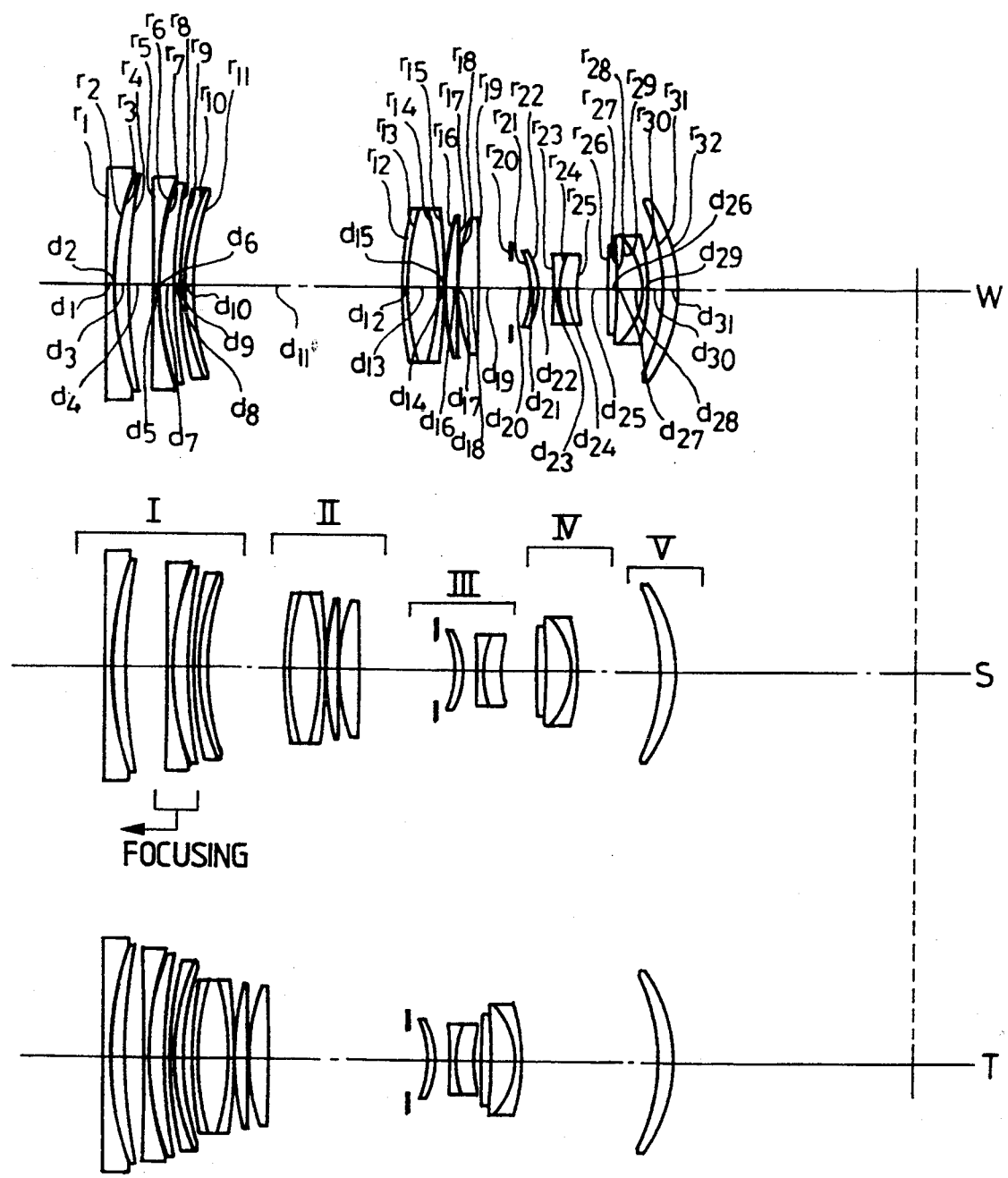
Figure 9:
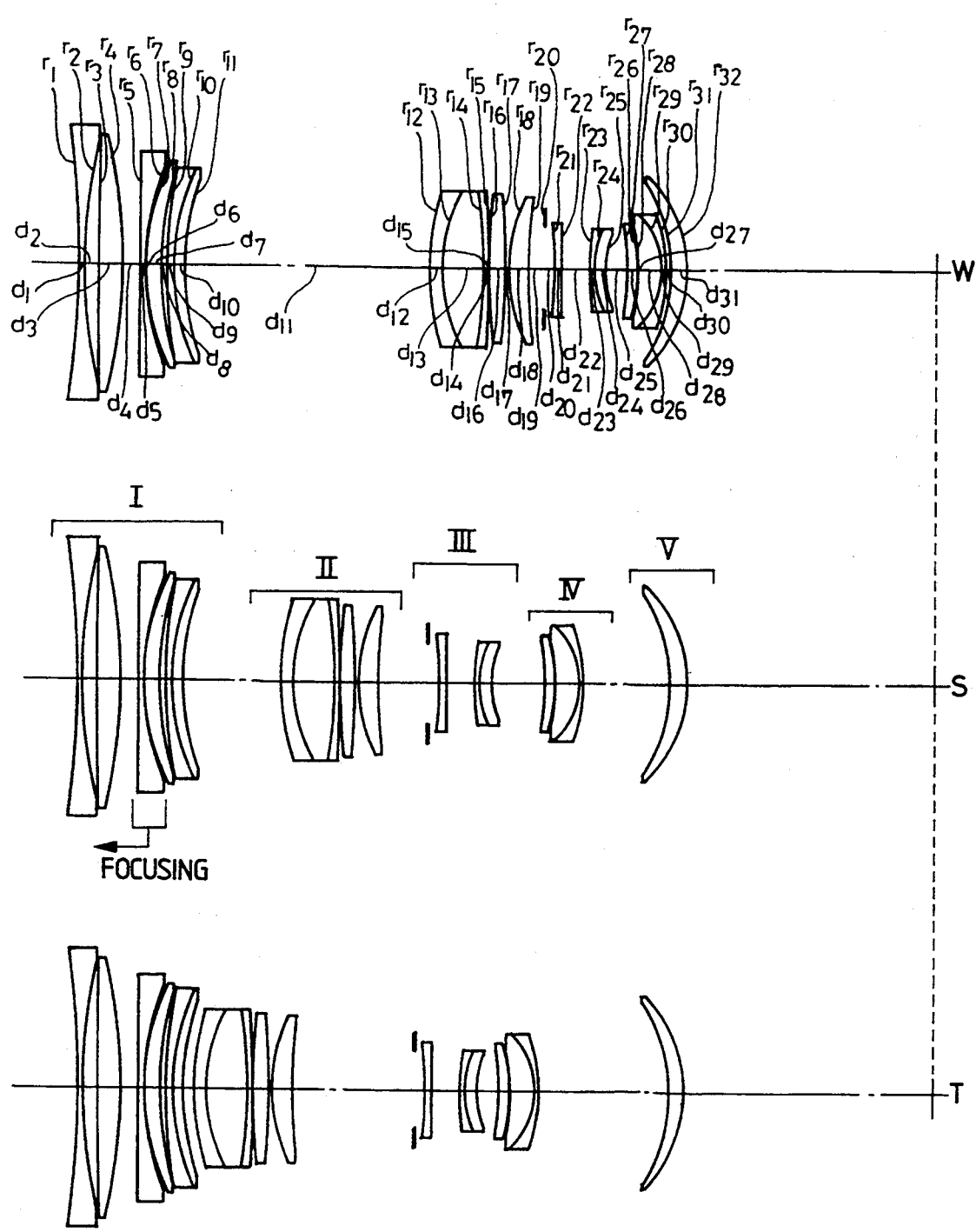
Figure 10:
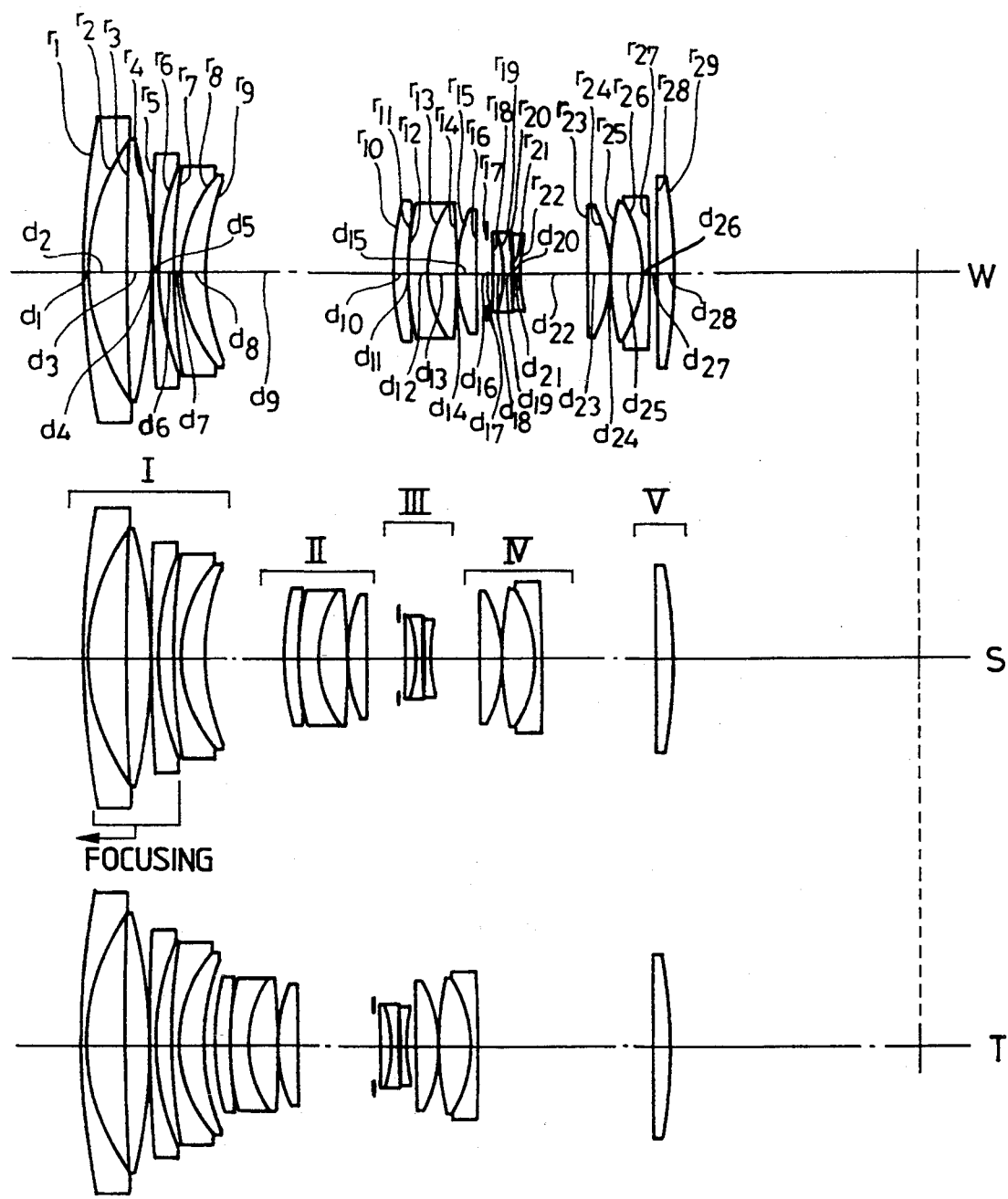
Figure 11:
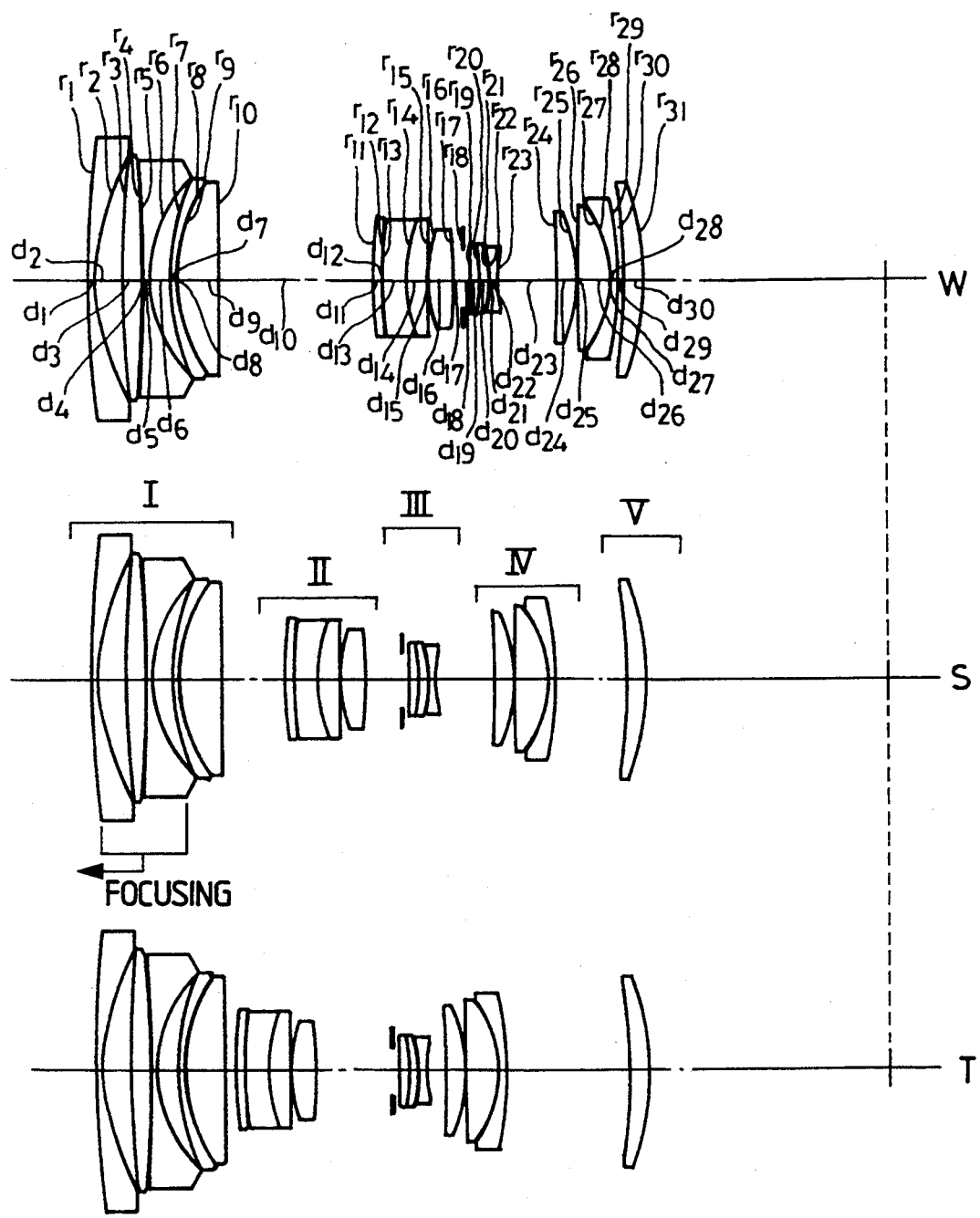
Figure 12:
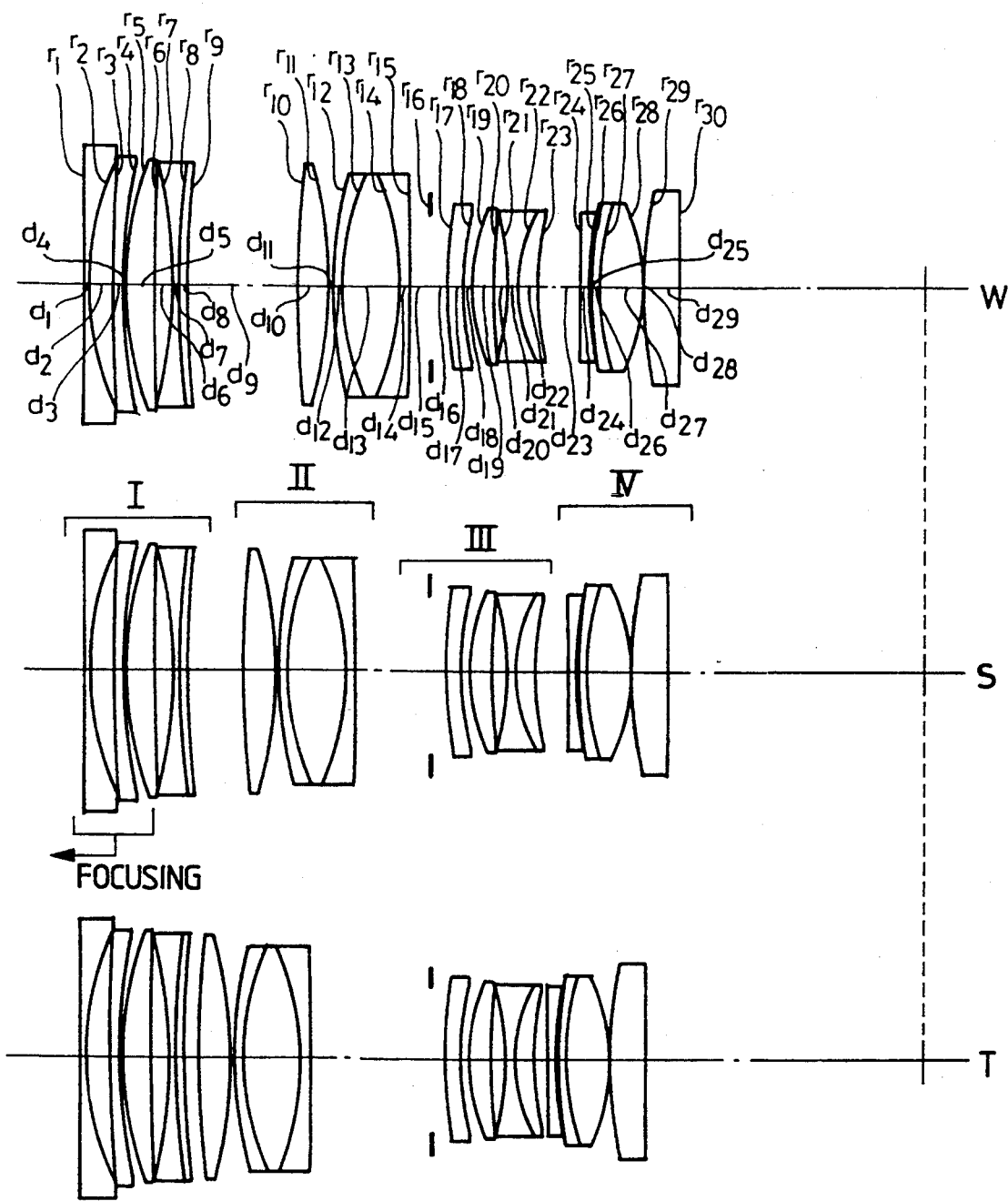

In the seventh embodiment, moving distances for the second, third and fourth lens units (values of $X_2$, $X_3$ and $X_4$ shown in FIG. 6) are as listed below:

TABLE

| | X$_2$ | X$_3$ | X$_4$ |
|---|---|---|---|
| Embodiment 1 | 34.0489 | 17.8339 | 17.9489 |
| 2 | 33.4522 | 16.0122 | 19.7722 |
| 3 | 35.7106 | 19.2566 | 19.2286 |
| 4 | 29.6626 | 19.0706 | 28.4946 |
| 5 | 22.7474 | 12.2294 | 18.7074 |
| 6 | 16.0318 | 0.3558 | 5.3028 |
| 7 | 16.6464 | -2.0086 | 2.5054 |
| 8 | 38.61 | 19.552 | 29.734 |

When the optical axis is taken as the x axis and the direction perpendicular to the optical axis is taken as the y axis, the aspherical surface used in the embodiments described above have shapes expressed by the following formula:

$$x = \frac{y^2/r}{1 + \sqrt{1 - p(y/r)^2}} + Ey^4 + Fy^6 + Gy^8 + Hy^{10} + \ldots$$

wherein the reference symbol r represents a radius of curvature on the reference sphere of the aspherical surface of interest, the reference symbol p designates a conical constant, and the reference symbols E, F, G, H, ... denotes aspherical surface coefficients.

As is understood from the foregoing description, the zoom lens system according to the present invention is of the front negative lens type, consists of four or five lens units and has a total length which is substantially unchanged by zooming. Further, the zoom lens system according to the present invention can have a broad vari-focal range covering wide field angles and a high vari-focal ratio. Furthermore, the zoom lens system according to the present invention can be focused by moving one or more lens components disposed in the first lens unit and has a total length which remains substantially unchanged regardless of focusing.

I claim:

1. A zoom lens system comprising, in order from the object side:
    a first lens unit which comprises a plurality of lens components and has a negative refractive power as a whole;
    a second lens unit having t positive refractive power;
    a third lens unit having a negative refractive power; and
    a fourth lens unit having one of positive and negative refractive power;
    wherein said zoom lens system is zoomed by moving said second lens unit, said third lens unit and said fourth lens unit toward the object side when zooming from a wide position to a tele position, with a most object side lens surface of said first lens unit being kept fixed during said zooming; and
    wherein said zoom lens system is focused by moving at least one of said plurality of lens components of said first lens unit along an optical axis.

2. A zoom lens system according to claim 1, further comprising a fifth lens unit for correcting a deviation of an image surface of said zoom lens system.

3. A zoom lens system according to claim 1 or 2, wherein variations of aberrations caused by said zooming are reduced by varying at least one airspace disposed in said first lens unit.

4. A zoom lens system according to claim 1 or 2, wherein said zoom lens system satisfies the following conditions (1) and (2):

$$|\beta_{2W}| < |\beta_{2T}| \qquad (1)$$

$$\beta_{3W} \cdot \beta_{4W} < \beta_{3T} \cdot \beta_{4T} \qquad (2)$$

wherein reference symbols $\beta_{2W}$, $\beta_{3W}$ and $\beta_{4W}$ represent paraxial lateral magnifications of said second lens unit, said third lens unit and said fourth lens unit respectively at said wide position, and reference symbols $\beta_{2T}$, $\beta_{3T}$ and $\beta_{4T}$ designate paraxial lateral magnifications of said second lens unit, said third lens unit and said fourth lens unit respectively at said tele position.

5. A zoom lens system according to claim 1 or 2, wherein said zoom lens system satisfies the following conditions (3) and (4):

$$0.5 < |\phi_{12W}/\phi_W| < 4.0 \qquad (3)$$

$$0.05 < |\phi_{34W}/\phi_W| < 1.5 \qquad (4)$$

wherein reference symbol $\phi_W$ represents a refractive power of said zoom lens system as a whole at said wide position, reference symbol $\phi_{12W}$ designates a total refractive power of said first lens unit and said second lens unit at said wide position, and reference symbol $\phi_{34W}$ denotes a total refractive power of said third lens unit and said fourth lens unit at said wide position.

6. A zoom lens system consisting, in order from the object side, of: a first lens unit having negative refractive power, a second lens unit having positive refractive power, a third lens unit having negative refractive power, a fourth lens unit having positive or negative refractive power and a fifth lens unit having positive refractive power;
    wherein focal length of said zoom lens system is varied by moving said second lens unit, said third lens unit and said fourth lens unit with said first lens unit and said fifth lens unit kept fixed so that locations of said second lens unit, said third lens unit and said fourth lens unit at a tele position are on the object side of locations of these lens units at a wide position, and wherein said zoom lens system satisfies the following conditions (2), (3) and (4):

$$\beta_{3W} \cdot \beta_{4W} < \beta_{3T} \beta_{4T} \qquad (2)$$

$$0.5 < |\phi_{12W}/\phi_W| < 4.0 \qquad (3)$$

$$0.05 < |\phi_{34W}/\phi_W| < 1.5 \qquad (4)$$

wherein the reference symbols $\beta_{3W}$ and $\beta_{4W}$ represent paraxial lateral magnifications of the third lens unit and the fourth lens unit respectively at the wide position, the reference symbols $\beta_{3T}$ and $\beta_{4T}$ designate paraxial lateral magnifications of the third lens unit and the fourth lens unit respectively at the tele position, the reference symbol $\phi_W$ denotes refractive power of the zoom lens system as a whole at the wide position thereof, the reference symbol $\phi_{12W}$ represents total refractive power of the first lens unit and the second lens unit at the wide position, and the reference symbol $\phi_{34W}$ designates total refractive power of the third lens unit and the fourth lens unit at the wide position.

7. A zoom lens system according to claim 6 wherein said first lens unit consists of a front subunit and a rear subunit, and an airspace disposed between said front subunit and said rear subunit is varied for varying focal length of said zoom lens system (from the wide position to the tele position).

8. A zoom lens system consisting of, in order from the object side:
    a first lens unit having negative refractive power,
    a second lens unit having positive refractive power,
    a third lens unit having negative refractive power, and
    a fourth lens unit having one of positive and negative refractive power;
    wherein focal length of said zoom lens system is varied by moving said second lens unit, said third lens unit and said fourth lens unit, with said first lens unit being kept fixed during zooming, so that locations of said second lens unit, said third lens unit and said fourth lens unit at a tele position are on the object side of locations of these lens units at a wide position, and wherein said zoom lens system satisfies the following conditions (2), (3) and (4):

$$\beta_{3W} \cdot \beta_{4W} < \beta_{3T} \beta_{4T} \qquad (2)$$

$$0.5 < |\phi_{12W}/\phi_W| < 4.0 \qquad (3)$$

$$0.05 < |\phi_{34W}/\phi_W| < 1.5 \qquad (4)$$

wherein the reference symbols $\beta_{3W}$ and $\beta_{4W}$ represent paraxial lateral magnifications of the third lens unit and fourth lens unit respectively at the wide position, the reference symbols $\beta_{3T}$ and $\beta_{4T}$ designate paraxial lateral magnifications of the third lens unit and fourth lens unit respectively at the tele position, the reference symbol $\phi_W$ denotes refractive power of the zoom lens system as a whole at the wide position thereof, the reference symbol $\phi_{12W}$ represents total refractive power of the first lens unit and the second lens at the wide position, and the reference symbol $\phi_{34W}$ designates total refractive power of the third lens unit and the fourth lens at the wide position.

9. A zoom lens system consisting of, in order from the object side:
 a first lens unit having negative refractive power and consisting of a front subunit and a rear subunit, with an airspace disposed between said front and rear subunits being varied for varying the focal length of said zoom lens system, from the wide position to the tele position,
 a second lens unit having positive refractive power,
 a third lens unit having negative refractive power, and
 a fourth lens unit having one of positive and negative refractive power;
 wherein focal length of said zoom lens system is varied by moving said second lens unit, said third lens unit and said fourth lens unit, with said first lens unit being kept fixed during zooming, so that locations of said second lens unit, said third lens unit and said fourth lens unit at a tele position are on the object side of locations of these lens units at a wide position, and wherein said zoom lens system satisfies the following conditions (2), (3) and (4):

$$\beta_{3W} \cdot \beta_{4W} < \beta_{3T} \cdot \beta_{4T} \quad (2)$$

$$0.5 < |\phi_{12W}/\phi_W| < 4.0 \quad (3)$$

$$0.05 < |\phi_{34W}/\phi_W| < 1.5 \quad (4)$$

wherein the reference symbols $\beta_{3W}$ and $\beta_{4W}$ represent paraxial lateral magnifications of the third lens unit and fourth lens unit respectively at the wide position, the reference symbols $\beta_{3T}$ and $\beta_{4T}$ designate paraxial lateral magnifications of the third lens unit and fourth lens unit respectively at the tele position, the reference symbol $\phi_W$ denotes refractive power of the zoom lens system as a whole at the wide position thereof, the reference symbol $\phi_{12W}$ represents total refractive power of the first lens unit and the second lens at the wide position, and the reference symbol $\phi_{34W}$ designates total refractive power of the third lens unit and the fourth lens at the wide position.

10. A zoom lens system consisting of, in order from the object side:
 a first lens unit having negative refractive power,
 a second lens unit having positive refractive power,
 a third lens unit having negative refractive power,
 a fourth lens unit having one of positive and negative refractive power, and
 a fifth lens unit having positive refractive power;
 wherein focal length of said zoom lens system is varied by moving said second lens unit, said third lens unit and said fourth lens unit with said first lens unit and said fifth lens unit being kept fixed so that locations of said second lens unit, said third lens unit and said fourth lens unit at a tele position are on the object side of locations of these lens units at a wide position.

11. A zoom lens system consisting of, in order from the object side:
 a first lens unit having negative refractive power,
 a second lens unit having positive refractive power,
 a third lens unit having negative refractive power, and
 a fourth lens unit having one of positive and negative refractive power;
 wherein focal length of said zoom lens system is varied by moving said second lens unit, said third lens unit and said fourth lens unit, with said first lens unit being kept fixed, so that locations of said second lens unit, said third lens unit and said fourth lens unit at a tele position are on the object side of locations of these lens units at a wide position.

12. A zoom lens system according to claim 6, 8, 10 or 11, wherein said zoom lens system is zoomed by varying a distance between said second lens unit and said third lens unit and by varying a distance between said third lens unit and said fourth lens unit.

13. A zoom lens system comprising, in order from the object side:
 a first lens unit which comprises a plurality of lens components and has a negative refractive power as a whole;
 a second lens unit having a positive refractive power;
 a third lens unit having a negative refractive power; and
 a fourth lens unit having one of positive and negative refractive power;
 wherein said zoom lens system is zoomed by varying a distance between said second lens unit and said third lens unit and by varying a distance between said third lens unit and said fourth lens unit, with a most object side lens surface of said first lens unit being kept fixed during said zooming, so that locations of said second lens unit, said third lens unit and said fourth lens unit at a tale position of said zoom lens system are respectively on said object side of locations of said second lens unit, said third lens unit and said fourth lens unit at a wide position of said zoom lens system; and
 wherein said zoom lens system is focused by moving at least one of said plurality of lens components of said first lens unit along an optical axis.

* * * * *